United States Patent
Maguire

(10) Patent No.: US 7,347,007 B2
(45) Date of Patent: Mar. 25, 2008

(54) LOW PRESSURE HIGH CAPACITY DRYER FOR RESINS AND OTHER GRANULAR AND POWDERY MATERIALS

(76) Inventor: Stephen B. Maguire, 1549 E. Street Rd., Glen Mills, PA (US) 19342

( * ) Notice: Subject to any disclaimer, the term of this patent is extended or adjusted under 35 U.S.C. 154(b) by 0 days.

(21) Appl. No.: 11/158,266

(22) Filed: Jun. 21, 2005

(65) Prior Publication Data

US 2006/0080858 A1    Apr. 20, 2006

Related U.S. Application Data

(63) Continuation-in-part of application No. 09/883,837, filed on Jun. 18, 2001.

(60) Provisional application No. 60/582,171, filed on Jun. 22, 2004, provisional application No. 60/212,112, filed on Jun. 16, 2000.

(51) Int. Cl.
*F26B 3/00* (2006.01)

(52) U.S. Cl. ............................ 34/493; 34/497; 34/403; 34/406

(58) Field of Classification Search ............... 220/654, 220/639, 651; 34/575, 446, 487, 493, 497, 34/402, 403, 406, 408, 524, 550, 87, 89, 34/92, 201, 202, 203
See application file for complete search history.

(56) References Cited

U.S. PATENT DOCUMENTS

| | | | |
|---|---|---|---|
| 512,673 A | 1/1894 | Mason | ......................... 432/102 |
| 753,597 A | 3/1904 | Long | |
| 960,857 A | 6/1910 | Eggert | ......................... 414/221 |
| 1,520,017 A | 12/1924 | Denton | |
| 1,620,289 A | 3/1927 | Ridley | |
| 1,625,451 A | 4/1927 | Brown | ........................ 29/428 |
| 2,161,190 A | 6/1939 | Paull | ......................... 221/104 |
| 2,550,240 A | 4/1951 | Geiger et al. | ............... 222/361 |
| 2,569,085 A | 9/1951 | David et al. | ................. 222/200 |
| 2,587,338 A | 2/1952 | Lee et al. | ................... 222/361 |
| 3,111,115 A | 11/1963 | Best | ............................ 119/52 |

(Continued)

FOREIGN PATENT DOCUMENTS

AU       417596       6/1971

(Continued)

OTHER PUBLICATIONS

International Search Report for related application No. PCT/US2005/021851.

(Continued)

*Primary Examiner*—Kenneth Rinehart
(74) *Attorney, Agent, or Firm*—Charles N. Quinn, Esq.

(57) ABSTRACT

A vacuum dryer and method for drying granular or powdery material including at least one canister for holding said material being movable among a series of locations including material heating and vacuum drying locations, means for moving said canister among said locations, and means for directing heating air to a canister for delivery to said canister at a selected position on said canister for heated air passage though material in said canister in a selected direction corresponding to the selected position at which said heated air is delivered to said canister.

2 Claims, 47 Drawing Sheets

U.S. PATENT DOCUMENTS

| | | | |
|---|---|---|---|
| 3,113,032 A | 12/1963 | Wayne | 99/199 |
| 3,115,276 A | 12/1963 | Johanningmeier | 222/49 |
| 3,138,117 A | 6/1964 | Dorey | 105/282 |
| 3,144,310 A | 8/1964 | Glatt et al. | 34/186 |
| 3,209,898 A | 10/1965 | Beebe et al. | 198/205 |
| 3,348,848 A | 10/1967 | Lucking et al. | 277/26 |
| 3,470,994 A | 10/1969 | Schnell et al. | 198/1 |
| 3,597,850 A | 8/1971 | Jenkins | 34/10 |
| 3,698,098 A | 10/1972 | Ramsay | 34/15 |
| 3,834,038 A | 9/1974 | Janda | 34/1 |
| 3,959,636 A | 5/1976 | Johnson et al. | 235/151.33 |
| 3,969,314 A | 7/1976 | Grigull | 260/42 |
| 3,985,262 A | 10/1976 | Nauta | 220/349 |
| 4,026,442 A | 5/1977 | Orton | 222/181 |
| 4,108,334 A | 8/1978 | Moller | 222/136 |
| 4,127,947 A | 12/1978 | Webb et al. | 34/92 |
| 4,148,100 A | 4/1979 | Moller | 366/150 |
| 4,219,136 A | 8/1980 | Williams et al. | 222/450 |
| 4,294,020 A | 10/1981 | Evans | 34/168 |
| 4,354,622 A | 10/1982 | Wood | 222/55 |
| 4,364,666 A | 12/1982 | Keyes | 366/142 |
| 4,394,941 A | 7/1983 | Recine | 222/355 |
| 4,402,436 A | 9/1983 | Hellgren | 222/561 |
| 4,454,943 A | 6/1984 | Moller | 198/657 |
| 4,475,672 A | 10/1984 | Whitehead | 222/561 |
| 4,498,783 A | 2/1985 | Rudolph | 366/132 |
| 4,505,407 A | 3/1985 | Johnson | 222/181 |
| 4,510,106 A | 4/1985 | Hirsch | 264/53 |
| 4,525,071 A | 6/1985 | Horowitz et al. | 366/152 |
| 4,531,308 A | 7/1985 | Neilson et al. | 34/168 |
| 4,581,704 A | 4/1986 | Mitsukawa | 364/479 |
| 4,619,379 A | 10/1986 | Biehl | 222/153 |
| 4,705,083 A | 11/1987 | Rossetti | 141/104 |
| 4,756,348 A | 7/1988 | Moller | 141/83 |
| 4,793,711 A | 12/1988 | Ohlson | 366/18 |
| 4,830,508 A | 5/1989 | Higuchi et al. | 366/152 |
| 4,848,534 A | 7/1989 | Sandwall | 198/535 |
| 4,850,703 A | 7/1989 | Hanaoka et al. | 366/160 |
| 4,989,751 A * | 2/1991 | Gillett | 220/565 |
| 5,064,328 A | 11/1991 | Raker | 412/12 |
| 5,110,521 A | 5/1992 | Moller | 264/40.4 |
| 5,116,547 A | 5/1992 | Tsukahara et al. | 264/1.1 |
| 5,132,897 A | 7/1992 | Allenberg | 364/149 |
| 5,143,166 A | 9/1992 | Hough | 177/128 |
| 5,148,943 A | 9/1992 | Moller | 222/1 |
| 5,172,489 A | 12/1992 | Moller | 34/32 |
| 5,225,210 A | 7/1993 | Shimoda | 425/145 |
| 5,252,008 A | 10/1993 | May, III et al. | 406/23 |
| 5,261,743 A | 11/1993 | Moller | 366/196 |
| 5,285,930 A | 2/1994 | Nielsen | 222/1 |
| 5,293,697 A | 3/1994 | Kawakami | 34/92 |
| 5,340,949 A | 8/1994 | Fujimura et al. | 177/25.18 |
| 5,341,961 A | 8/1994 | Hausam | 222/217 |
| 5,423,455 A | 6/1995 | Ricciardi et al. | 222/1 |
| 5,433,020 A | 7/1995 | Leech | 34/403 |
| 5,501,143 A | 3/1996 | Thom, Jr. | 99/516 |
| 5,513,445 A | 5/1996 | Farrag | 34/362 |
| 5,594,035 A | 1/1997 | Walsh | 521/47 |
| 5,651,401 A | 7/1997 | Cados | 141/129 |
| 5,732,478 A | 3/1998 | Chapman | 34/629 |
| 5,767,453 A | 6/1998 | Wakou et al. | 177/25.18 |
| 5,767,455 A | 6/1998 | Mosher | 177/64 |
| 5,780,779 A | 7/1998 | Kitamura et al. | 177/105 |
| 5,807,422 A | 9/1998 | Grgich et al. | 95/10 |
| 5,843,513 A | 12/1998 | Wilke et al. | 426/646 |
| 6,079,122 A | 6/2000 | Rajikovich | 34/574 |
| 6,151,795 A | 11/2000 | Horrman et al. | 34/92 |
| 6,154,980 A | 12/2000 | Maguire | 34/370 |
| 6,315,902 B1 | 11/2001 | Collasius et al. | 210/232 |
| 6,449,875 B1 | 9/2002 | Becker et al. | 34/491 |
| 2002/0024162 A1 | 2/2002 | Maguire | 264/40.7 |

FOREIGN PATENT DOCUMENTS

| | | |
|---|---|---|
| CA | 1100402 | 5/1981 |
| DE | 3923241 | 1/1991 |
| DE | 4300060 | 7/1994 |
| DE | 4300595 | 7/1994 |
| DE | 4323295 | 2/1995 |
| EP | 0318170 | 5/1989 |
| EP | 0466362 | 1/1992 |
| EP | 0507689 | 10/1992 |
| EP | 0587085 | 3/1994 |
| EP | 0743149 | 11/1996 |
| EP | 0997695 | 5/2000 |
| FR | 802618 | 9/1936 |
| GB | 479090 | 1/1938 |
| GB | 671085 | 4/1952 |
| GB | 849613 | 9/1960 |
| GB | 2081687 | 2/1982 |
| JP | 59082936 | 5/1984 |
| JP | 01235604 | 9/1989 |
| JP | 01286806 | 11/1989 |
| JP | 4201522 | 7/1992 |
| JP | 06114834 | 4/1994 |
| WO | WO 99/37964 | 7/1999 |
| WO | WO 01/49471 | 7/2001 |

OTHER PUBLICATIONS

Written Opinion of the International Searching Authority for related application No. PCT/US2005/021851.
European Search Report for related application No. EP 05076911.
Thirty-nine page brochure entitled "Maguire Low Pressure Dryer: Sep. 7, 2000: Installation Operation Maintenance".
Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Producs, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Six page brochure entitled "Piovan Gravimetric Blenders MDW" published by Piovan Sri, Oct. 1993, Venezia, Italy.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders" published by Maguire Products, Inc., 1995.

Two-sided color brochure entitled "NovaDrier® N Series Dryer" published by Novatec Inc., undated.
Two-sided color brochure entitled "Convey, Blend, Dry" published by Novatec, Inc., undated.
Forty-four page two-sided color brochure including cover and back pages entitled "Maguire: Auxiliary equipment for the plastics industry" Maguire Products, Inc., Oct. 2000.
International Search Report for PCT/US98/19464 (WO 99/15324).
International Search Report for PCT/US02/19294.
Two page two-sided color brochure entitled "LPD Series Dryers: New Directions in drying technology" of Maguire Products, Inc., May 2000.
One page two-sided color brochure entitled "Drying Systems: WGR Gas Dryer Retrofit" of AEC Whitlock, 1997.
Two page two-sided color brochure entitled "Drying Systems: Mass Flow™ Series Drying Hoppers" of AEC Whitlock, 1998.
Four page color brochure entitled "Speedryer Thermodynamic Hopper Dryer" of Canam Manufactured Products Inc., Dec. 10, 2001.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
Five page two-sided color brochure entitled "AEC Auxiliaries As Primary", AEC, Inc., 1999.
Two-sided flyer entitled "GB 140 Series Compact Auto Weigh Blender" published by Conair Franklin in the United States, Jun. 1994.

Six page brochure entitled "Graviblend Precise Continuous Weigh Blenders" published by Ktron, Vertech, Jun. 1991, United States.
One page flyer entitledGravimix, the New Gravimetric Blending Generation published by Ferlin, De Dernsvaard, Holland, circa 1993.
16 page Low Pressure Dryer Technical Information Specifications Features of Maguire Products, Inc. dated Nov. 29, 2000.
One page article entitled "New Dryer Technologies at NPE Aren't Just Hot Air", Plastics Technology, Aug. 2000, p. 19.
One page article entitled "Tech Preview", Automatic Plastics, Aug. 2000, p. 66.
One page article entitled "Maguire expands Low Pressure Dryer commercialization" from www.specialchem.com dated Mar. 30, 2001.
One page article entitled "Smaller Resin Dryer", Plastics Engineering, Aug. 2001, p. 28.
Five page brochure entitled LPD™ Series Dryers of Maguire Products, Inc. dated Jan. 29, 2001.
Two page press released entitled "Maguire® LPD™ 30, Smaller Model Of Breakthrough Resin Dryer, Will Make World Debut at K 2001 Show" of Maguire Products, Inc. dated Jun. 29, 2001.
Three page press release entitled "In Commercial Use By Wide Range Of Plastic Processors, Maguire® LPD™ Resin Dryer Yields Big Savings In Energy Costs" of Maguire Products, Inc. dated May 14, 2001.
Two page press release entitled "Maguire Obtains Patent On Fundamentally New Resin Dryer And Steps Up Program For Worldwide Commercialization" of Maguire Products, Inc. dated Dec. 18, 2000.
Six page press release entitled "Fast, Low-Cost Process Transforms Resin Drying, Promising Dramatic Advance in Industry Productivity And Quality" of Maguire Products, Inc. dated Jun. 20, 2000.
Two page press release entitled "New-Concept Resin Dryer Enables Custom Molder To Eliminate Reject Parts—And Once More Enjoy Sunday Evenings" of Maguire Products, Inc. dated Jun. 20, 2000.

* cited by examiner

MATERIAL DELIVERY MODE

LOW PRESSURE HIGH CAPACITY DRYER FOR RESINS AND OTHER GRANULAR AND POWDERY MATERIALS

CROSS REFERENCE TO RELATED PATENT APPLICATIONS

This patent application claims the benefit under 35 USC 119 of the priority of provisional U.S. patent application Ser. No. 60/582,171, entitled "High Capacity Vacuum Dryer", filed 22 Jun. 2004 in the name of Stephen B. Maguire. This patent application is also a 35 USC 120 continuation-in-part of co-pending U.S. patent application Ser. No. 09/883,837, entitled "Improved Vacuum Dryer", filed 18 Jun. 2001 in the name of Stephen B. Maguire, which in turn claimed the benefit of the priority under 35 USC 119 of provisional U.S. patent application Ser. No. 60/212,112 entitled "Low Pressure Dryer" filed 16 Jun. 2000 in the name of Stephen B. Maguire. This application also claims the benefit of the priority of both application Ser. No. 09/883,837 and application Ser. No. 60/212,112 under 35 USC 119 and 120.

INCORPORATION BY REFERENCE

The disclosure of U.S. Pat. No. 6,154,980 entitled "Low Pressure Dryer" issued 5 Dec. 2000 is incorporated by reference herein in its entirety.

BACKGROUND OF THE INVENTION

1. Field of the Invention

This invention relates to drying granular or powdery material, preferably granular resin material, prior to processing thereof into intermediate or finished products, preferably by extrusion or molding.

2. Description of the Prior Art

It is known to dry granular resin material by placing the granular resin material pellets on large shallow trays to a depth of one or two inches, and putting those trays into ovens for several hours. With this approach to granular resin material drying, drying temperatures of up to 150-180° F., but no higher, can be used since many granular resin materials begin to soften at 200-210° F.

The apparatus and method of U.S. Pat. No. 6,154,980 represent a substantial improvement over and a radical departure from known desiccant dryer technology by providing methods and apparatus which substantially accelerate the drying process, providing greater throughput of dried granular resin material at lower cost than previously known or achievable. The method and apparatus disclosed in pending U.S. patent application Ser. No. 09/883,837, published as U.S. patent publication 2002-0024162-A1, provide further improvement over the methods and apparatus disclosed in U.S. Pat. No. 6,154,980, particularly in the evacuation of the granular material, once dried, from the drying apparatus.

SUMMARY OF THE INVENTION

In its apparatus aspects, this invention provides further improvements in granular or powdery material drying apparatus as generally disclosed in U.S. Pat. No. 6,154,980 and U.S. patent publication 2002-0024162-A1 in which the dryer preferably includes a rotatable preferably vertical shaft, a plurality of preferably vertically-oriented, open-ended preferably cylindrical canisters which are preferably equiangularly positioned and rotate about a vertical axis preferably defined by the shaft, where the canisters are movable serially and unitarily at least among material heating and vacuum drying positions, by providing improved apparatus and methods for heating, drying, transporting and dispensing the dried granular resin material.

The dryer yet preferably further includes preferably pneumatic piston-cylinder actuated means for sealing the preferably cylindrical canisters at the filling/heating, vacuum drying and inventory/dispensing stations.

Each canister includes a preferably vertically-oriented preferably cylindrical shell having open ends with the canisters preferably adapted to be sealingly closed by selectably contacting top and bottom plates thereagainst.

Top and bottom plates preferably selectably seal the cylindrical shells of the canisters at the desired positions, thereby allowing vacuum to be drawn in the canister at a vacuum drying position and minimizing exposure of granular material within the canisters to ambient air, from which the granular material within the canisters may undesirably absorb moisture.

Each canister is desirably adapted to selectably dispense granular or powdery material stored therewithin, preferably when the canister is at an inventory/dispense position. The inventory/dispense position is preferably different and removed from the vacuum drying position. While the inventory/dispense position is preferably different and removed from both the vacuum drying position and the material filling/heating position, it is within the scope of the invention to perform the inventory and dispensing functions, namely filling the canisters and emptying the canisters, preferably in each case by a downward flow into and out of the canisters, at the heating position and/or at the vacuum drying position, as contrasted to at a separate (or third) material inventory/dispense position as generally disclosed herein. It is further within the scope of this invention to perform heating and vacuum during at a single, common position, and also to perform inventory filling and/or dispensing at the same position.

Each canister is further preferably adapted to effectuate material dispensing upon contact by a downwardly moving rod of a top-mounted pneumatic piston-cylinder combination. The rod moves an open centered valve member into position at the bottom of the canister for maximum flow downwardly therethrough. When open, the valve permits relatively unimpeded downward flow of material out of the canister.

In yet another of its aspects, this invention provides improved methods for continuously batch drying granular or powdery material preparatory to mixing, molding, extruding or other processing of that material. The methods preferably include supplying granular or powdery material to a preferably vertically-oriented cylindrical shell of a canister and heating the material within the canister, preferably, but this is not essential to practice of the invention, by introduction of heated air into the canister at the top or at the bottom of the cylindrical shell of the canister, and optionally also into the midst of the material via a plurality of axially extending tubes running at least part way along the axial length of the canister.

The method yet further preferably include moving the vertically-oriented canister through an arc about a vertical axis outboard of the canister periphery to a vacuum drying position and sealing the canister at such position.

The method still yet further preferably include drawing a preselected level of vacuum, desirably via aspiration, within the sealed canister for a time sufficient to evaporate moisture from the heated material within the canister to a desired degree of dryness. Optionally, one or more shots of heated air may be applied to the drying material within the canister while under vacuum.

The method even further preferably include bringing the canister to an inventory/dispense position and then selectably discharging the dried material from the canister in a selected amount responsively to action of a preferably pneumatic piston-cylinder combination located above the canister by opening a valve at the bottom of the canister leading to a vacuum material take-off box and then conveying the dried material from the vacuum material take-off box to a closed receptacle for temporary storage prior to molding or extrusion. Most desirably the material is not substantially exposed to ambient air during such conveyance. Desirably conveying is performed pneumatically.

The method(s) may still yet further include moving the canister through an arc and sequentially repeating the steps commencing with supplying material to the canister. Heating the material within the canister is desirably effectuated by introducing heated air into the canister (optionally and most preferably at an upper end thereof) and further preferably may involve introducing the heated air into the midst of the material via a plurality of perforate tubes extending through the material within the canister. The method steps may further involve moving the canister to the vacuum drawing position, drawing a sufficient level of vacuum in the canister and optionally applying at least one short shot or blast of heated air to the drying material within the canister, preferably close to the conclusion of the drying time, while vacuum is drawn within the canister to evaporate moisture from the material within the canister. The method steps may then further involve moving the canister to a material inventory/dispense position and then optionally using either gravity or heated air (which would otherwise be introduced into a canister at the material heating position) to convey material that has been dried in a canister while at the vacuum drying position and then discharged from the canister at the material inventory/dispense position, to an intermediate receptacle with the material residing in the receptacle temporarily until being molded or extruded. Desirably, all movement of the canister is pneumatically powered.

Most desirably, heated air moves both axially and radially through the canister, moving axially through the canister within a plurality of hollow perforate tubes positioned within the canister, with one tube being positioned along the canister axis and remaining tubes being positioned parallel with and radially outboard of the central tube, so as to provide substantially uniform heating throughout the canister as hot air escapes from the perforations in the tubes and hence passes through the granular material while the canister is at the heating position. The heating tubes are desirably equipped with laterally protruding umbrella-like structures to laterally or radially deflect air moving longitudinally or axially along the heating tubes after exiting from the perforations of the heating tubes. This provides highly efficient heating with air moving several directions simultaneously through the granular material.

In one of its aspects this invention provides an improvement over the structure disclosed in U.S. patent publication 2002-0024162-A1 in that the door of the vacuum material take off box 182 (the same numbering scheme has been used in this application for structure which is common to application Ser. No. 09/883,837, published as 2002-0024162-A1) when open, reveals a chute which optionally automatically extends upon opening the door. This optional automatic extension, in addition to making the chute effectively longer, prevents the front door of the vacuum material take-off box 182 from closing thereby making it is impossible accidentally to run the high capacity vacuum dryer of this invention with the vacuum material take-off box door open. To do so would allow dried granular resin material to spill out of the dryer and to spread over the floor, contaminating the working area; additionally, moisture might contaminate already dried granular material and/or the internal surfaces of the dryer.

In another one of its aspects, the high capacity vacuum dryer in accordance with the invention may incorporate internal stiffening rings for the preferably cylindrical canisters, serving to maintain the cylindrical canisters in precise round configuration thereby preventing those cylindrical canisters from deforming over time. Such canister deformation, if permitted, would ultimately result in violent collapse of the canister as the canister walls fatigue due to the cyclic stress applied thereto as vacuum is drawn within the canister interior. The internal stiffing rings are set into otherwise unsupported areas of the curved surfaces of the cylindrical canisters, desirably at the top and the bottom of each canister and further desirably in the center, proximate the midpoint of each canister. These internal stiffing rings are preferably flat rings with a single split. A bolt and a cone-shaped nut expand the ring at the split when the nut is tightened. The bolt and cone-shaped nut fit into a wedge-shaped segment cut from the ring at the split. As the bolt and cone-shaped nut are tightened, the cone-shaped nut exerts radial force outwardly against the wedge-shaped piece, conforming the wedge-shaped piece in the direction of the circumference of the ring thereby increasing ring diameter and circumference and providing increased stiffening and support for the inner surface of the canister.

In still another improvement manifest in the apparatus and method of the invention over the structure disclosed in published U.S. patent application 2002-0024162, the assembly of parts and devices positioned above the canister when the canister is located at the front position, which is preferably the material inventory/discharge position, and the assembly of parts and devices below the canister when the canister is located at the front position, are both adapted to rotate forward and out through an open door of a dryer cabinet if the dryer is optionally equipped with a cabinet. This provides complete access to the canister located at the front position, for cleaning and service so that the top canister and the bottom of that canister may be accessed. In the high capacity vacuum dryer to which the current application is largely directed, the canisters preferably are not manually individually removable from the dryer due to the large size and large granular resin capacity of the individual canisters.

In still another improvement manifest in the instant application respecting the structure and methods disclosed in U.S. published application 2002-0024162, heating airflow through the canister at the heating station may be from top to bottom, rather than bottom to top as in the device disclosed in U.S. patent application 2002-0024162. This optional, preferable top to bottom airflow has the advantage of avoiding fluidization of the granular resin material being heated, thereby eliminating the possibility of "popcorning" of the material in the upper portion of the canister. Additionally, more uniform, and more efficient heating of the granular resin material often results with top to bottom heating air flow. With this optional but preferable reverse airflow (relative to that disclosed in U.S. Pat. No. 6,154,980 and in U.S. published application 2002-0024162), air flows downwardly, from top to bottom, through the granular material being heated, and acts together with the force of gravity to press the granular resin material against a perforate cone at the bottom of the canister. This downward airflow through the canister at the heating position additionally keeps dust to a minimum. Dust in the granular material processing area of a molding or extrusion facility can clog air filters of other equipment in the molding or extrusion facility thereby disrupting operation.

In another aspect of the invention, the granular resin material canisters, within which the granular resin material is preferably heated and dried, with the canisters preferably being movable from the heating position to the drying position, are preferably equipped with multiple hot air distribution tubes within each canister. These hot air distribution tubes facilitate distribution of warm, indeed hot, heating air within each canister when the canister is at the heating position, thereby facilitating faster heating of the granular resin material and greater throughput of resin material within a given unit time. These hot air distribution tubes also help to support the canister end closure plates during the vacuum drying portion of the cycle. Use of the hot air distribution tubes to provide support to the canister end closure plates allows use of simple flat plates to seal the canister ends, rather than heavy dome pressure vessel-type end plates.

A multiplicity of hot air distribution tubes are preferably used, one tube being in the center and coincident with the axis of the canister while the other tubes are angularly spaced uniformly about and radially spaced away from the center tube. When vacuum is drawn in a canister located at the drying position, the top end closure plate is sufficiently flexible that the top end closure plate draws downwardly in response to the internal vacuum and presses against the upper extremities of the hot air distribution tubes, which support the top end closure plate. These hot air distribution tubes extend downwardly to the bottom end closure plate and also resist excessive upward flexure of bottom end closure plate as vacuum is drawn within the canister during drying.

In yet another aspect of the invention manifesting improvement over the apparatus disclosed in U.S. patent publication 2002-0024162, each resin material canister preferably includes a sight glass. The dryer assembly includes a level sensor located in a fixed position, at the canister filling/heating station. The level sensor is preferably of the reflective type, directing infrared light and detecting reflection or change in the reflection of the infrared light. Each canister is preferably equipped with a sight glass window which consists of heat-resistant clear plastic, is preferably circular and is preferably about one-half inch in diameter. When a canister moves into position at the filling and heating station, the window or sight glass is preferably about one-quarter inch from the sensor, which is in a fixed position, attached to the dryer housing. The sensor allows control of the dryer and specifically the filling process for the canister at the filling/heating station, stopping the filling process when the granular material in the canister is at exactly the right height. This prevents excessive canister fill, which may result in spillage of granular resin material on to the floor of the facility, thereby possibly causing contamination of other machinery, shut down of the manufacturing process and posing a safety hazard to workers. Additionally, since the granular resin material is at the correct height within the canister, hot air for heating the resin material when supplied at the top of the canister at a level above the material will flow downwardly evenly and uniformly through the granular material.

Another aspect of this invention lies in an option programmed into the software controlling the dryer permitting the dryer to purge the conduit lines through which the granular resin material is conveyed after each conveyance of granular material therethrough, in order to empty the conduit line as well as to empty the vacuum material take-off box. This prevents dried granular resin material for sitting for a length of time, being exposed to ambient air and possibly absorbing moisture from that ambient air.

Typically in the operation of the invention to evacuate dried granular material from the canister housing the material, dried granular resin material is conveyed via a closed conduit until a sensor in the exterior material fill cylinder is covered or until a timer times out and the granular material conveyor blower stops. In this case the software carefully dispenses dried granular resin material from the canister, located at the material inventory/discharge position, in which the dried granular resin material is resident, into the vacuum material take-off box. Only enough material is dispensed to partially fill the fill cylinder associated with the process machine consuming the dried granular resin material. The software then sets the timer for a time long enough to assure all of this material is conveyed and no material is left behind, either in the vacuum material take-off box or in the conveying conduit, such that all of the material being conveyed reaches the fill cylinder for the process machine and resides there, preferably sealed and shielded from potentially moisture-laden ambient air until the granular resin material is needed by the process machine.

In implementing this optional aspect of the invention, the fill cylinder for the process machine and the vacuum material take-off box are preferably sized so that the fill cylinder for the process machine holds more dried granular resin material than the granular resin capacity of the vacuum material take-off box. The software then proceeds to sequence the discharge valve of the canister located at the inventory/discharge position so the vacuum material take-off box is initially filled. After this, the discharge valve associated with the canister at the material inventory/discharge position is closed, to isolate the vacuum material take-off box whereupon all material residing in the vacuum material take-off box is conveyed through the conduit to the fill cylinder for the process machine.

Yet another aspect of the invention involves improved control for heating the resin material prior to evacuation of moisture therefrom while the canister is in the vacuum drying position. In this aspect of the invention, the heater warming the air supplied to the canister located at the heating position is cycled on and off with the preferred cycle time being one on/off cycle each second. The percentage of "on" time during each one second cycle determines the output of the heater in BTUs. The rate of temperature increase or decrease per second is monitored in degrees of increase or decrease per second. Using the dynamic rate of change of temperature, the software projects future temperatures at two different times, one time being soon and the other time being later relative to the current time. For example, one projected temperature may be for ten seconds after monitoring the temperature and the other projected temperature may be for forty seconds after the monitoring of the temperature. If both the ten second and the forty second projected temperatures are over the target temperature, the output of the heater is deceased by reducing the percentage of heater "on" time during each one second heating cycle. This decreases the BTU output of the heater. If both the projected ten second and forty second temperatures are under the target temperature, the percentage "on" time of the heater is increased, to increase the BTU output of the heater.

If one of the projected future temperatures, for example the ten second temperature, is above the target and the other of the future projected temperatures, for example the forty second temperature, is below the target, no adjustment is made to the heater.

All aspects of heat control are set using parameters in the software, which may be adjusted by the machine operator. These parameters include short and long forward times at which temperatures are measured, the frequency of temperature readings to be made for the short and long forward times, the amount of adjustment to made to the heater output, the width of the band near the target temperature where no adjustment of the heater output is permitted and the like.

BRIEF DESCRIPTION OF THE DRAWINGS

FIG. 15 is referred to as the "material delivery" configuration or mode of the duplex pneumatic valve box; FIG. 16 is referred to as the "material heating" configuration or mode of the duplex pneumatic valve box. In FIGS. 15 and 16 portions of the duplex pneumatic valve box having active pneumatic air flow are indicated by stippling.

Figure 22:
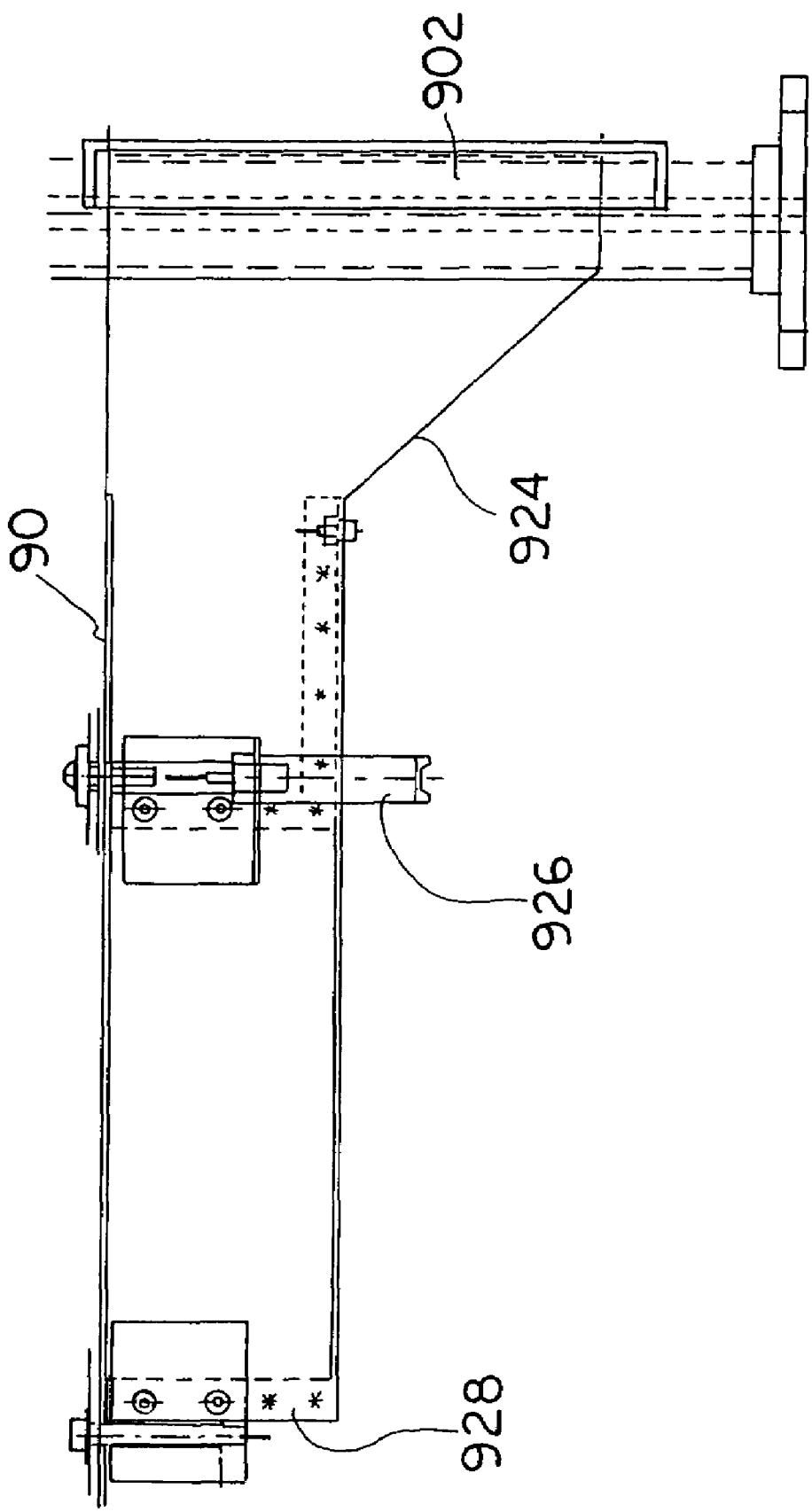
FIG. 22 is a broken front elevation, looking in the same direction as FIGS. 20 and 21, illustrating structure at the bottom of a canister located at the material inventory/discharge position in a dryer of the type illustrated in FIGS. 1 and 17, for sealingly closing the bottom of the canister, which structure is rotatable through an arc to a position outside the dryer cabinet to provide operator access to the bottom of the canister located at the material inventory/discharge position.
Figure 23:
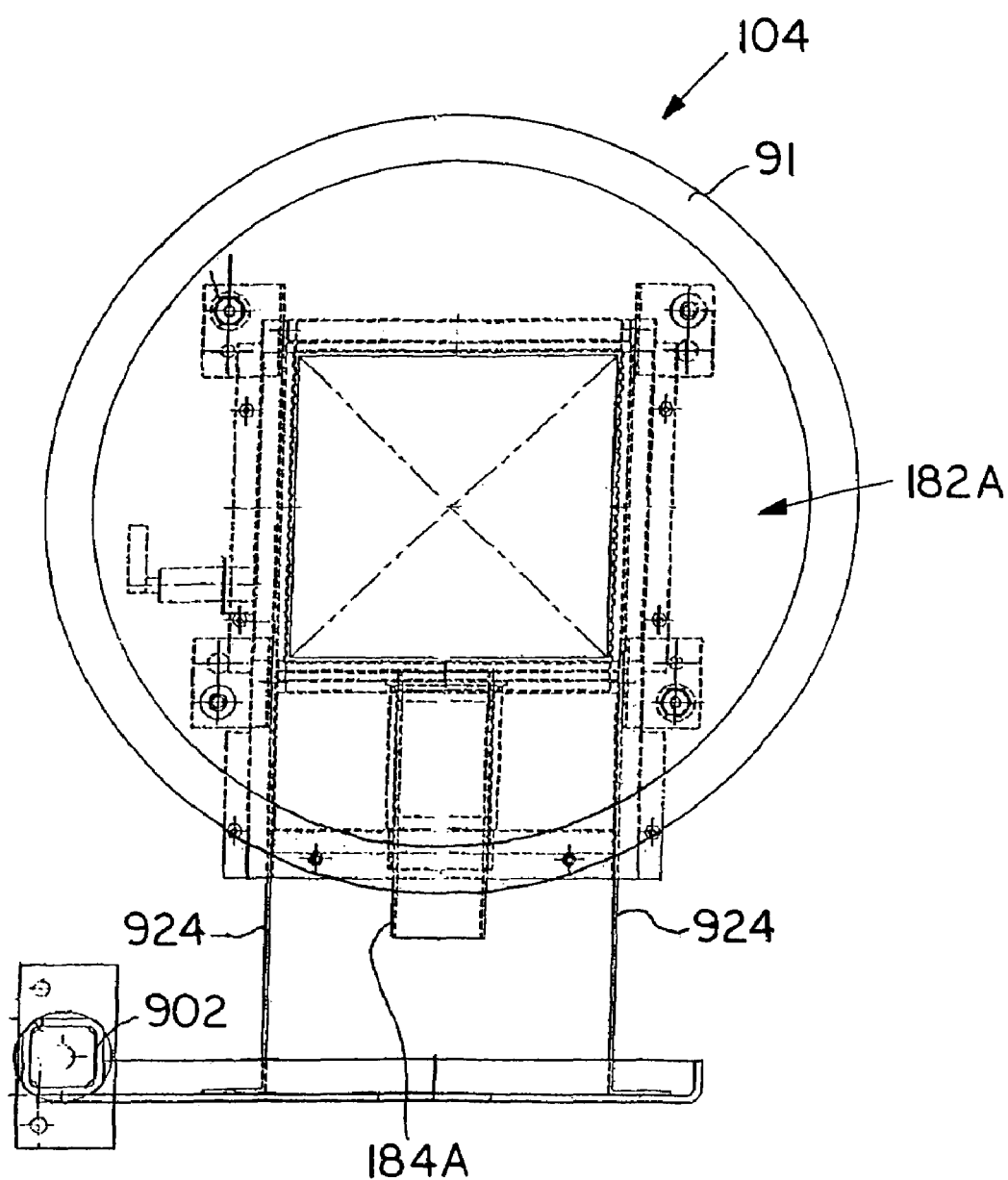
FIG. 23 is a schematic view looking downwardly at the canister inventory/discharge position showing a vacuum material take-off box of the type illustrated in FIGS. 6, 8, 9 and 10 and the structure illustrated in FIG. 22 for sealingly closing the bottom of the canister at the material inventory/discharge position, which structure may be rotated out of the canister cabinet to provide access to the canister bottom at that position.
Figure 24:
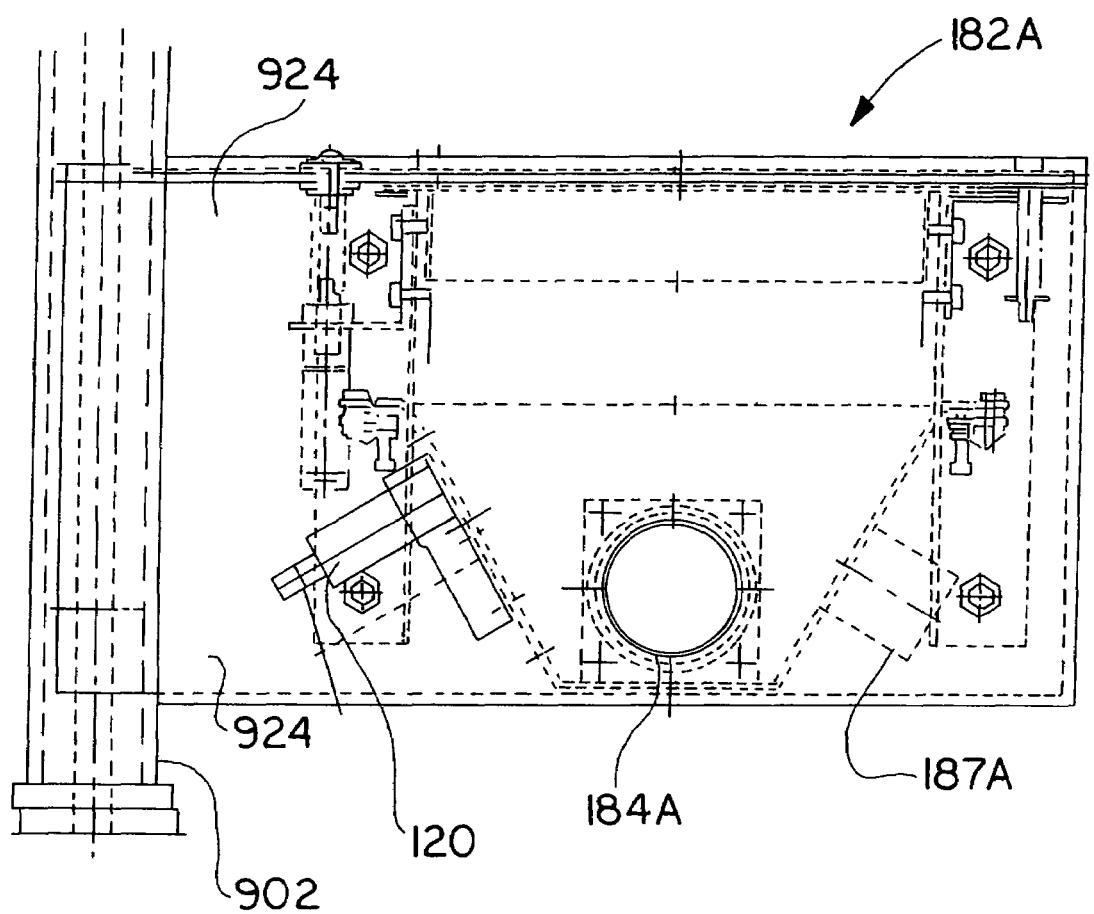

FIG. 24 is rear view in schematic form of a vacuum material take-off box and a portion of the structure illustrated in FIGS. 22 and 23 in broken form.

Figure 25:
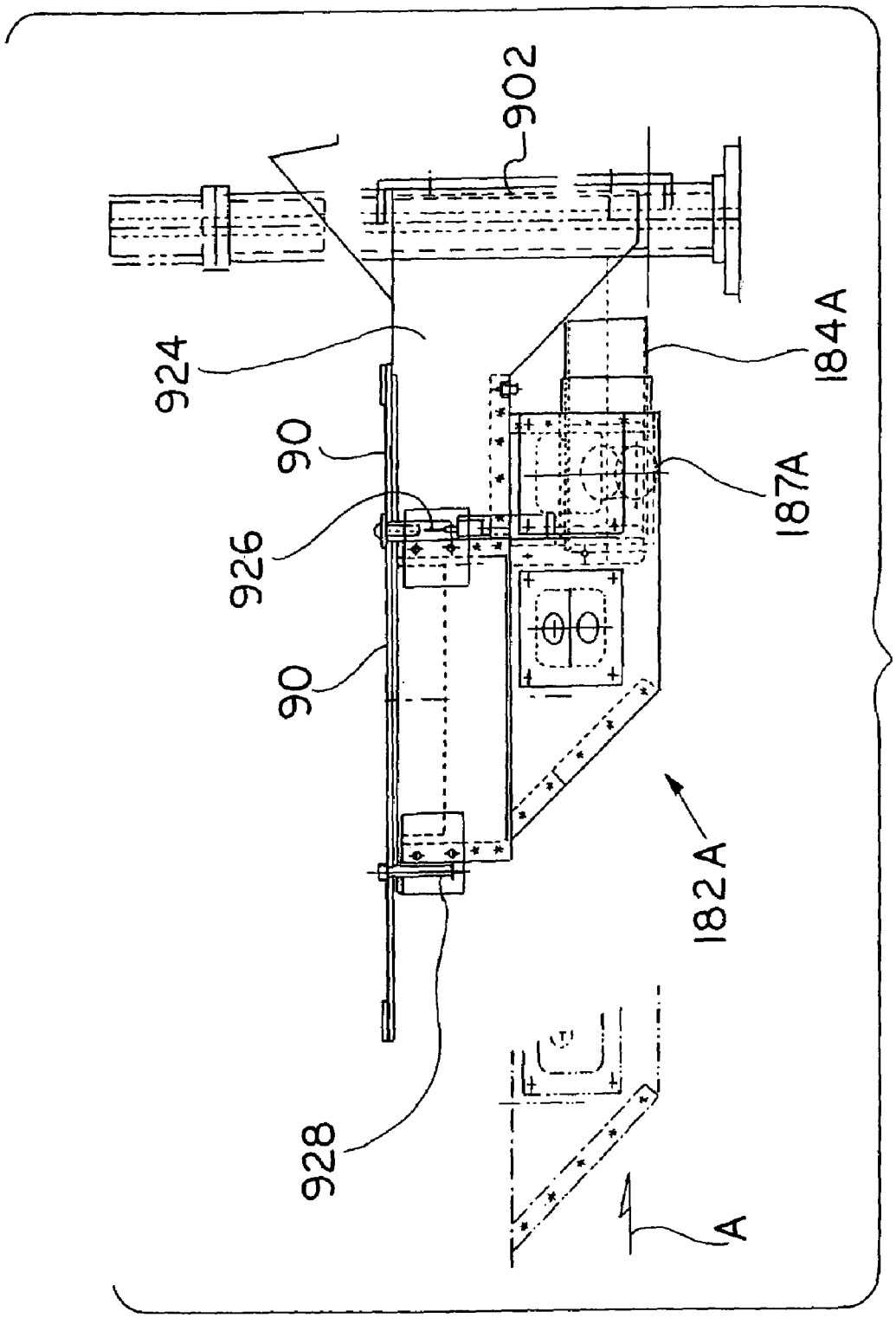

FIG. 25 is a side view of a vacuum material take-off box and a portion of the structure illustrated in FIG. 22, depicting the slidable insertion of the vacuum material take-off box into position below a canister at the inventory/discharge position.

Figure 13:
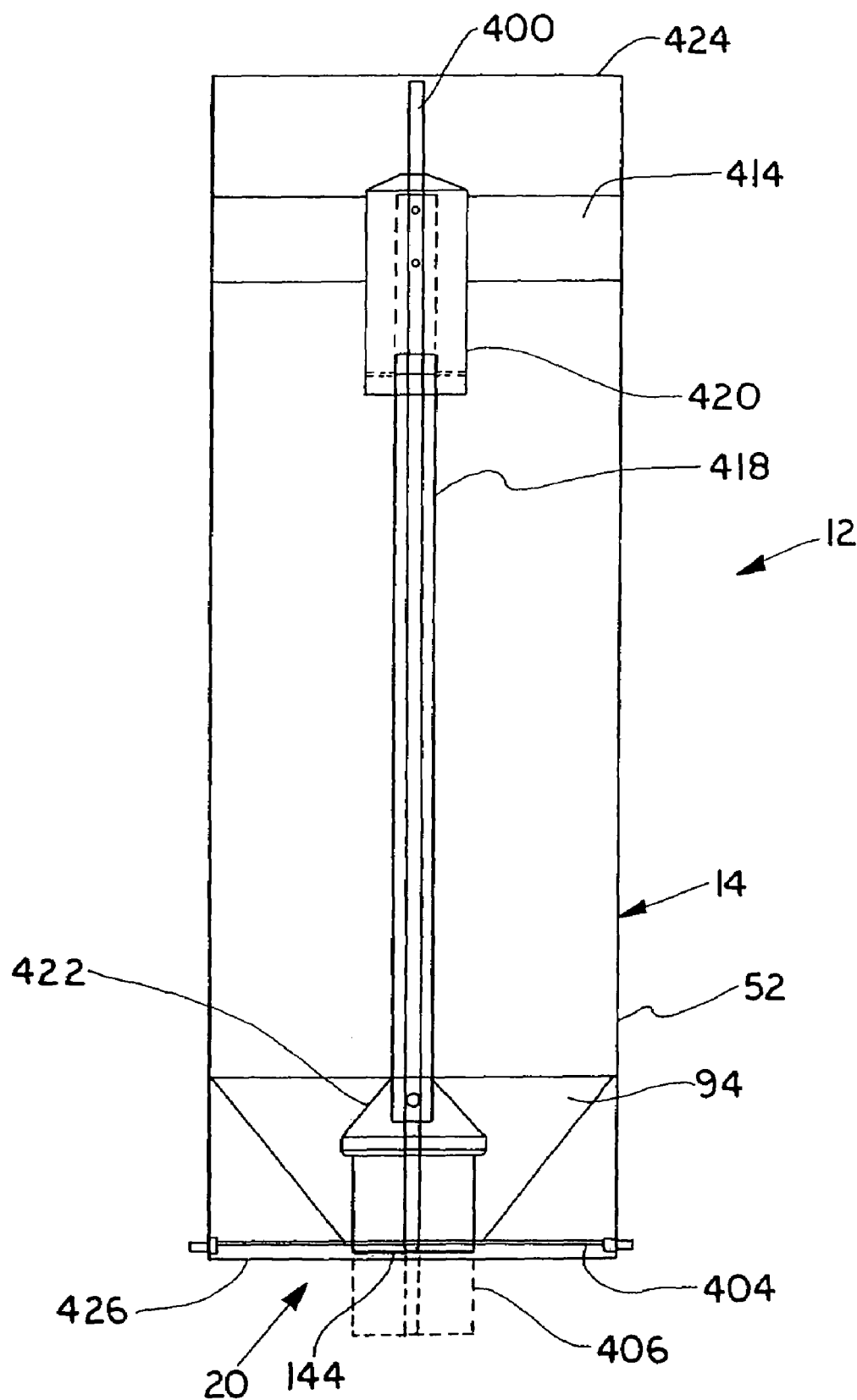
FIG. 13 is a front elevation in section of a canister suitable for use in a dryer of the general type illustrated in FIGS. 1 through 6, 11 and 12.
Figure 14:
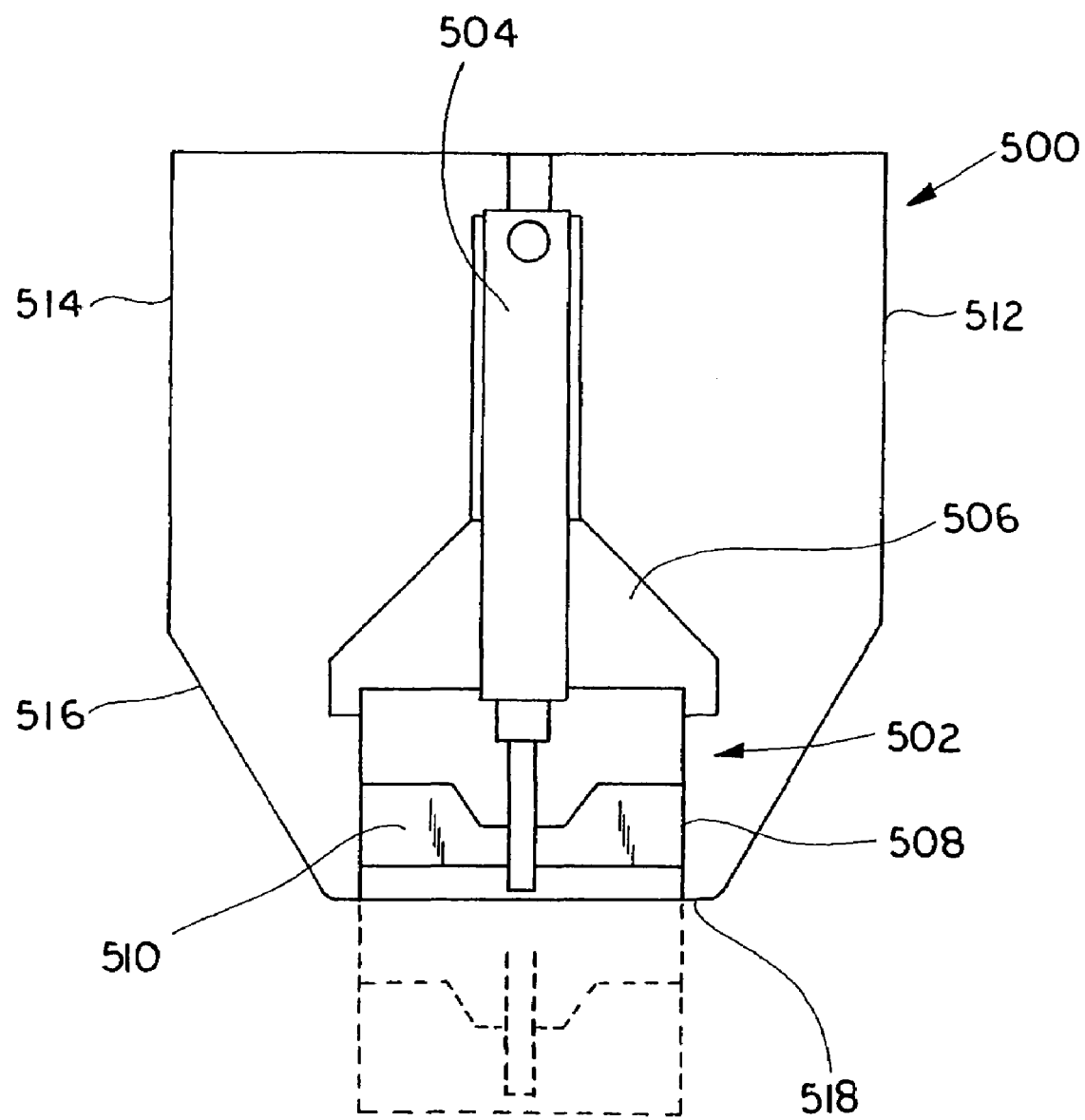
FIG. 14 is a sectioned schematic elevation of a material supply and fill hopper which may optionally be provided for use with a dryer of the general type illustrated in FIGS. 2 through 5.
Figure 26:
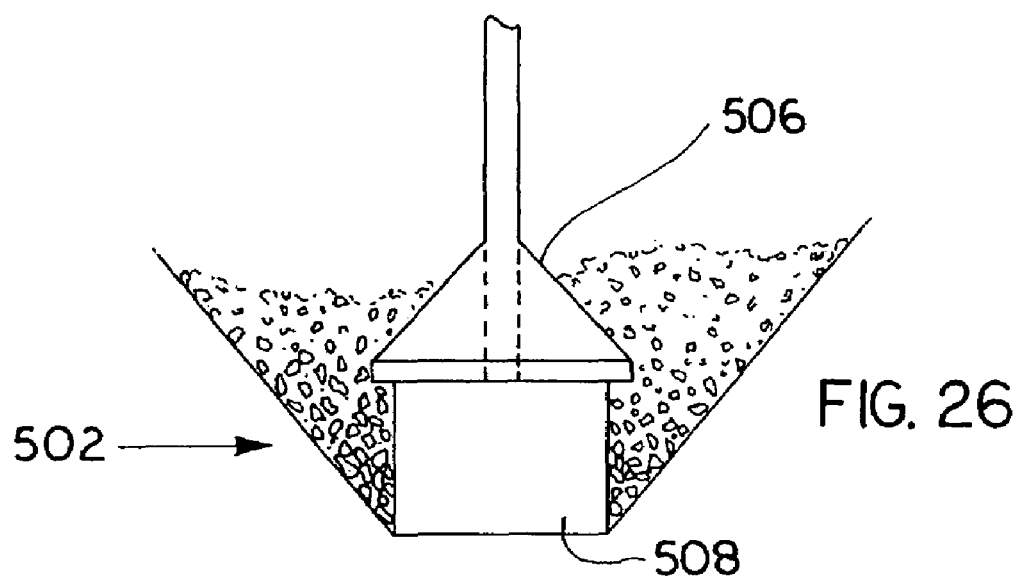

FIG. 26 is a broken schematic elevation depicting a valve of the type illustrated as a component part of canisters 12 in FIGS. 7, 8, 9, 13 and 18 and as a component of a material supply and fill hopper illustrated in FIG. 14, with the valve in the closed position, precluding downward flow of granular material.

Figure 27:
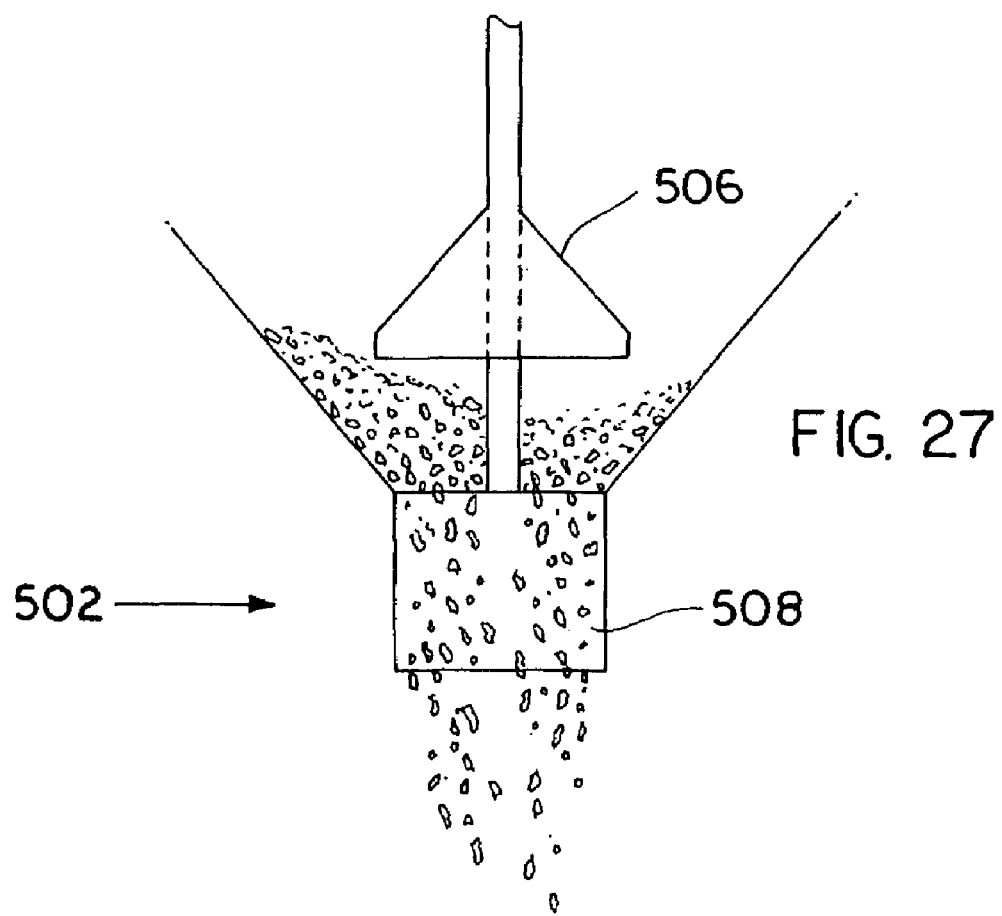

FIG. 27 is a broken schematic elevation depicting the valve of FIG. 26 in the open position, permitting downward flow of granular material.

Figure 28:
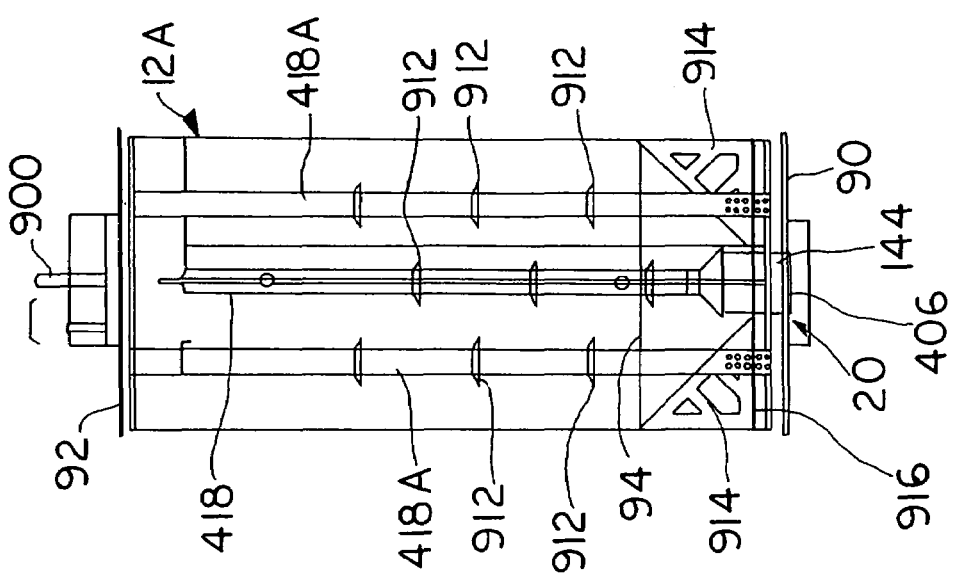

FIG. 28 is a front elevation in section of a second preferred embodiment of a canister manifesting aspects of the invention and suitable for use with a dryer of the general type illustrated in FIGS. 1 through 6, 11 and 12, with the canister discharge valve in the closed position.

Figure 29:
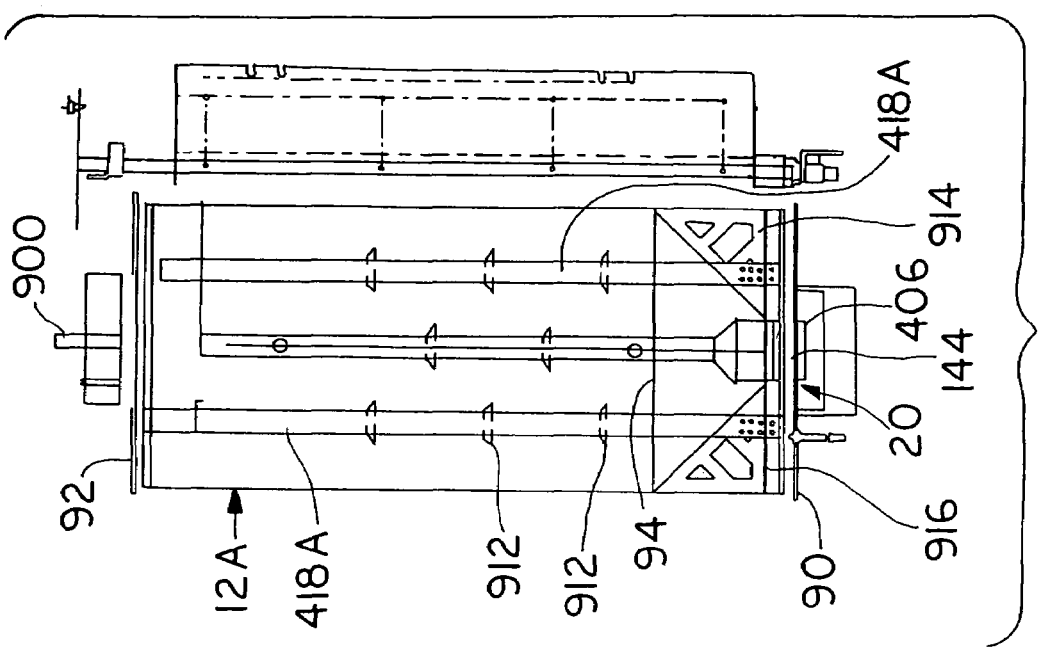

FIG. 29 is a front elevation in section of a canister illustrated in FIG. 28 but with the canister discharge valve in the open position.

Figure 30:
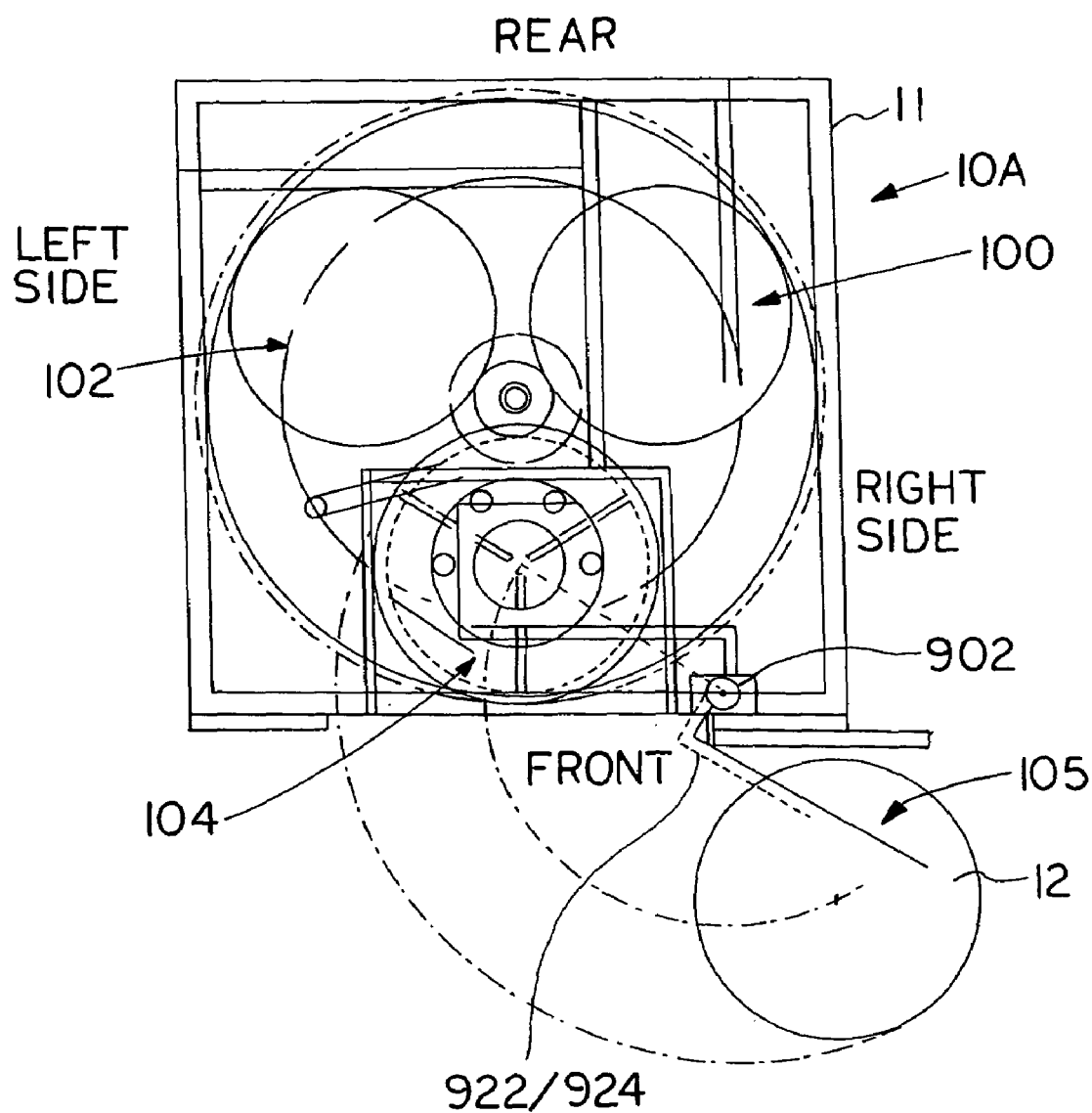

FIG. 30 is a top schematic view of a dryer in accordance with the invention illustrating the manner in which the apparatus for sealing the top of a canister and the apparatus for sealing the bottom of a canister at the inventory/discharge position may be separately rotated out of the dryer housing to facilitate operator access to this top and the bottom of a canister, located at the inventory/discharge position.

Figure 31:
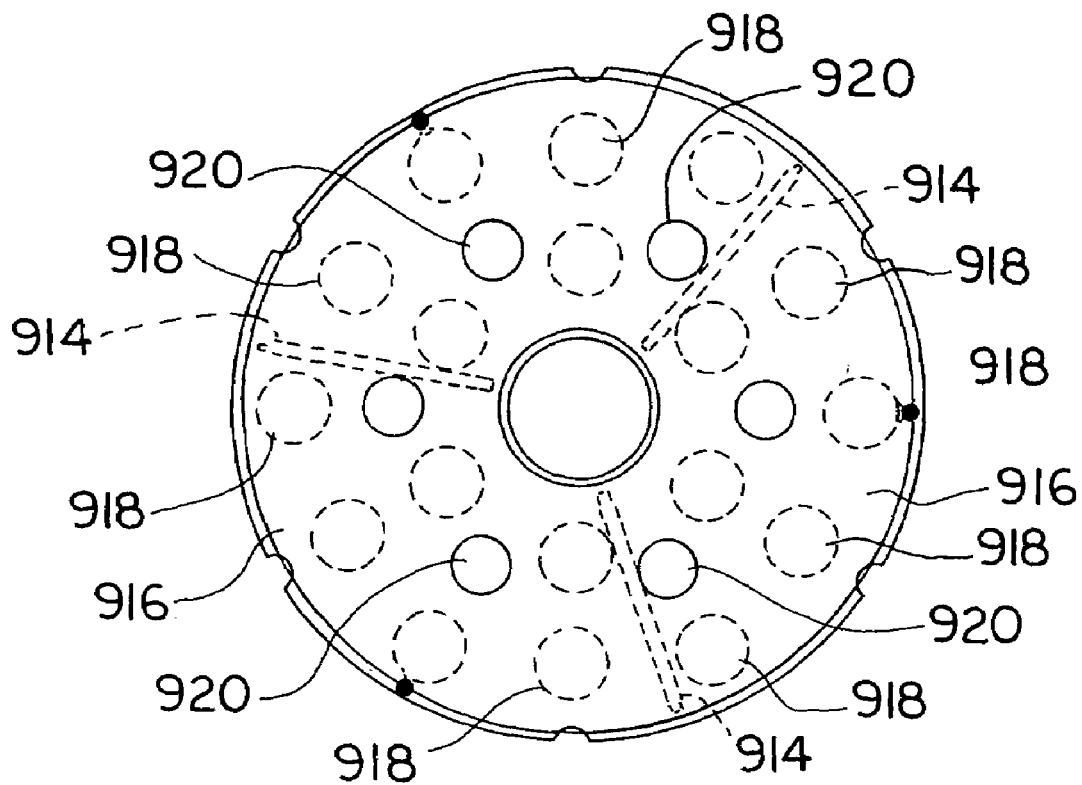

FIG. 31 is a schematic plan view of the bottom of the canister illustrated in FIGS. 28 and 29.

Figure 32:
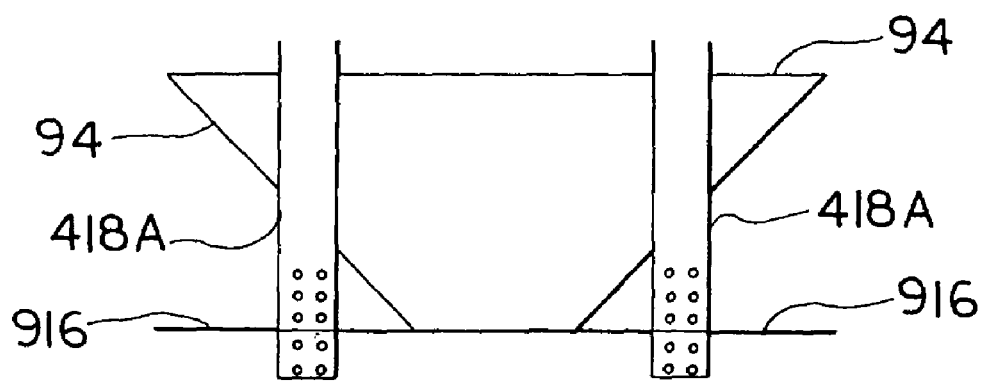

FIG. 32 is a broken side view, partly in schematic form, illustrating a perforate internal cone portion of a canister.

Figure 33:
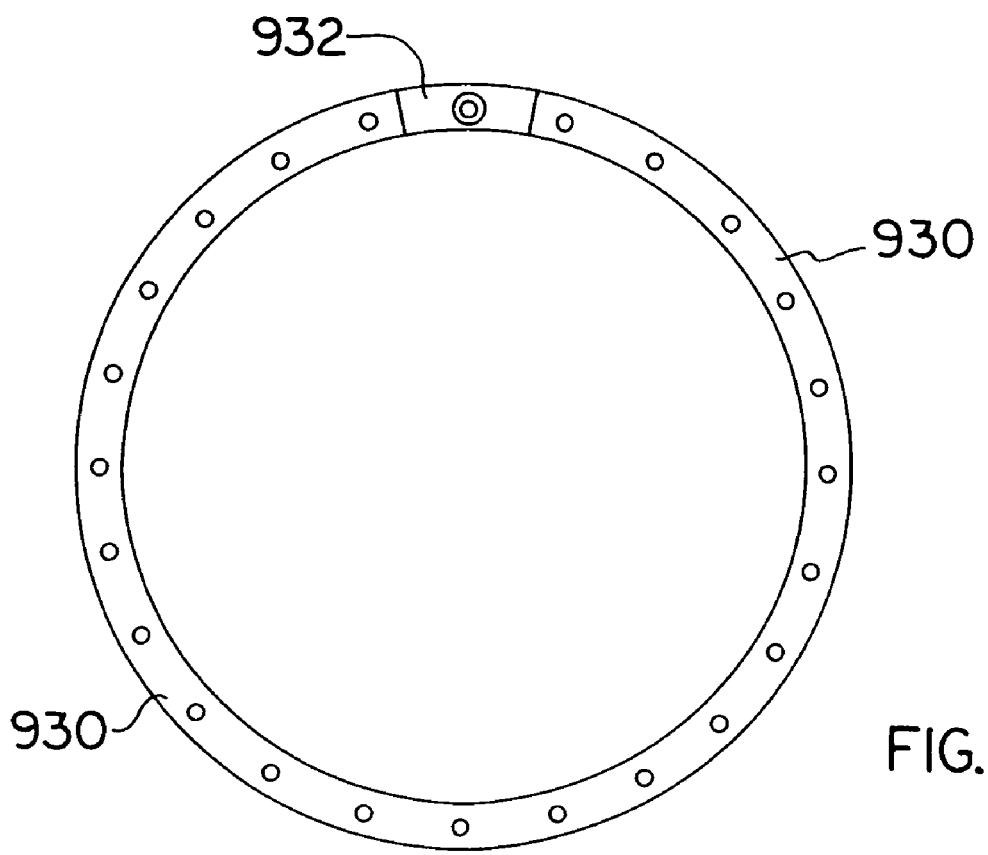

FIG. 33 is a plan view of a canister stiffening ring manifesting aspects of the invention.

Figure 34:
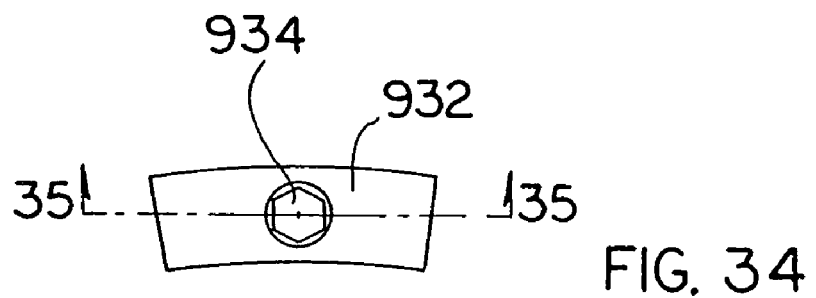

FIG. 34 is a broken view of a segment of the canister stiffening ring of FIG. 33.

Figure 35:
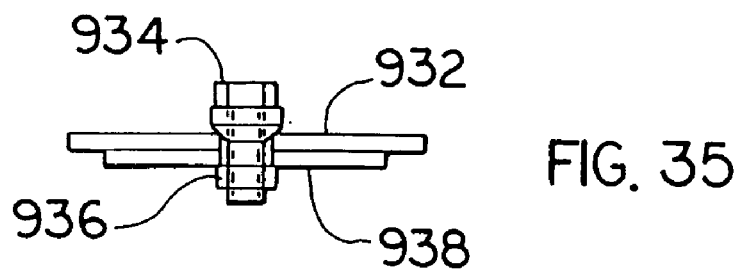

FIG. 35 is a sectional view taken at lines and arrows 35-35 in FIG. 34.

Figure 36:
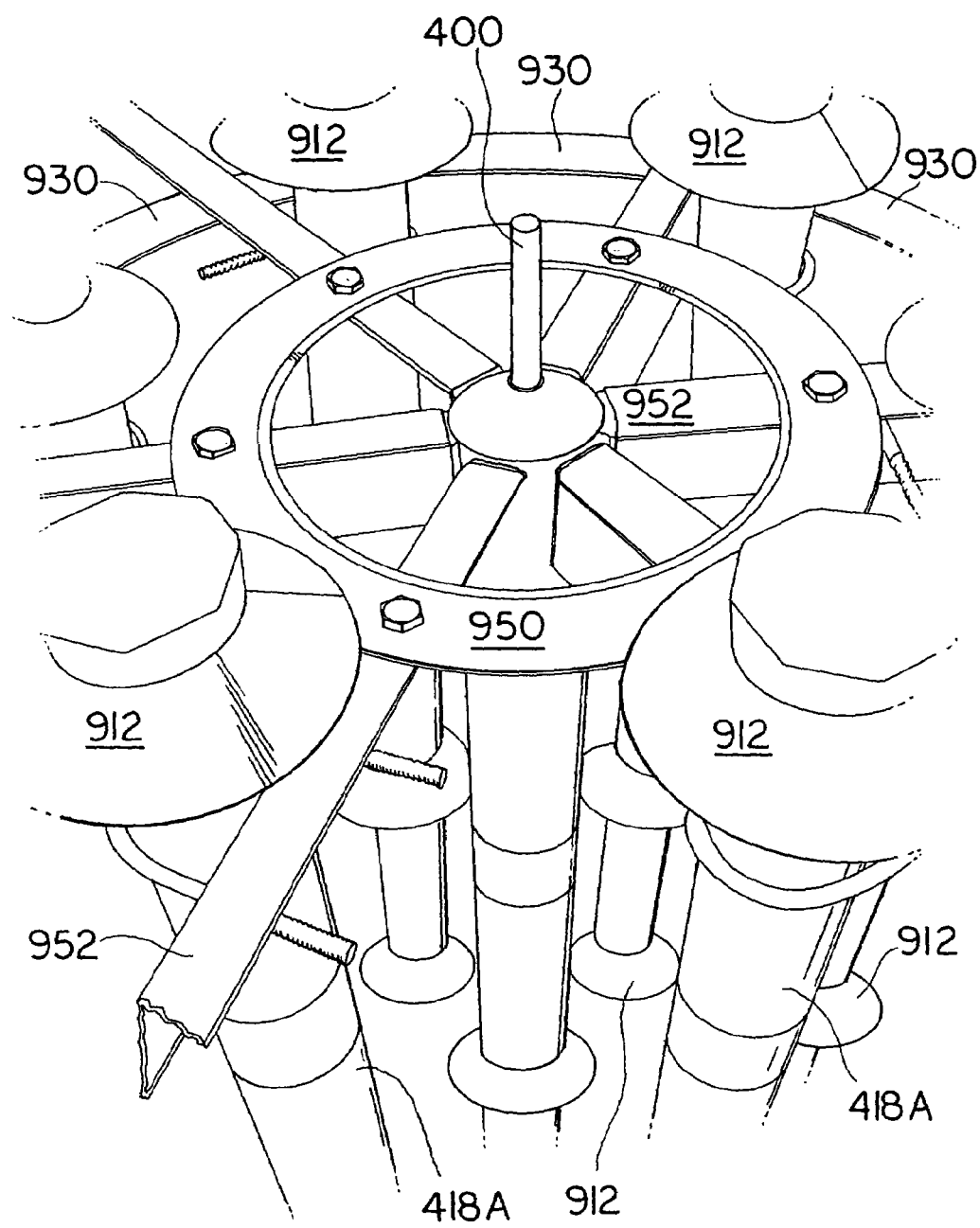

FIG. 36 is a view looking downwardly into an empty canister as 12A illustrated in FIGS. 28 and 29 in which canister internal heat tubes 418 are visible as is canister discharge valve stem actuating shaft 400 for the canister discharge valve located at the bottom of the canister, as are the umbrella air deflectors 912 positioned around internal heat tubes 418. Upper ends of tubes 418 are sealed indicating that this canister is designed for heating air travel from bottom to top, with sealed ends of heat tubes 418 supporting the canister upper sealing plate 40 at vacuum drying position 102.

Figure 37:
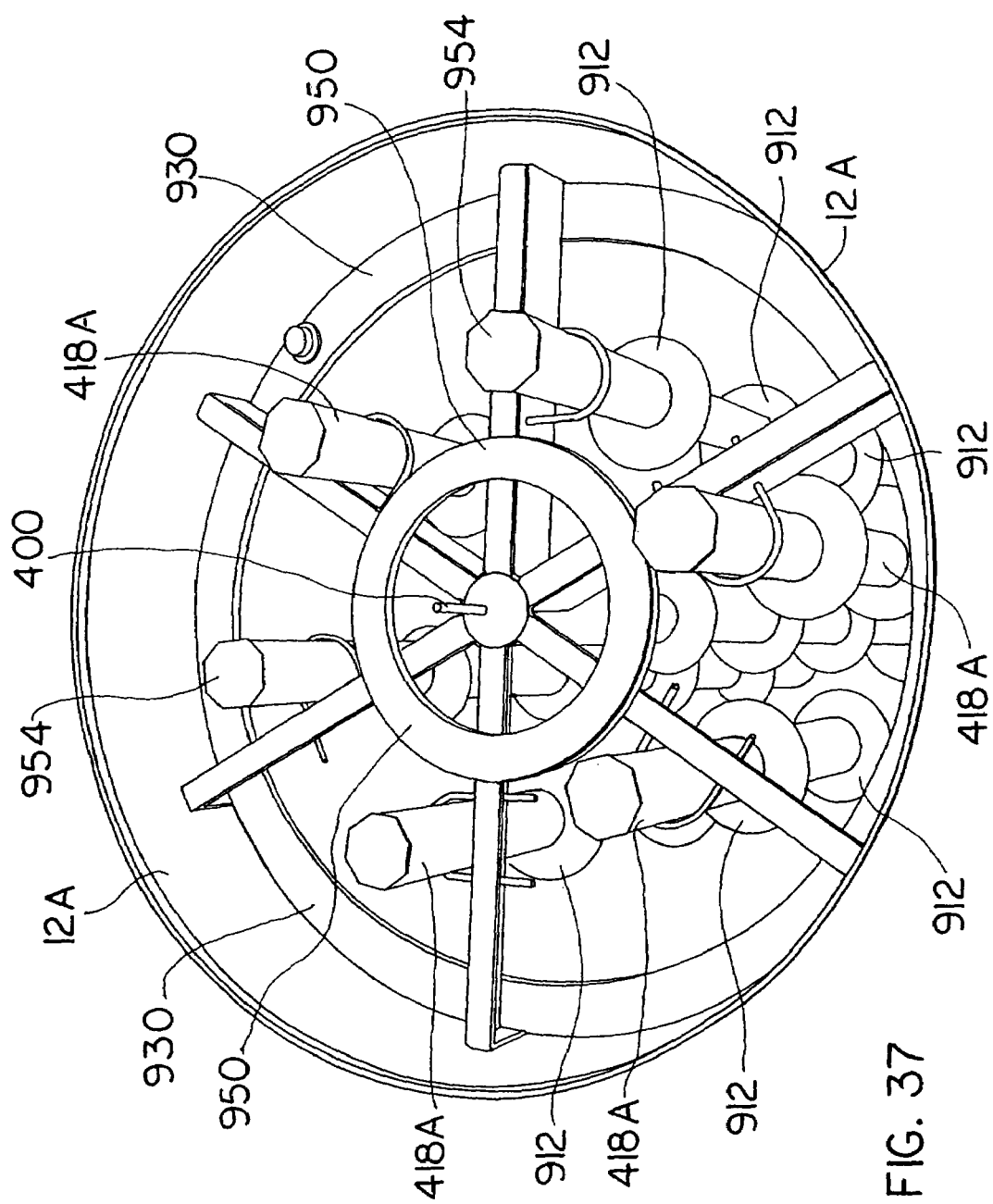

FIG. 37 is a view similar to FIG. 36 looking downwardly into canister 12A from the top where heat tubes 418, canister discharge valve stem shaft 400, several of canister hoop stress reinforcing rings 930 and several of umbrella air deflectors 912 are visible.

Figure 38:
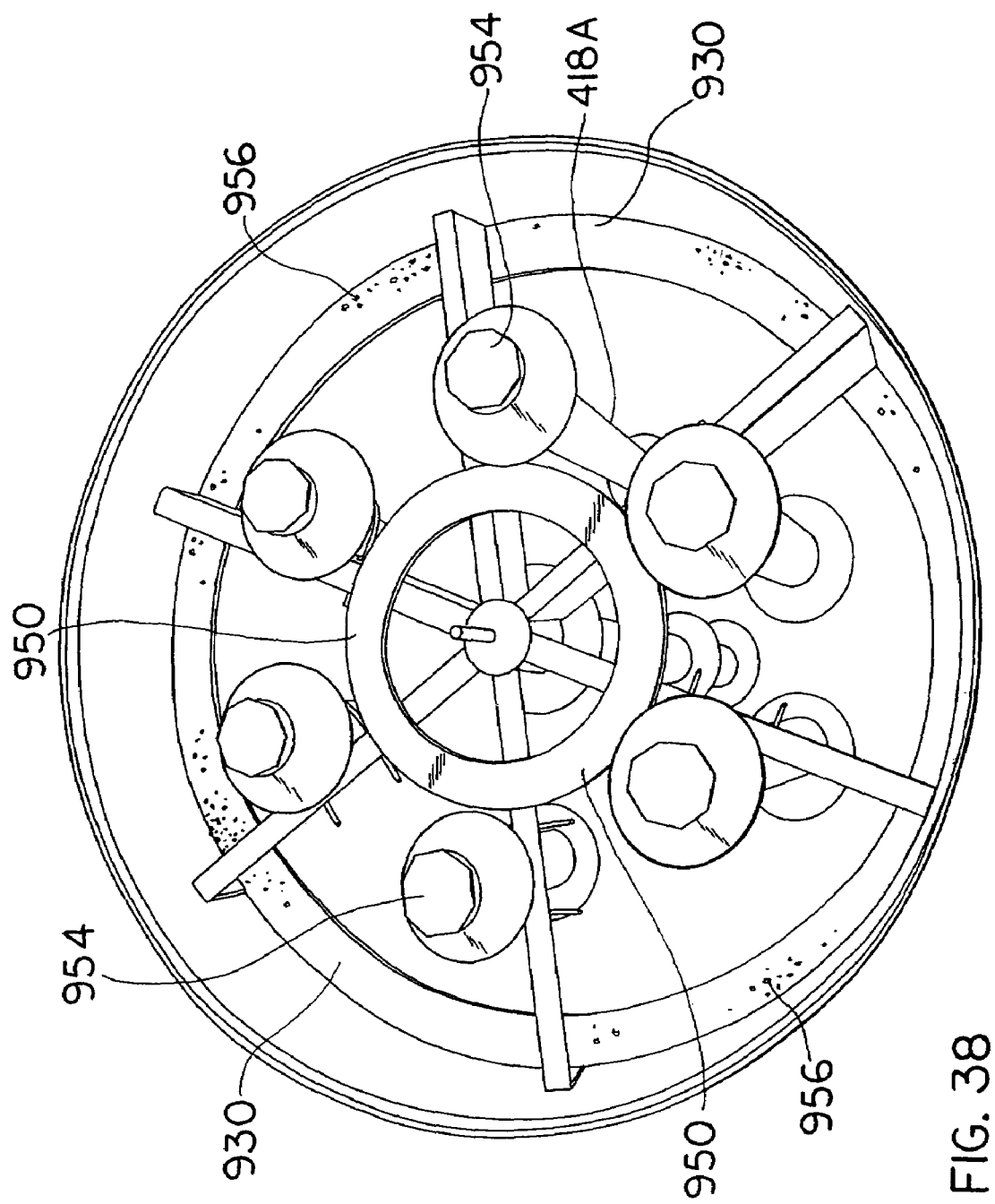

FIG. 38 is a view similar to FIGS. 36 and 37 with some residual granular material visible within the canister.

Figure 39:
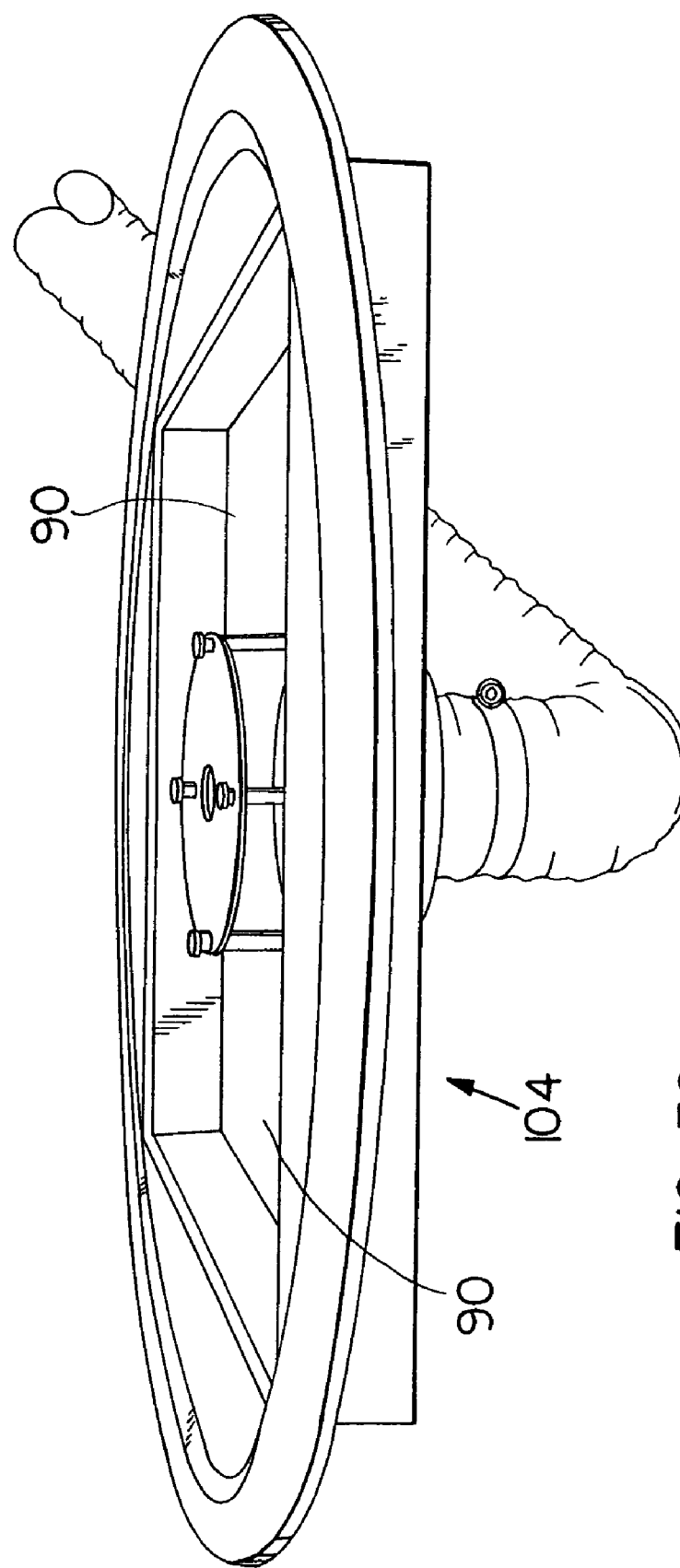

FIG. 39 is a view of a canister bottom sealing plate 90 located at inventory/discharge position 104.

Figure 40:
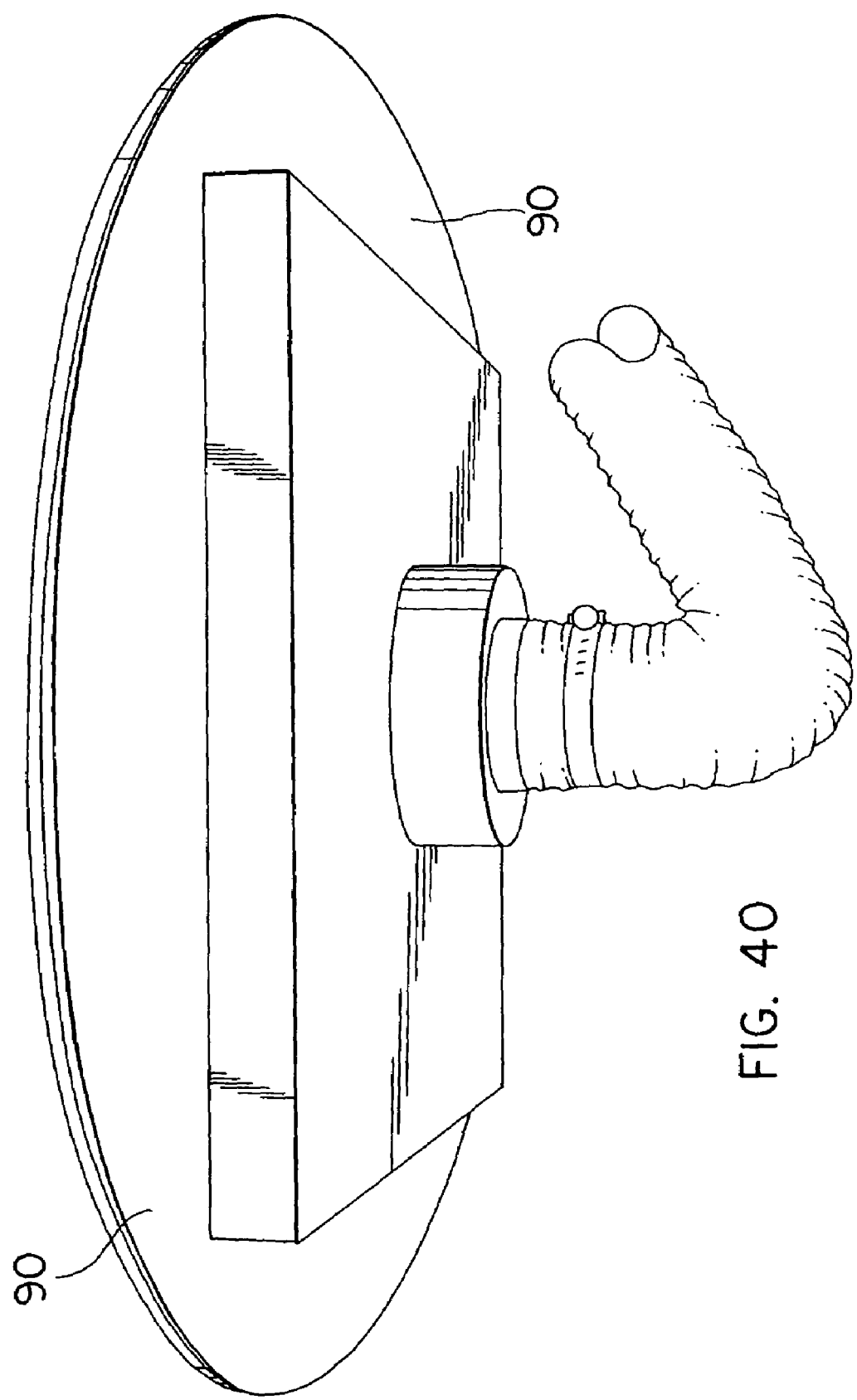

FIG. 40 is a bottom view of canister bottom sealing plate 90 at inventory/discharge position 104 with the plate tilted to reveal pneumatic hose structure connected thereto at the bottom.

Figure 41:
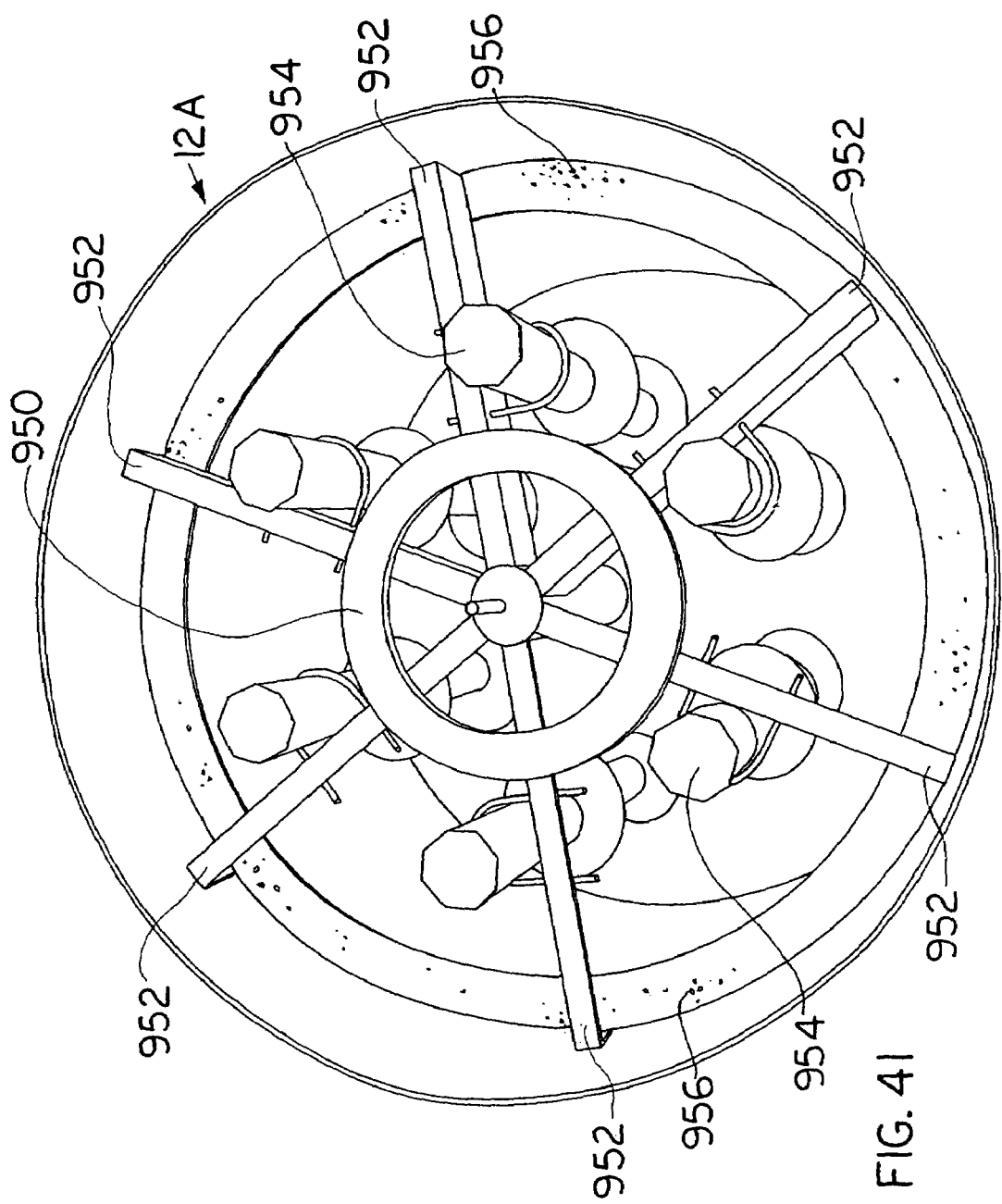

FIG. 41 is another view looking into the top of a canister 12A, similar to FIGS. 36 through 38, with the canister loaded with granular resin material to be dried.

Figure 1:
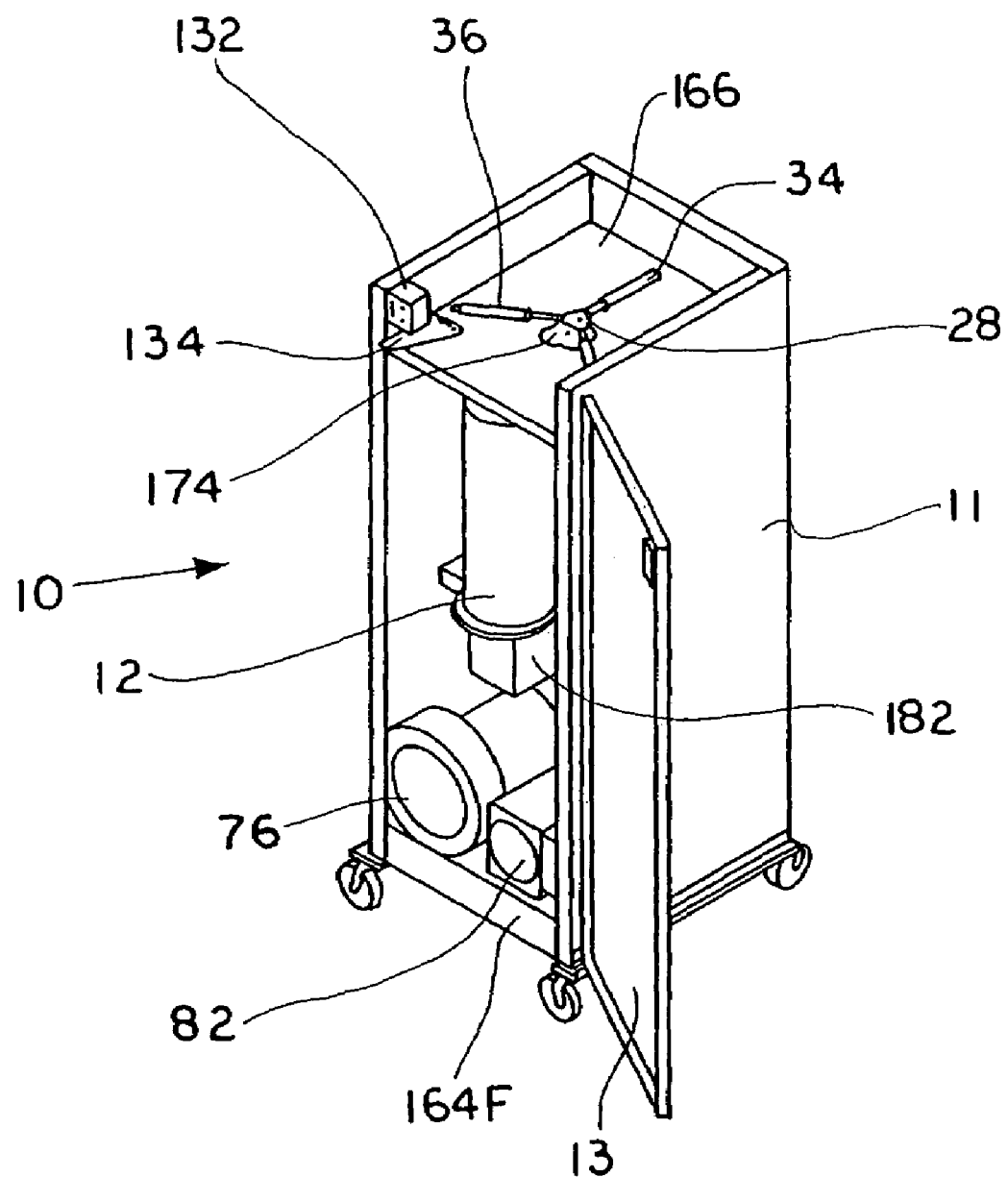
FIG. 1 is an isometric view of vacuum dryer apparatus of the type to which this invention relates, shown in an optional cabinet.
Figure 42:
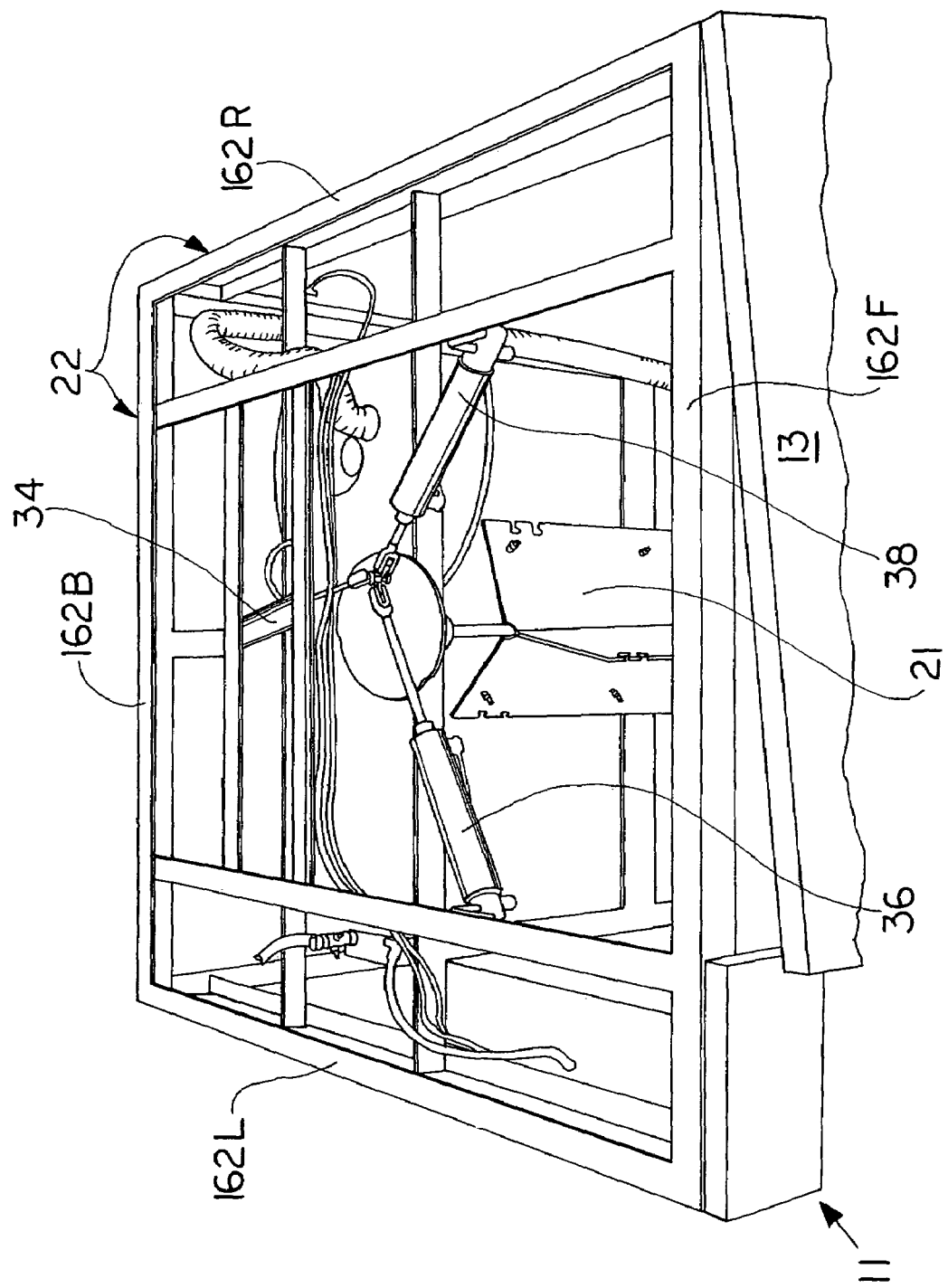

FIG. 42 is a top view of a dryer in accordance with the preferred embodiment of the invention and of the general type illustrated in FIG. 1 with the front door of the dryer illustrated slightly ajar and with no canisters in place so as to reveal a canister support bracket 21 to which the canisters are bolted and which is rotated by shaft 24.

Figure 43:
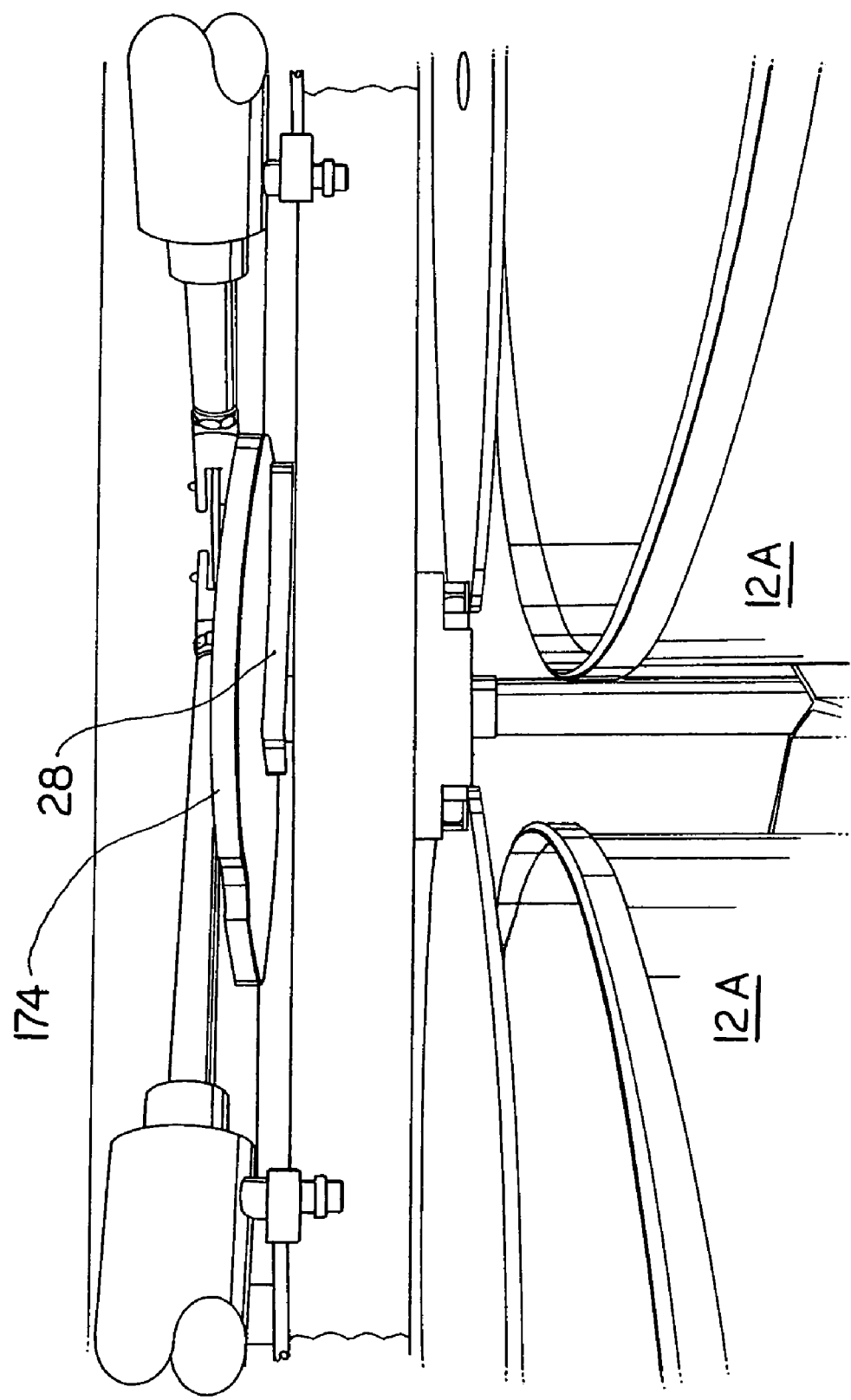

FIG. 43 is a view taken at a slightly lower position than FIG. 42, showing the canister drive mechanism with canisters in place.

Figure 44:
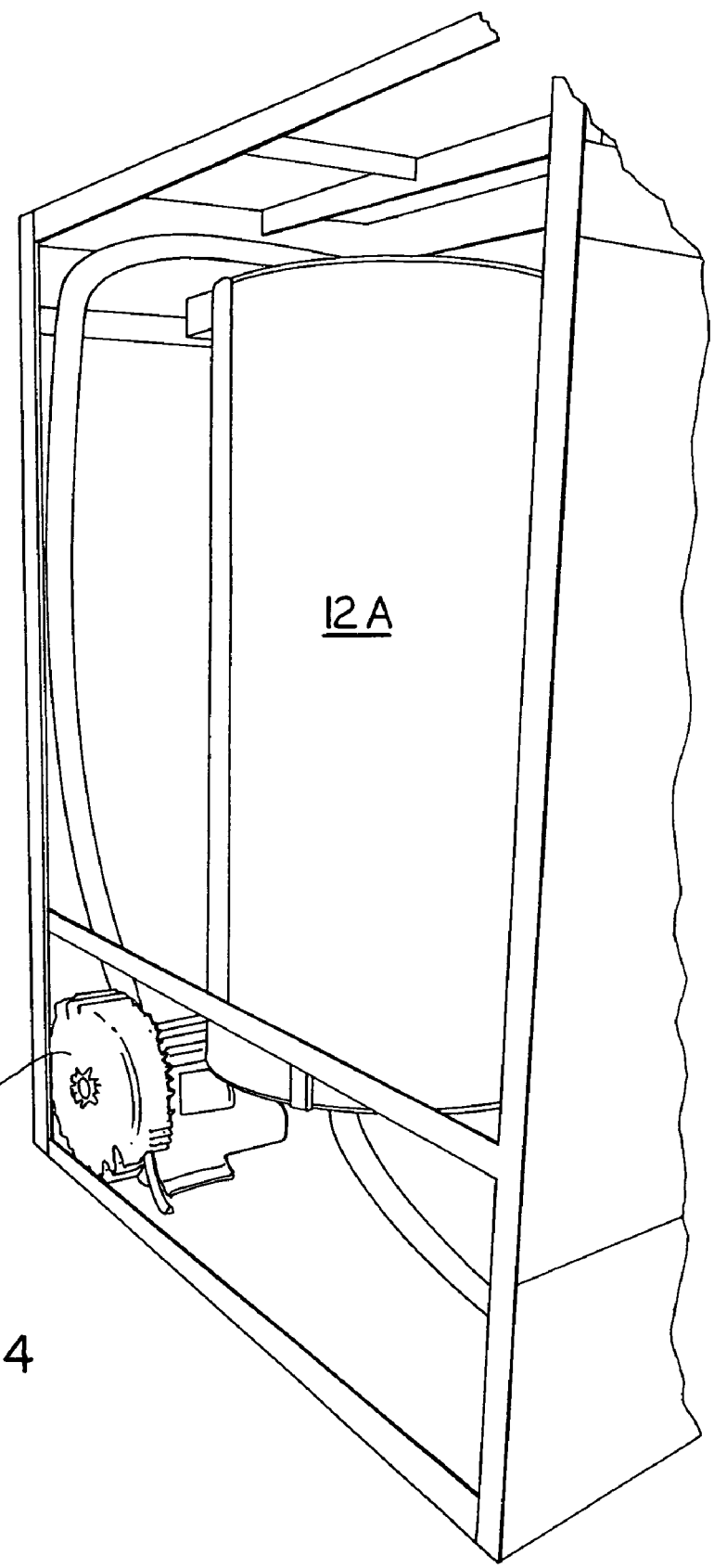

FIG. 44 is a view of one side of a dryer of the general type illustrated in FIG. 1 with a canister 12A in place.

Figure 5:
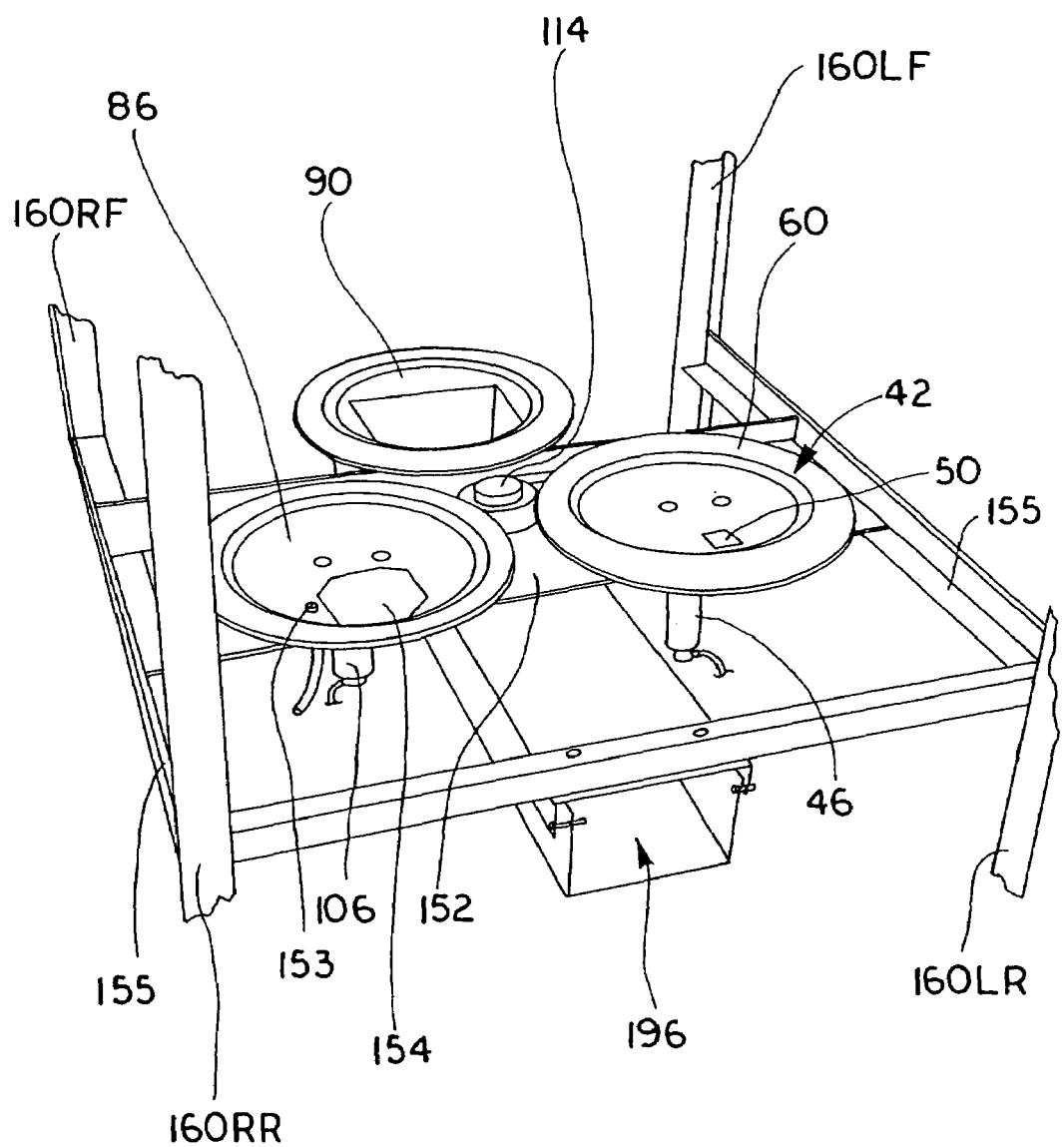
FIG. 5 is a broken isometric view of a portion of the frame of the dryer illustrated in FIGS. 2, 3 and 4, showing structure for closing the bottoms of the canisters at the material filling/heating, vacuum drying and inventory/discharge positions.
Figure 45:
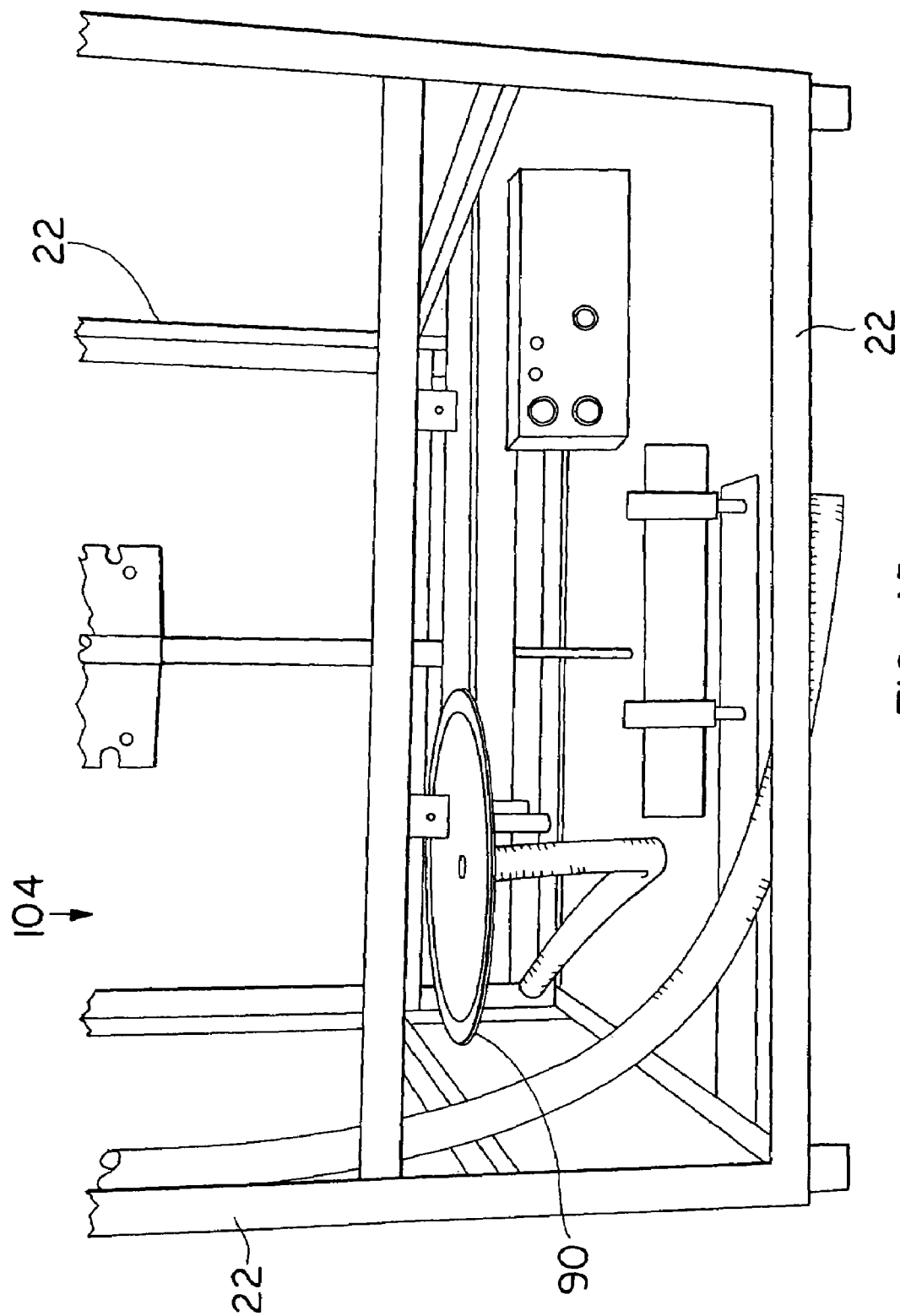

FIG. 45 is a view of the dryer taken from the side showing the canister bottom sealing plate 90 at the inventory/discharge position with the arrangement for movement of the plate being such similar to that illustrated in FIG. 5.

Figure 46:
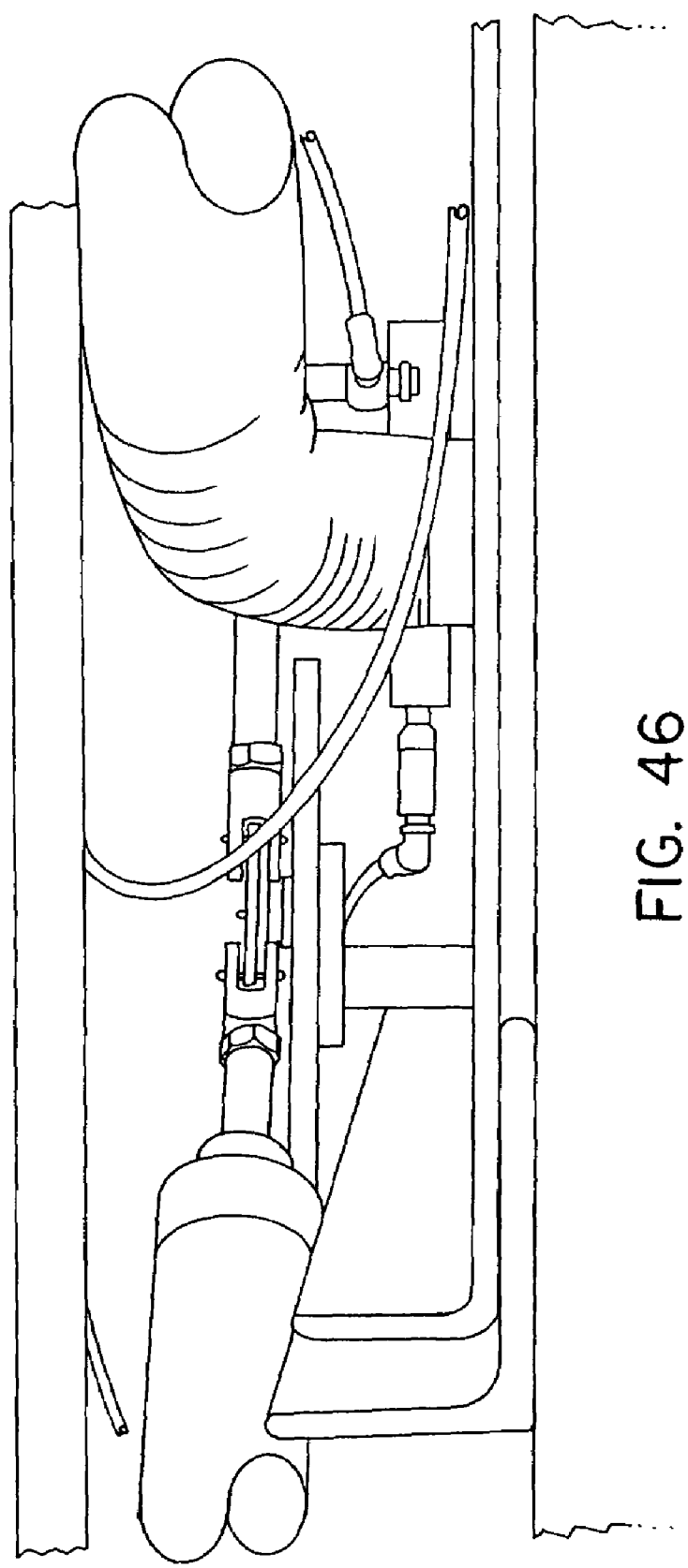

FIG. 46 is a side view of the canister drive mechanism at the top of the dryer.

Figure 47:
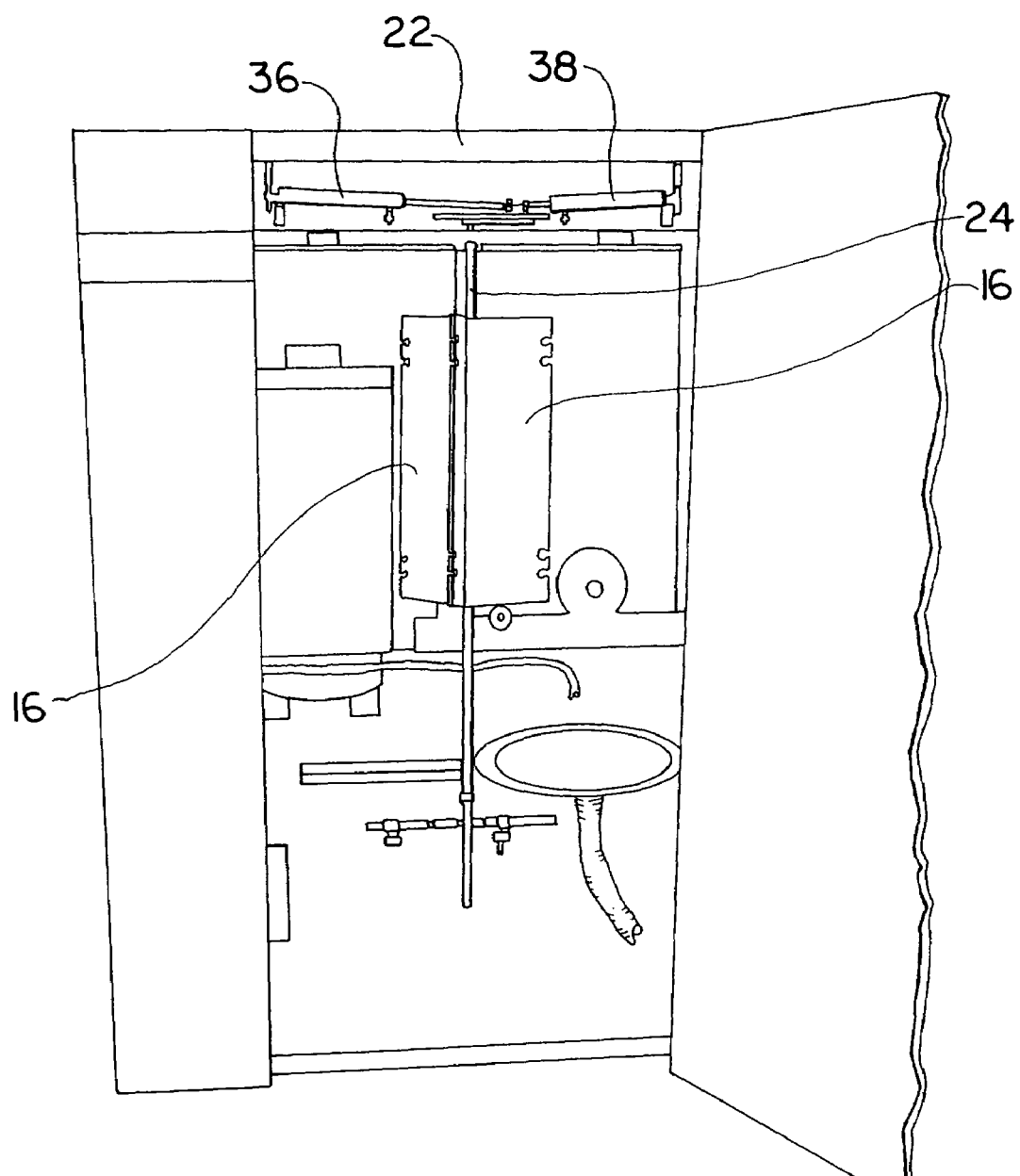

FIG. 47 is a front view of the dryer with one canister in place illustrating the bracket blade 16 to which the canisters are bolted for unitary rotation with shaft 24.

Figure 48:
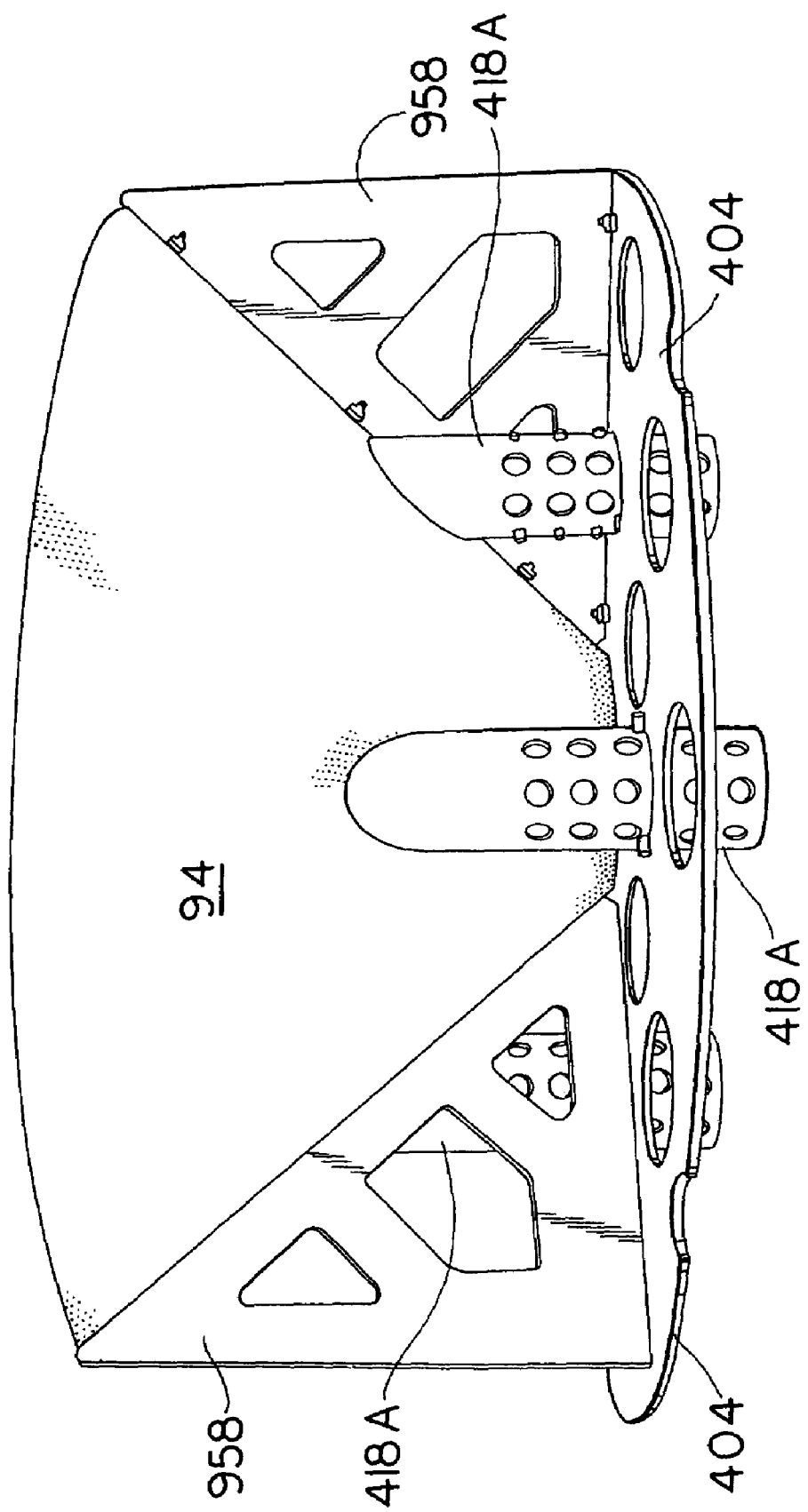

FIG. 48 is a view of a perforate funnel 94, funnel support brackets 958 to apertured heat tubes 418 and a funnel support plate 404 all having been removed from a canister.

Figure 49:
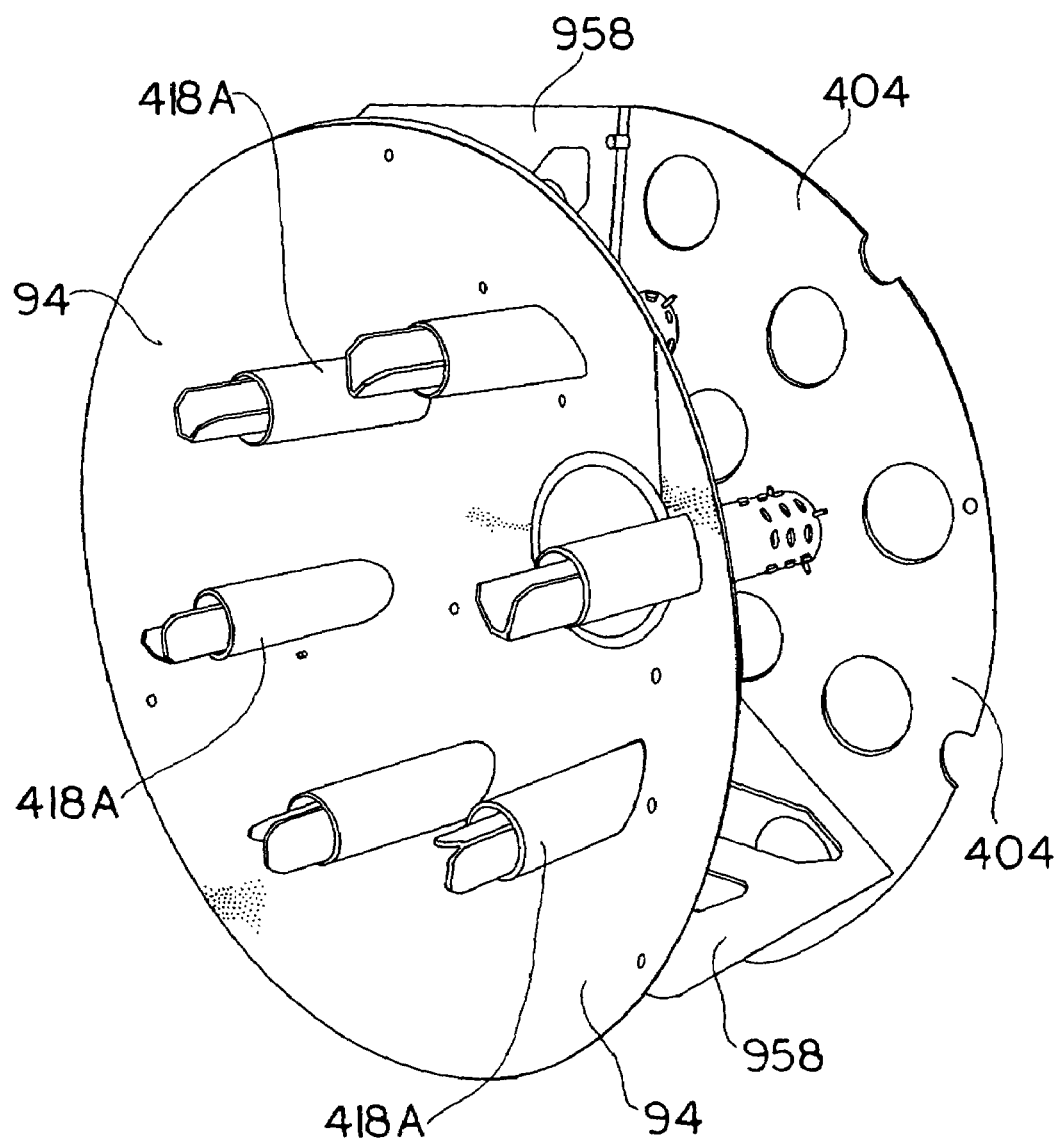

FIG. 49 is a view similar to FIG. 48 but looking down into perforate funnel 94 with a number of heat tubes 418A in place within perforate funnel 94, with two funnel support brackets 958 being visible and supporting perforate funnel 94 above funnel support plate 404.

DESCRIPTION OF THE PREFERRED
EMBODIMENT AND BEST MODE KNOWN
FOR PRACTICING THE INVENTION

Referring to the drawings in general and to FIGS. 1 through 4, 11 and 12 in particular, a granular material vacuum dryer manifesting aspects of the invention and of the type broadly disclosed in U.S. Pat. No. 6,154,980 and in published U.S. patent application 2002-0024162-A1 is designated generally 10 and preferably includes a plurality of preferably (but this shape is not essential to practice of the invention) cylindrical canisters, preferably three, each of which has been designated generally 12. Each canister 12 preferably (but this shape is not essential to practice of the invention) includes a cylindrical shell 14 and is preferably substantially vertically-oriented, with the axis of the cylinder extending substantially vertically in order to be rotatable preferably unitarily (but such unitary movement is not essential to practice of the invention) with the other canisters about a substantially vertical axis defined by a preferably vertical (but this orientation is not essential to practice of the invention) shaft 24.

Figure 12:
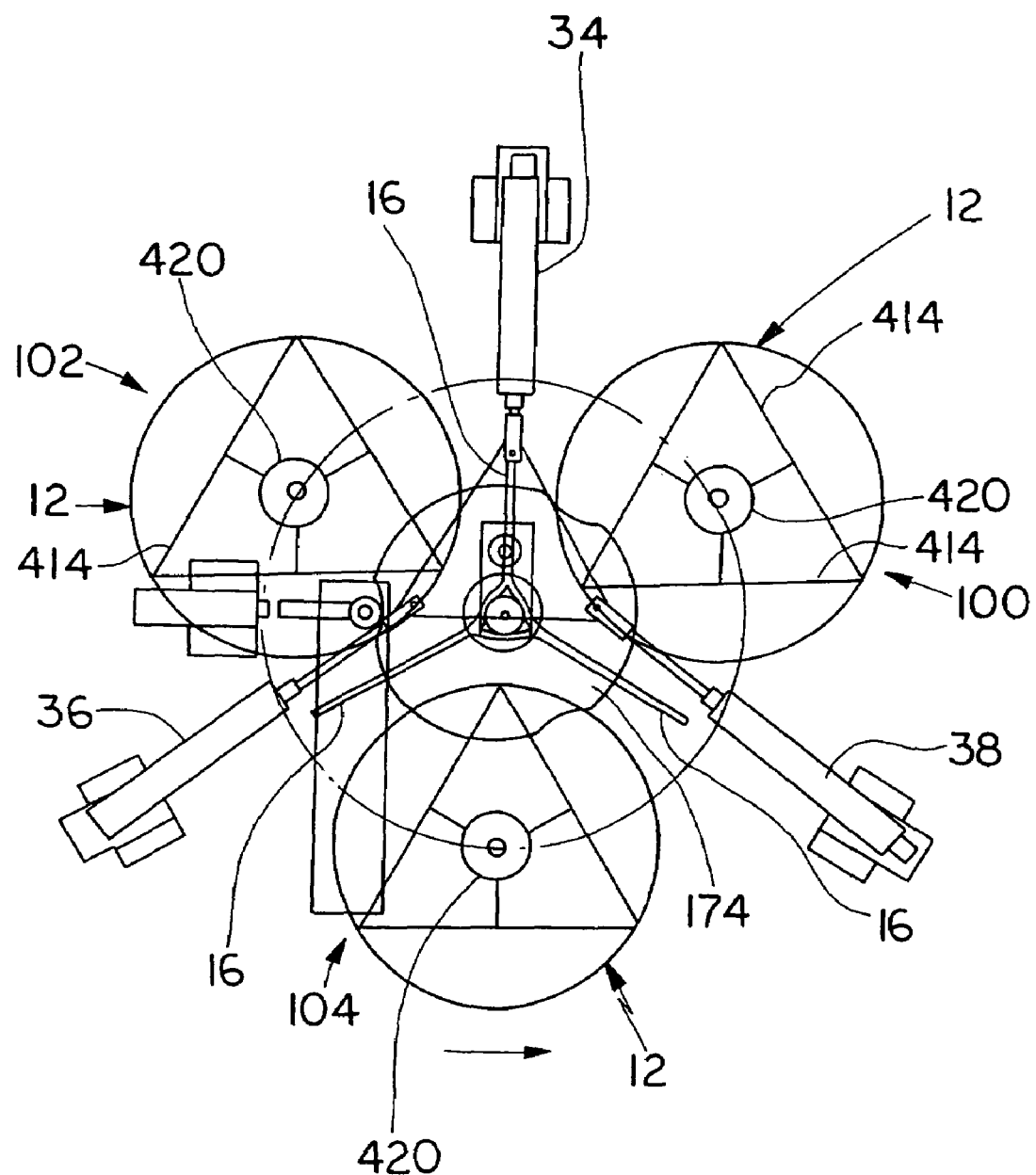
FIG. 12 is a schematic top view of a dryer of the general type illustrated in FIGS. 1 through 6 and 11 with certain parts deleted to enhance drawing clarity.

Dryer 10 includes a frame, designated generally 22, on and within which vertical shaft 24 is rotatably mounted for rotation relative to frame 22. Cylindrical canisters 12, rotate responsively to vertical shaft 24, preferably (but this is not essential to practice of the invention) moving serially among a heating position designated generally 100, a vacuum drying position designated generally 102 and a material inventory and discharge position designated generally 104 as indicated in FIG. 12. Canisters 12 move when and as required among filling/heating position 100, vacuum drying position 102 and inventory/discharge position 104. The three canisters 12 preferably start and stop together; they do not move continuously in a merry-go-round fashion among positions 100, 102 and 104. Arrow B in FIG. 12 indicates the direction of rotation of shaft 24.

While the invention is disclosed as utilizing three cylindrical canisters, each of which has been designated generally 12, the canisters need not be cylindrical but may be of any suitable shape. Similarly, the number of canisters or other containers is not limited to three; the invention may be practiced with a single canister, with two canisters or with more canisters than three. While three is the preferred number, the invention is not limited to three; the invention may be practiced very well utilizing two canisters and/or other containers of non-cylindrical shape.

Figure 2:
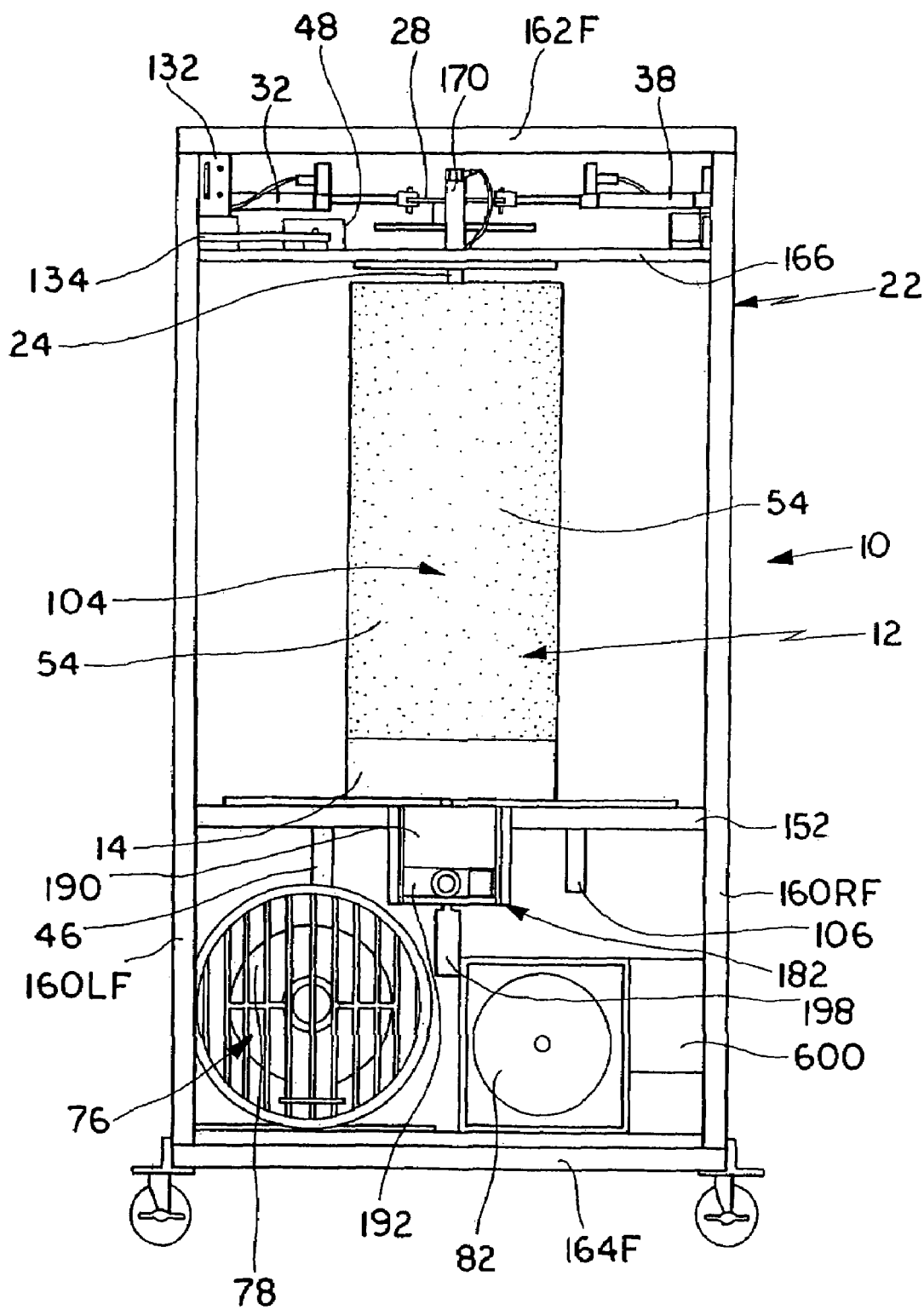
FIG. 2 is a front elevation of vacuum dryer apparatus of the type to which this invention relates, with the cabinet removed, with certain conduits not shown and only a single canister shown in order to enhance drawing clarity.

Referring principally to FIGS. 1 through 4, frame 22 is preferably formed of a plurality of preferably (but this is not essential to practice of the invention) vertically and preferably (but this is not essential to practice of the invention) horizontally extending preferably angle iron members which preferably collectively define a rectangular parallelepiped. As visible in FIGS. 2, 3 and 4, frame 22 preferably includes four substantially vertical members 160, two of which are visible in FIG. 2; the remaining two substantially vertical members 160 are hidden behind the two members 160 visible in FIG. 2 but are visible in FIGS. 3 and 4. Vertical members 160 are additionally sometimes identified in the drawings according to whether those vertical members are on the left side or the right side of the dryer considered from the front of the dryer and whether those vertical members are at the front or the rear of the dryer. For example, in FIG. 2, showing the dryer viewed from the front, the vertical member visible on the left side of the drawing is sometimes numbered 160LF, denoting vertical member 160 "Left Front". Similarly, the vertical member on the right side in FIG. 2 is sometimes numbered 160RF for "Right Front". The same convention applies to the vertical members 160 illustrated in FIGS. 3 and 4 where "LB" denotes "Left Back" and "RB" denotes "Right Back".

Figure 3:
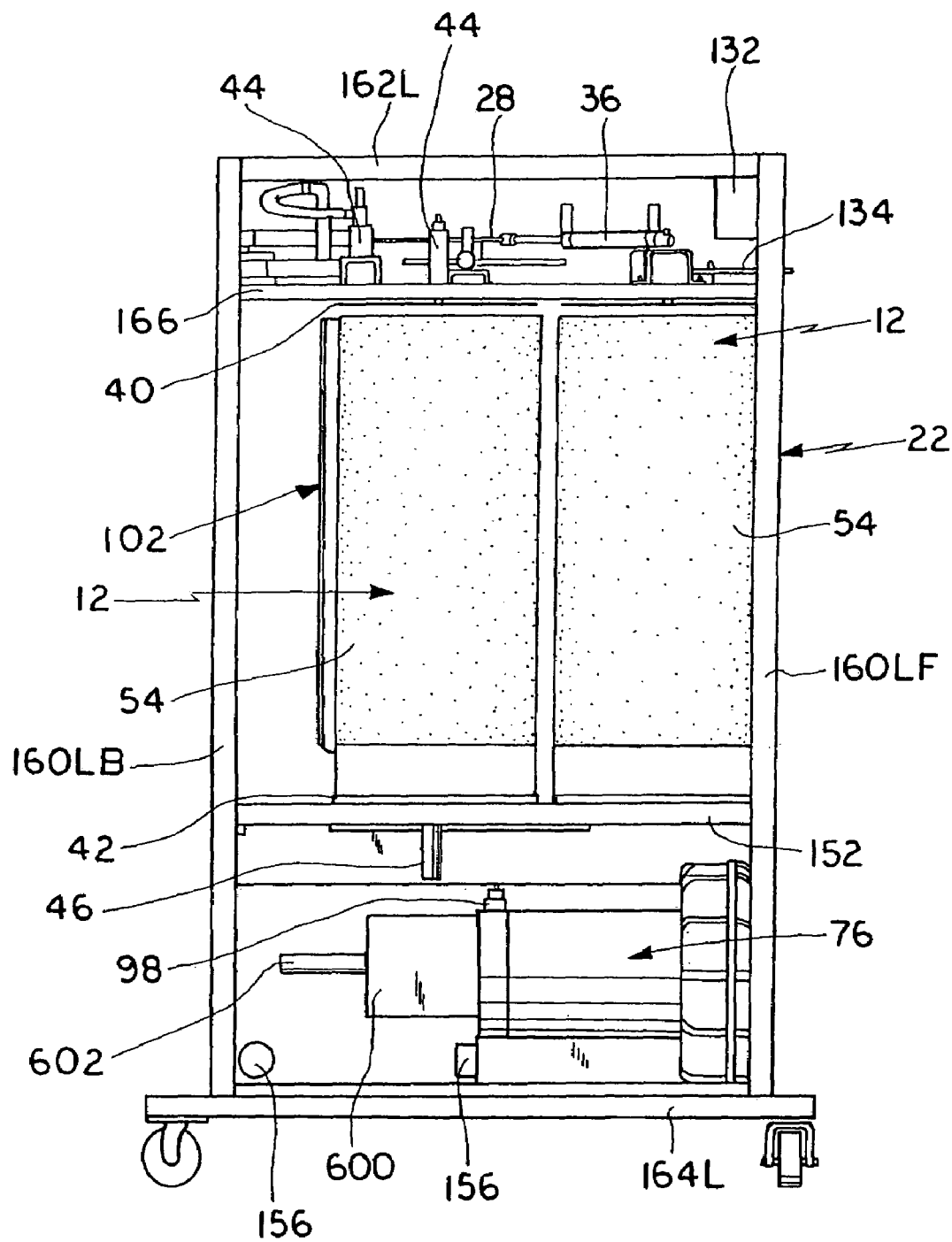
FIG. 3 is a left side elevation of the dryer apparatus illustrated in FIG. 2, with the cabinet removed and with certain conduits not shown to enhance drawing clarity.
Figure 4:
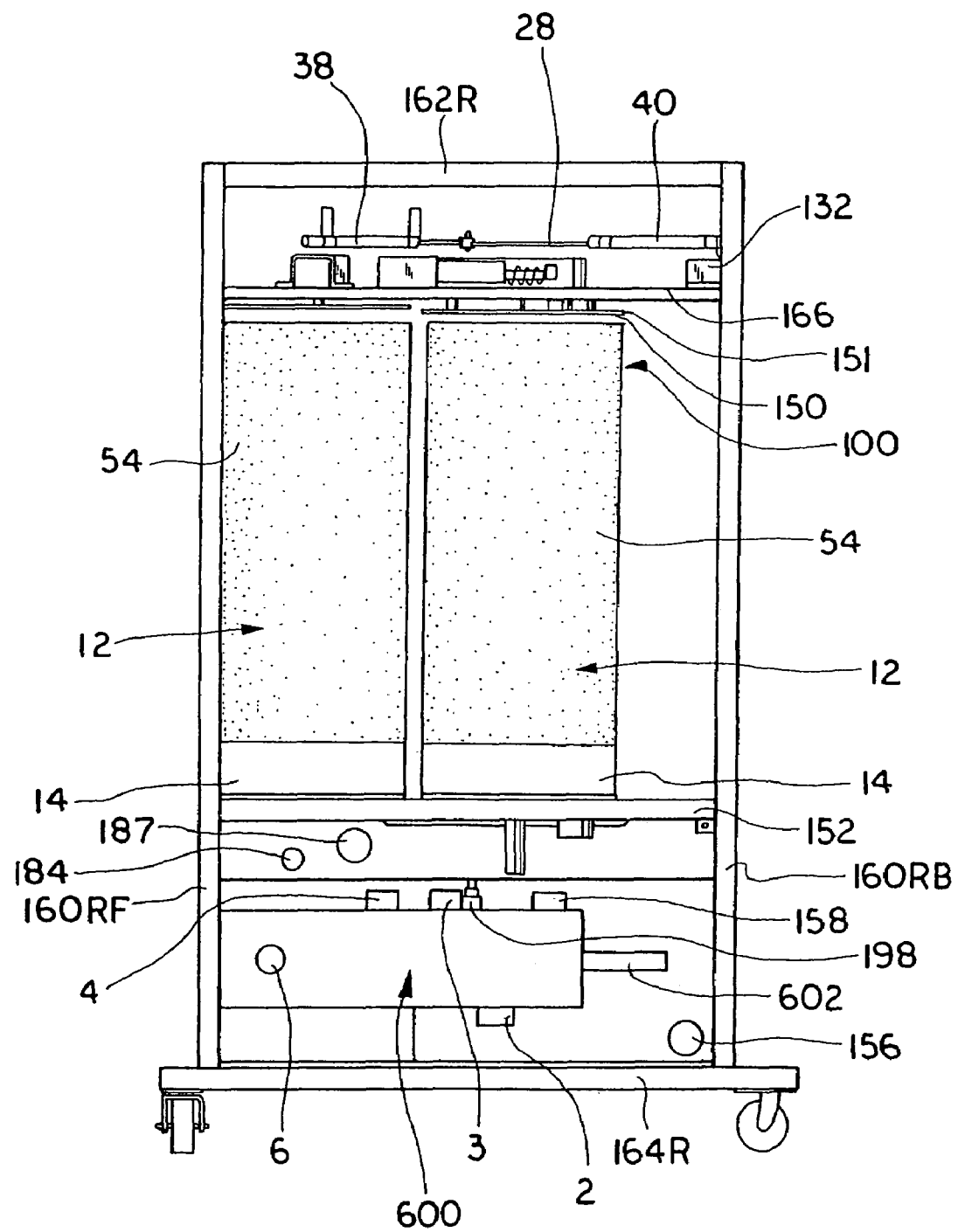
FIG. 4 is a right side elevation of the dryer apparatus illustrated in FIGS. 2 and 3, with the cabinet removed and with certain conduits not shown to enhance drawing clarity.

Frame 22 preferably further includes four upper horizontal members 162 which preferably collectively define the outer periphery of a rectangle in geometric terms; various ones of the four upper horizontal members 162 are visible in FIGS. 2, 3 and 4. Upper horizontal members 162 are additionally sometimes designated "L", "R", "F", and "B" for "Left", "Right", "Front", and "Back" respectively.

Frame 22 yet further preferably includes four lower horizontal members 164, various ones of which are visible in FIGS. 2, 3 and 4. Each of lower members 164 preferably (but this is not essential to practice of the invention) lies immediately under a corresponding upper horizontal member 162 as illustrated in FIGS. 2, 3 and 4. The four lower horizontal members 164 preferably define a base of frame 22 for contacting a floor or other weight supporting structure on which dryer 10 rests or may be of extended length for mounting of wheels as illustrated in FIGS. 2, 3 and 4. Lower horizontal members 164 are sometimes additionally designated "L", "R", "F", and "B", for "Left", "Right", "Front", and "Back" respectively.

A preferably horizontal suspension plate 166 is part of frame 22 and preferably (but this is not essential to practice of the invention) extends laterally across an upper portion of dryer 10, below upper horizontal members 162. Suspension plate 166 is illustrated in FIGS. 2, 3 and 4 and serves as mounting structure for various components. A canister top sealing preferably pneumatic piston-cylinder combination designated generally 44, serving to seal the top of a canister 12 at vacuum drying position 102, may be mounted on horizontally extending suspension plate 166 as illustrated in FIG. 3. Similar preferably pneumatic piston-cylinder combinations are provided for sealing the tops of the canisters when located at the filling/heating position and at the inventory/discharge position. The canisters are retained in the sealed disposition as much as possible during operation of the apparatus and practice of the drying methods in order to preclude humid air entry into the areas where resin is located.

Figure 11:
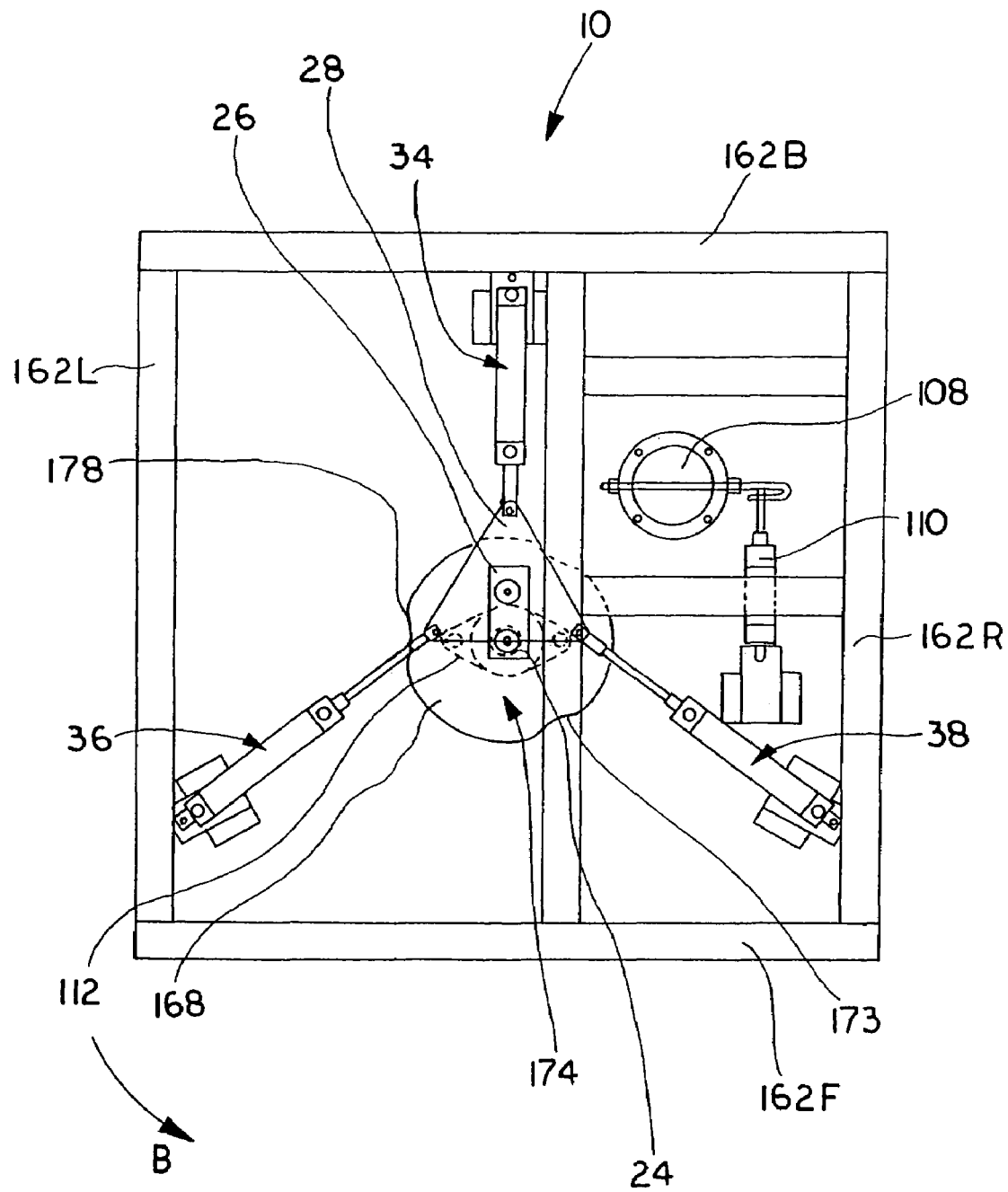
FIG. 11 is a top view of a dryer of the type illustrated in FIGS. 1 through 6 without a cabinet.

First, second and third driving rotation pneumatically actuated piston-cylinder combinations 34, 36, 38 are preferably (but this is not essential to practice of the invention) pivotally connected to suspension plate 166 as illustrated in FIGS. 2, 3, 4, 11 and 12. Connections of driving rotation piston-cylinder combinations 34, 36 and 38 to plate 166 forming a part of frame 22 are preferably (but this is not essential to practice of the invention) pivotal and denoted as connections 180 in the drawings; pivotal connections 180 are preferably (but this is not essential to practice of the invention) in a common plane on plate 166. Unnumbered rods of piston-cylinder combinations 34, 36, 38 are connected at their extremities remote from the associated cylinder to triangular plate 28 as illustrated in FIGS. 11 and 12.

Connection of a generally triangular plate 28 with vertically-oriented shaft 24 is preferably (but this is not essential to practice of the invention) effectuated by means of a rectangular link 26 which is preferably (but this is not essential to practice of the invention) horizontally elongated and preferably resides rotatably in a suitable bearing surface within a circular aperture formed at the center of generally triangular plate 28, as illustrated in FIGS. 11 and 12. Rectangular link 26 is preferably (but this is not essential to practice of the invention) fixedly connected to vertical shaft 24 at the upper end thereof.

FIG. 11 is a top view of dryer 10 showing the structural connections of first, second and third driving rotation piston-cylinder combinations 34, 36, 38 and the associated structure which results in rotation of shaft 24 upon actuation of one of piston-cylinder combinations 34, 36, 38.

Each piston-cylinder combination 34, 36, 38 is affixed to one vertex of a triangular plate 28. Triangular plate 28 is in turn pivotally connected to a rectangular or longitudinally elongated pin-like extension 26 which, while shown in solid lines for purposes of drawing clarity, will be understood to be positioned below triangular plate 28.

Pin-like extension 26 is secured at a portion thereof, remote from the position of securement to triangular plate 28, to vertical shaft 24. As a result, upon preferable pneumatic actuation of one of piston-cylinder combinations 34, 36, 38 with retraction of the associated piston-shaft resulting, such as illustrated for piston-cylinder combination 34 in FIG. 11, vertical shaft 24 rotates one hundred twenty degrees (120°). In FIG. 11, once piston-cylinder combination 36 actuates to withdraw the piston rod portion of that piston-cylinder combination into the cylinder, this results in counterclockwise rotation of shaft 24 through an angle of one hundred twenty degrees (120°) thereby moving canisters 12 in an indexing fashion to the next successive one of heating/filling position 100, vacuum drying position 102 and inventory/discharge position 104.

Piston-cylinder combinations are rotatably mounted, as depicted in FIG. 11, on suspension plate 166. The piston-cylinder combinations are preferably pneumatically actuated; it is also within the purview of the invention to use electrically actuated or hydraulically actuated piston-cylinder combinations or other means, such as solenoids, to provide suitable linear or rotary motion to effectuate rotation of shaft 24.

Still referring to FIG. 11 and to FIG. 12 as well, dryer 10 preferably (but this is not essential to practice of the invention) includes a locking cam 174 in the form of a flat-plate having three lobes 179 where adjacent lobes meet at concave vertices designated 173 in FIG. 11. For drawing clarity, not all vertices 173 and not all lobes 179 have been numbered.

Locking cam 174 is fixedly connected to shaft 24 and rotates unitarily therewith. A locking arm 175 is mounted on suspension plate 166 and is movable pivotally, about a point of pivotal motion denoted P in FIG. 11, responsively to a piston-cylinder combination 176 also mounted on suspension plate 166. A roller serving as a cam follower 178 is mounted on carousel locking arm 175 and is rotatable about a vertical axis. Cam follower 178 fits against the outwardly projecting radially extending edge of locking cam 174 and rides along convex lobes 179 and concave vertices 173 defining the radially outboard surface of locking cam 174.

When it is desired to lock carousel 21 against rotational movement, piston-cylinder combination 176 is actuated, preferably at the next occurrence of cam follower 178 residing against a concave vertex 173. With piston-cylinder combination 176 actuated in this manner, force exerted by piston-cylinder combination 176 against a concave vertex 173 of locking cam 174 via cam follower 178 precludes rotational motion of cam 174 and hence precludes rotation of shaft 24 and carousel 21 carried thereby.

A limit switch position adjusting roller 177 is preferably eccentrically mounted on an unnumbered shaft, which is affixed to and extends perpendicularly relative to suspension plate 166, and is positioned for actuating a limit switch carried by locking arm 175. The limit switch is denoted by dotted lines and is numbered 168 in FIG. 11. Since limit switch position adjusting roller 177 is eccentrically mounted on its associated unnumbered shaft, rotation of limit switch position adjusting roller 177 about its axis serves to adjust the limit of arcuate motion of locking arm 175. Contact of the limit switch against position adjusting roller 177 sends a signal from the limit switch to the dryer microprocessor, which controls essentially all operations of the dryer, indicating that actuation of piston-cylinder combination 176 has effectuated locking against rotational movement.

With this arrangement, movement of triangular plate 28, as effectuated by any of first, second or third driving rotation piston-cylinder combinations 34, 36 or 38, results in rectangular link 26 translating such motion to vertical shaft 24, resulting in shaft 24 rotating. As vertical shaft 24 rotates, it carries canisters 12 among filling/heating position 100, vacuum drying position 102 and inventory/discharge position 104 as depicted schematically in FIG. 12. Canisters 12 move this way unitarily with shaft 24 as a result of canisters 12 being carried by shaft 24, being connected thereto by bolting to an equilateral Y-shaped bracket, shown in FIG. 12 as item 16. Each one of piston-cylinder combinations 34, 36 and 38 preferably actuates only to withdraw the associated piston rod into the cylinder of the piston-cylinder combination. Withdrawal of the piston rod into the cylinder of a given piston-cylinder combination 34, 36 or 38 rotates shaft 24 through an angle of 120°.

When any one of piston-cylinder combinations 34, 36 and 38 is energized, the remaining two piston-cylinder combinations are de-energized; this control is effectuated by the microprocessor actuating solenoid valves which in turn control flow of pressurized air to piston-cylinder combinations 34, 36 and 38 and to other piston-cylinder combinations associated with the vacuum dryer. The solenoid valves are pneumatically connected to appropriate ones of the piston-cylinder combinations via flexible plastic tubing. The tubing, solenoid valves and microprocessor have not been substantially illustrated in the drawings to aid drawing clarity The piston-cylinder combinations are desirably spring-biased to return to a desired default position when not pneumatically actuated.

Shaft 24 or equivalent structure is preferably journaled in suitable bearings mounted on upper shaft suspension 112. Upper shaft suspension 112 is preferably connected to horizontally extending suspension plate 166 by suitable nut and bolt combinations which have not been numbered. A lower shaft support bearing preferably in the form of a shouldered plate 114 is mounted on lower horizontal framing cross member 165 as shown in FIG. 5, and is secured in place by suitable nut and bolt combinations or by adhesive; such securing means have not been shown or numbered in the drawings. Shaft 24 rides rotatably on shouldered plate 114 which is preferably bearing-grade plastic.

FIG. 1 illustrates that dryer 10 may be housed within a cabinet 11 having a door 13. Within cabinet 11 are a plurality of canisters 12, one of which is visible in FIG. 1, preferably a blower 76, preferably an air filter 82 and other components.

First and second driving rotation piston-cylinder combinations 34, 36 are illustrated at the top of cabinet 11 above a horizontal suspension plate 166.

A contact switch 132 is mounted at the position illustrated in FIG. 1 and senses whether door 13 is closed or open. When door 13 is open, contact switch 132 preferably sends a signal to the microprocessor controlling operation of dryer 10 with such signal serving to disable the dryer moving parts from any motion thereby providing a safety feature.

There is further illustrated in FIG. 1 a triangular template 134 that is manually moveable and fits over a manual switch serving as an interlock for the pneumatic piston-cylinder combinations 170 and 198. Triangular template 134, when moved by an operator after opening the dryer cabinet door 13, throws a manual switch disabling the pneumatic circuitry for piston-cylinder combinations 170 and 198 thereby enabling an operator safely to service the dryer as needed. Reverse manual movement of template 134 by an operator (or the action of closing door 13 if the operator forgets to move template 134 back to the operating position) moves template 134 back into position whereby template 134 throws a switch serving to reactuate the pneumatic drive circuit for piston-cylinder combinations 170 and 198.

A valve is preferably provided within and at the bottom of each canister 12, preferably in a canister discharge aperture 144. The valve is preferably operated at inventory/discharge position 104 by a piston-cylinder combination 170 mounted on horizontally extending suspension plate 162 located above inventory/discharge position 104 when a canister 12 is at position 104 as shown in FIG. 2.

Details of one embodiment of a canister 12 are illustrated in FIG. 13 in which cylindrical shell 14 is shown in vertical section with tube 52 forming a single walled shell 14. A canister discharge valve stem shaft 400 runs vertically the length of canister 12 and is coincident with the cylindrical axis thereof. Canister 12 further preferably includes an apertured plate 404, positioned transversely with respect to the cylindrical axis, located within canister 12 proximate canister lower end 426. Canister 12 further preferably includes an axially displaceable discharge valve cylinder 406 which is moveable unitarily with shaft 400 from the position illustrated in solid lines to the position illustrated in dotted lines in FIG. 13. When discharge valve cylinder 406 is in the upper position illustrated in solid lines, canister dispense valve 20 is closed.

Figure 7:
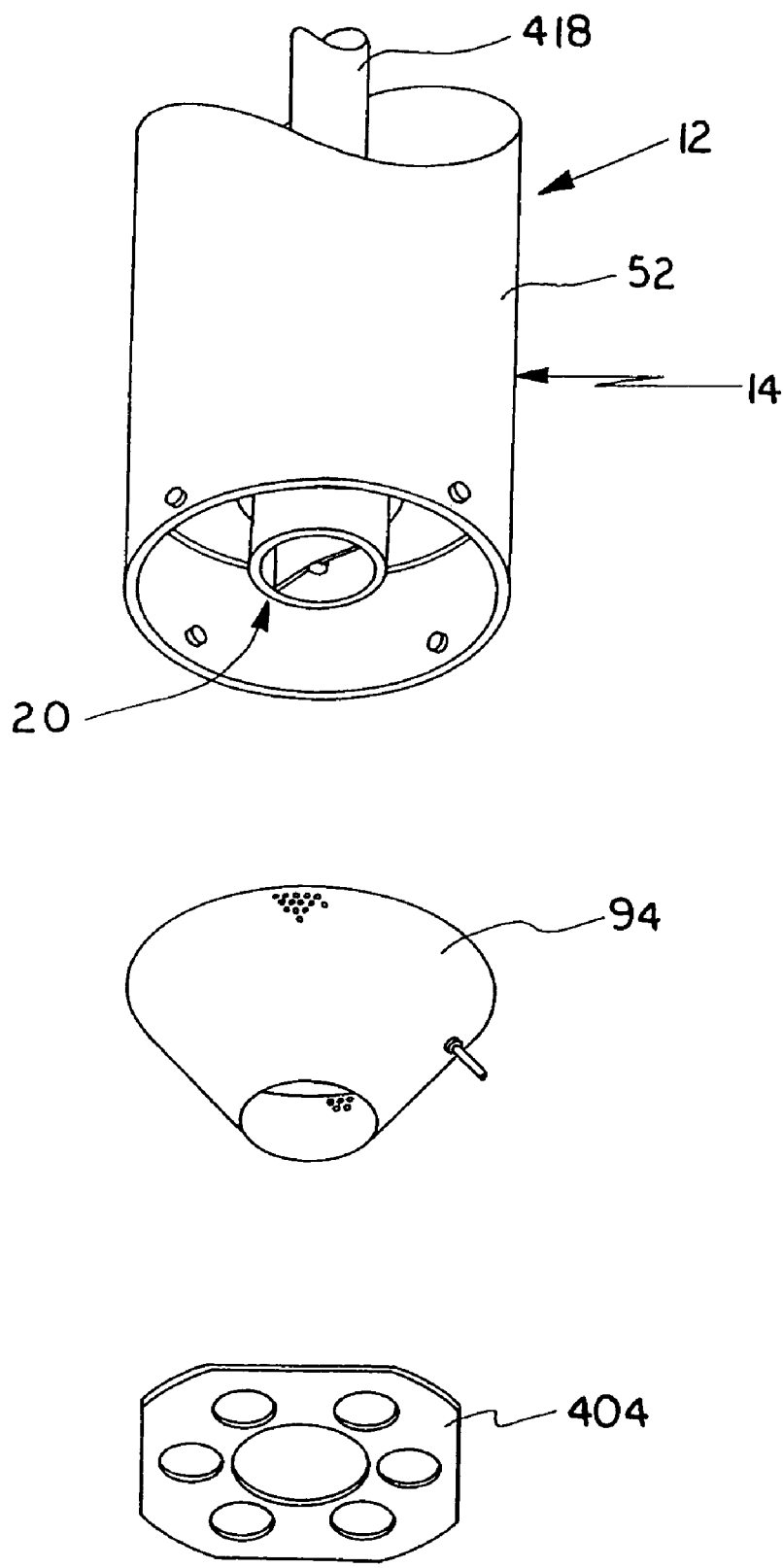
FIG. 7 is an exploded broken isometric view of the bottom portion of a canister suitable for use in a dryer of the general type illustrated in FIGS. 1 through 6.

The curved cylindrical wall of discharge valve cylinder 406 fits closely within a central aperture 405 of plate 404 illustrated in FIGS. 7 and 13. Perforate downwardly opening funnel 94 fits at its narrow end against plate 404 just outside the periphery of central aperture 405. Hence, granular material within canister 12 is vertically supported by perforate downwardly opening funnel 94 and cannot escape therefrom through the central opening since such central opening 405 is occupied by the axially displaceable discharge valve cylinder 406.

At this valve closed position, an upper end of axially displaceable discharge valve cylinder 406 fits closely against and is covered by a canister discharge valve umbrella 422 which is preferably fixedly connected to an internal heat tube 418 within canister 12 such as illustrated in FIGS. 18, 28, 29, 37 and 38. As a result of this geometric configuration, granular material within canister 12 rests on perforate funnel 94, on discharge valve umbrella 422 and against the curved exterior surface of valve cylinder 406. No downward flow of such material can occur so long as axially displaceable discharge valve cylinder 406 is in the upper position illustrated in solid lines in FIG. 13, since material cannot flow downwardly through the interior of valve cylinder 406 and the curved exterior wall of valve 406 fits closely with and preferably contacts plate 404. Slope of the top surface of the granular resin material in canister 12 and elsewhere is limited by the angle of repose for the particular granular resin or other material being processed.

When it is desired to discharge material from a canister 12, while canister 12 is at the inventory/discharge position, actuation of piston-cylinder combination 170 lowers canister lid 172 at inventory position 104 into contact with the upper surface of canister 12. As a result, canister lid 172 and specifically the piston rod of piston-cylinder combination 170 interferingly contacts the upper end of canister discharge valve stem shaft 400, forcing shaft 400 downwardly considering FIG. 13. Downward movement of shaft 400 results in downward movement of axially displaceable discharge valve cylinder 406, moving the open top portion of axially displaceable discharge valve cylinder 406 away from canister discharge valve umbrella 422. This permits flow of granular material, which is within canister 12 and supported by perforate downwardly opening funnel 94, through the open interior of axially displaceable discharge valve cylinder 406 and downwardly out of canister 12.

When it is desired to stop material flow out of canister 12 at inventory/discharge position 104, piston-cylinder combination 170 is de-energized whereupon a spring component of piston-cylinder combination 170 causes the piston portion thereof to retract thereby lifting canister lid 172. This releases canister discharge valve stem shaft 400, permitting shaft 400 to move upwardly in FIG. 13. A spring within housing 420 urges shaft 400 upwardly until the upper portion of axially displaceable discharge valve cylinder 406 once again contacts the lower interior of canister discharge valve umbrella 422 thereby positioning the curved surface of valve cylinder 406 for blocking any additional flow of granular material downwardly out of canister 12. Housing 420 is retained in position by three gussets 414 connecting housing 420 to the shell 14 of canister 12.

A major advantage provided by the design of canister dispense valve 20 is that valve 20 is not prone to jamming in an open or closed position due to particulate granular material being caught in the moving parts thereof. The sliding action of the cylindrical wall of axially displaceable discharge valve cylinder 406 against the corresponding annular wall of aperture 405 in plate 404 means that there is no space between these two moving parts into which granular material can easily fall and thereby jam the valve. Desirably, some portion of the curved exterior of discharge valve cylinder 406 remains in sliding, facing contact with the annular wall of aperture 405 in plate 404 at all times, whether the valve is open or closed. This operation is illustrated in FIGS. 26 and 27.

Figure 6:
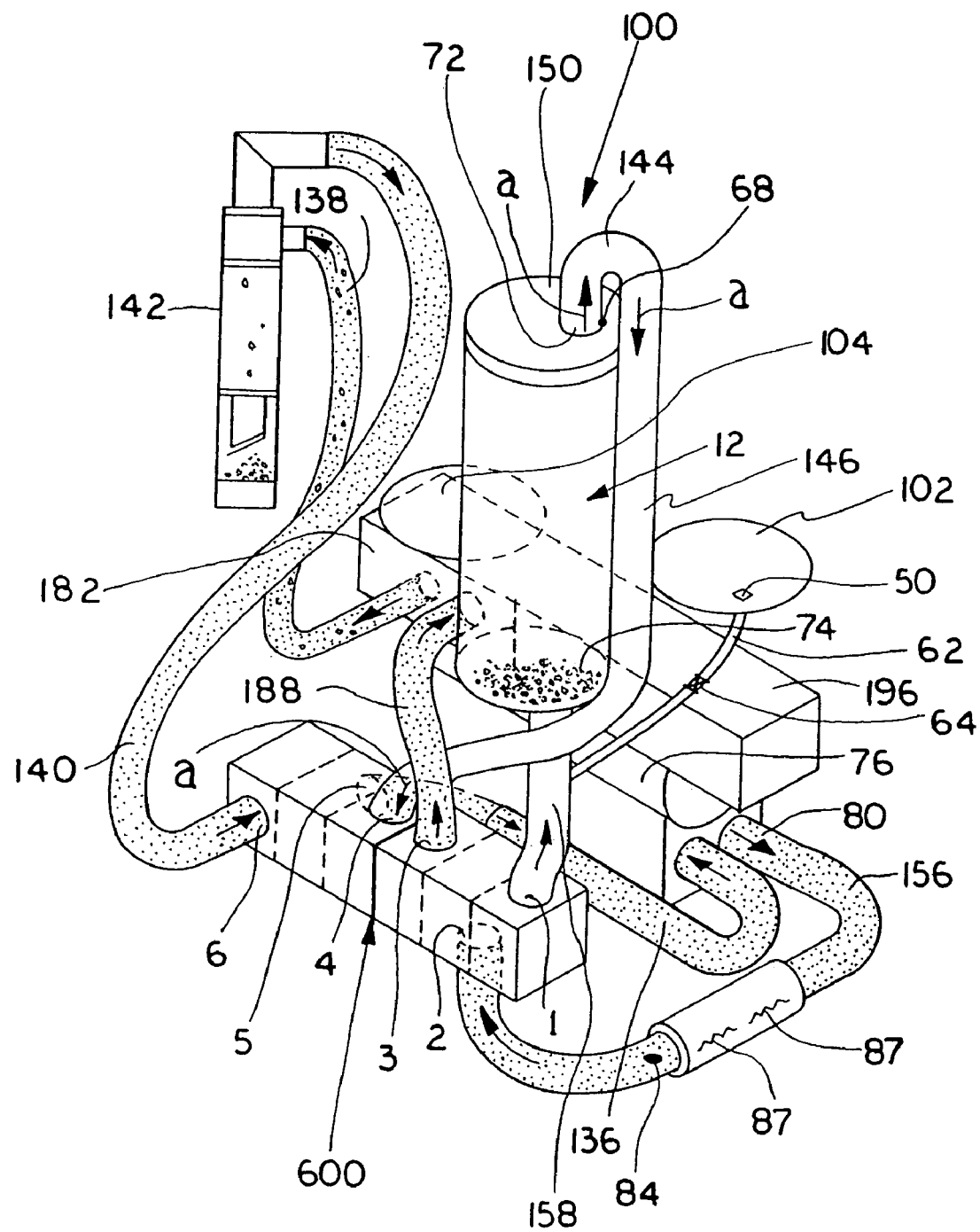
FIG. 6 is a schematic isometric depiction of one pattern of air flows in a dryer in accordance with FIGS. 2 through 5 supplying material for use by a process machine such as a molding press or an extruder, with the dryer being in the material delivery mode, with active air flows denoted by stippling.

Referring to FIGS. 2 through all of FIGS. 6 and 12, at filling/heating position 100 a canister 12 preferably receives a supply of moist granular or powdery material to be dried.

As shown in FIG. 4, mounted on the lower side of suspension plate 166 and positioned to fit against the outer periphery of the canister top is a preferably circular plate structure 150, which is movable vertically and actuated by a piston-cylinder combination. An annular lip portion 151 of plate structure 150 fits about the circular periphery of a canister 12 at filling/heating position 100. An aperture within plate structure 150 leads to a feed container or funnel, which facilitates material flow from a material fill hopper 500, illustrated in FIG. 14, or some equivalent structure positioned on the top of dryer 10 or elsewhere, to the interior of a canister 12 at filling/heating position 100.

The configuration of circular plate structure 150, annular lip portion 152 and the relationship thereof with the circular periphery of the canister 12 at heating position 100 is illustrated in FIG. 4.

A canister 12 arrives at filling/heating position 100 by being moved to that position by rotation of vertical shaft 24 in response to motion of one of first, second and third driving rotation piston-cylinder combinations 34, 36 and 38.

As illustrated schematically in FIG. 6, at filling/heating position 100, a blower 76 facilitates circulation of heated air through material 74 resident within canister 12 to heat material 74. Blower 76 has an intake aperture 78 and an exhaust aperture 80. Exhaust aperture 80 connects to conduit 156 within which are located a plurality of heater elements 87 to heat air from blower 76 prior to flow through material within canister 12.

Referring to FIG. 5, a pneumatic piston-cylinder combination 106 is preferably mounted on a lower cross-member 152, forming a part of frame 22. When actuated, piston-cylinder combination 106 serves to close the bottom of canister 12 at filling/heating position 100 by moving a filling/heating position bottom sealing plate 86 vertically upwardly thereby effectuating a tight seal between plate 86 and canister 12 at filling/heating position 100 to facilitate passage of heated air through granular or powdery material in canister 12.

Filling/heating position bottom sealing plate 86 preferably further includes a canister presence sensor 153 as illustrated in FIG. 5. Sensor 153 detects the presence of a canister 12 in position on filling/heating position bottom sealing plate 86. If no canister is sensed as present, canister presence sensor 153 sends a signal to the microprocessor which, as a result of logic programmed thereinto, precludes any downward flow of granular resin material to be heated at position 100 by actuating a piston-cylinder combination 110 controlling a valve 108 mounted in suspension plate 166 above filling/heating position 100, as illustrated in FIG. 11.

When valve 108 is actuated, no material can pass downwardly therethrough from a feed hopper above dryer 10 or from any other structure into space defining heating position 100.

Filling/heating position bottom sealing plate 86 preferably further includes a preferably screened aperture 154, illustrated in FIG. 5, for passage of heated air therethrough either upwardly or downwardly through a canister 12 when positioned on filling/heating position bottom sealing plate 86. Aperture 154 is connected to the exhaust outlet of blower 76 via a series of conduits with conduit 158 being directly connected to heated air aperture 154 as illustrated in FIG. 6 and as referenced in FIG. 16.

Still referring to FIG. 5, lower cross member 152 is fixedly mounted between two intermediate horizontally extending cross members 155.

Heated air, having passed through granular or powdery material within canister 12, exhausts from canister 12 at the upper end thereof. Filling/heating position bottom sealing plate 86 fits tightly against the bottom of canister 12 at heating position 100 and canister 12 is sealed at the top when located at heating position 100 due to plate structure 150 fitting against the upper edge of canister 12.

Figure 6A:
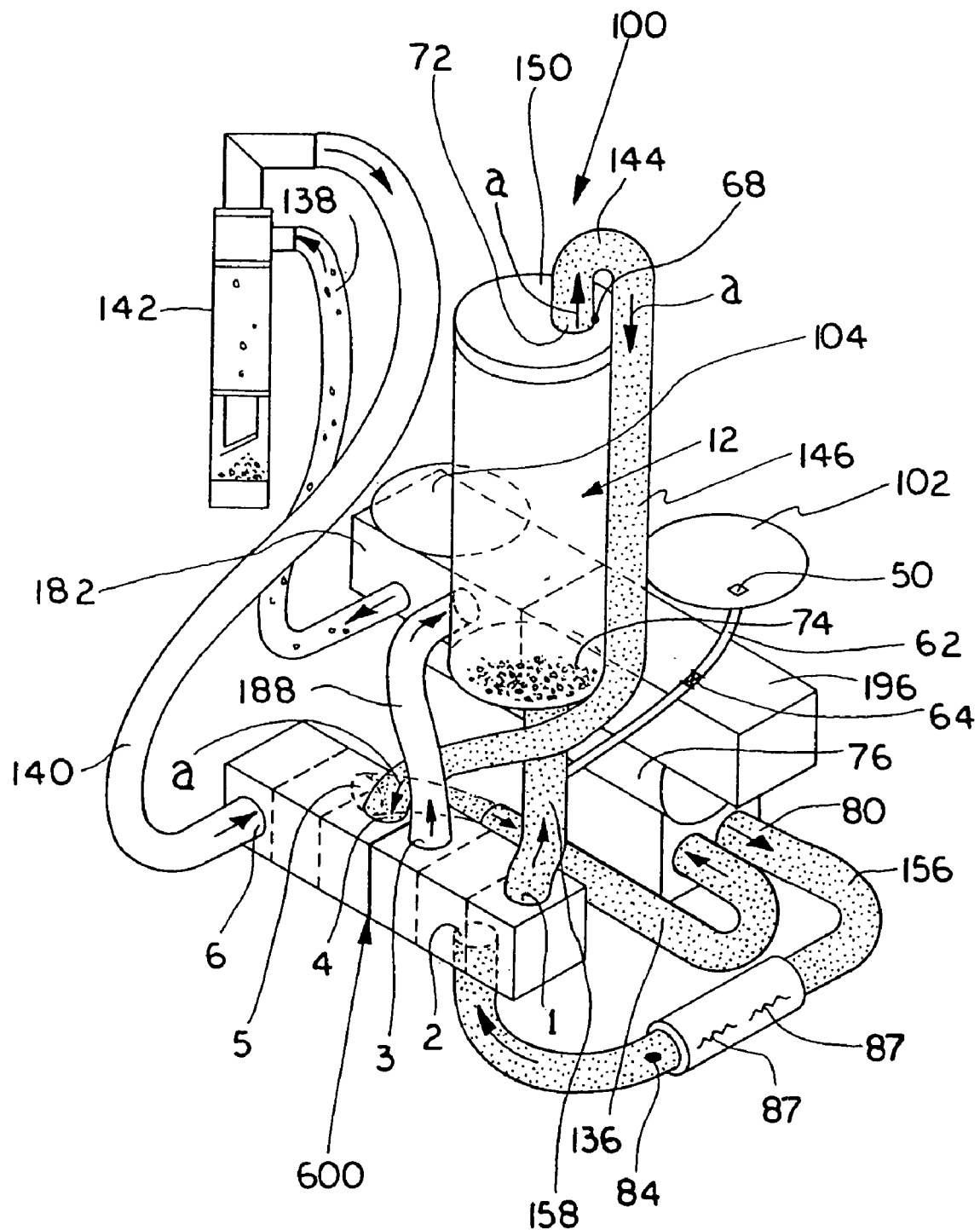
FIG. 6A is a schematic isometric depiction of one pattern of air flows in a dryer in accordance with FIGS. 2 through 5 supplying material for use by a process machine such as a molding press or an extruder, with the dryer operating with air flows in the material heating mode, with active air flows denoted by stippling, where the heating air flow is vertically upward through the granular resin material to be dried.

Referring to FIGS. 6 and 6A, a discharge conduit 144 is connected tightly to an aperture in plate structure 150 for passage therethrough of heated air exiting from canister 12 in heating position 100 after the heated air has passed through the moist granular or powdery resin material within canister 12. Discharge conduit 144 preferably leads to a duplex pneumatic valve box 600 shown at the bottom of FIGS. 6 and 6A and illustrated in FIGS. 15 and 16. Direction of air flow within discharge conduit 144 from canister 12 at heating position 100 to duplex pneumatic valve box 600 is indicated by arrows "a" in FIG. 6A. Pneumatic valve box 600 is referred to as a "duplex" pneumatic valve box because box 600 has two valves therein which operate simultaneously off of a single pneumatically-actuated shaft. Separate, independently operating valves or separate valves operating in coupled fashion could also be used.

As shown in FIGS. 6 and 6A, a first thermocouple 68 preferably positioned at the inlet 72 to discharge conduit 144 senses temperature of heated air leaving canister 12 at heating position 100. A second thermocouple 84 is preferably positioned in the blower outlet supplying heated air coming from blower 76, downstream from the blower at a position in conduit 156 after the air has passed along heating elements 87. When the temperatures sensed by thermocouples 68 and 84 are substantially equal, this is indicative of the granular or powdery resin material within canister 12 having reached the desired temperature, which typically but not necessarily is the selected temperature of the air entering canister 12 after having been heated to the desired level, preferably by heating elements 87. Typically, in the case of granular resin being dried preparatory to injection molding, the temperature of the heated air being introduced into the granular resin when the resin is in a canister at the filling heating position may be on the order of up to about three hundred degrees Fahrenheit (300° F.) with the desired temperature of the resin at the completion of the heating period also being up to about three hundred degrees Fahrenheit (300F). Of course, the desired temperature is a function of the particular material being dried.

Figure 6B:
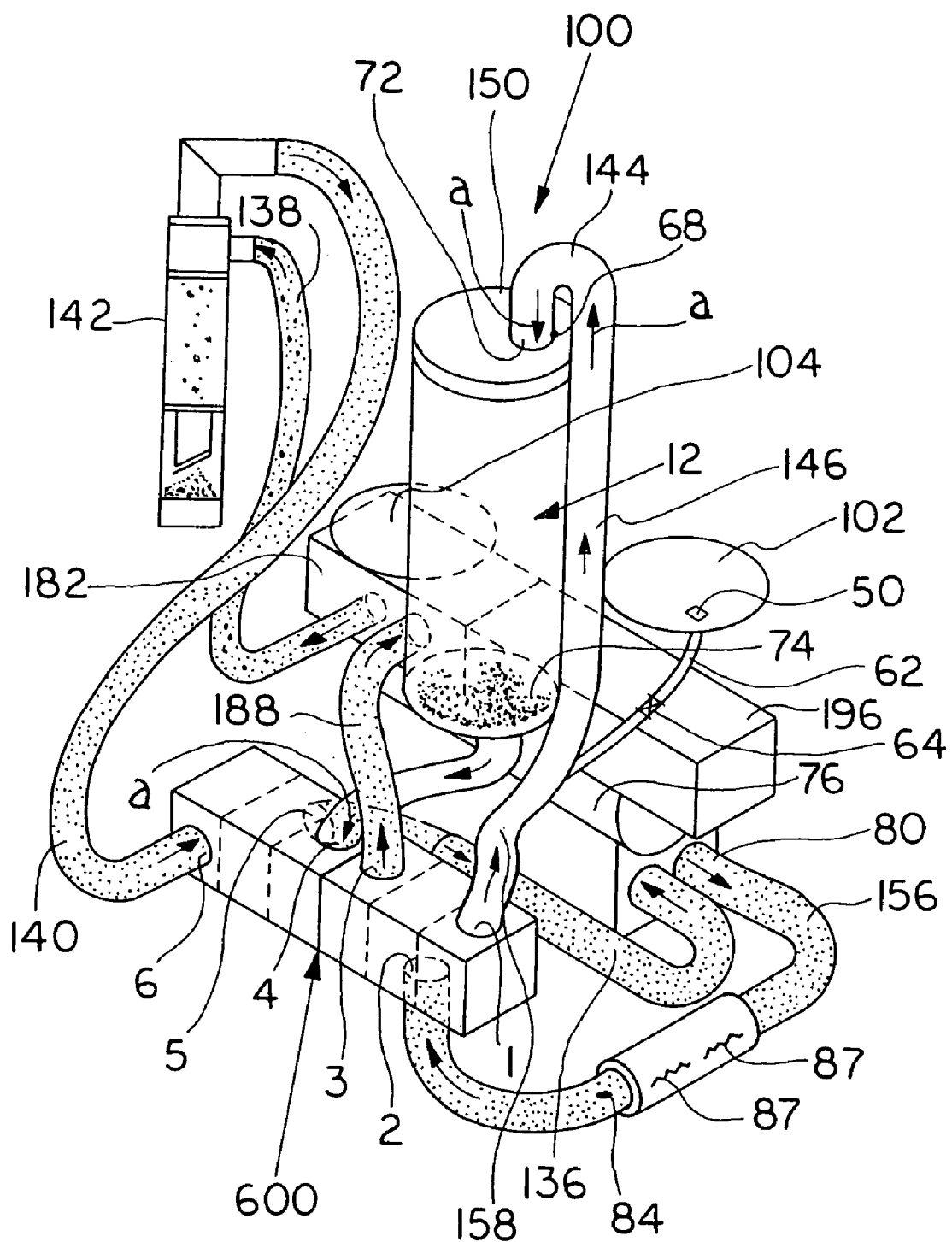
FIG. 6B is a schematic isometric depiction, similar to FIG. 6, of a second pattern of air flows in a dryer in accordance with FIGS. 2 through 5 supplying material for use by a process machine such as a molding press or an extruder, with the dryer being in a material delivery mode, with active air flows denoted by stippling.
Figure 6C:
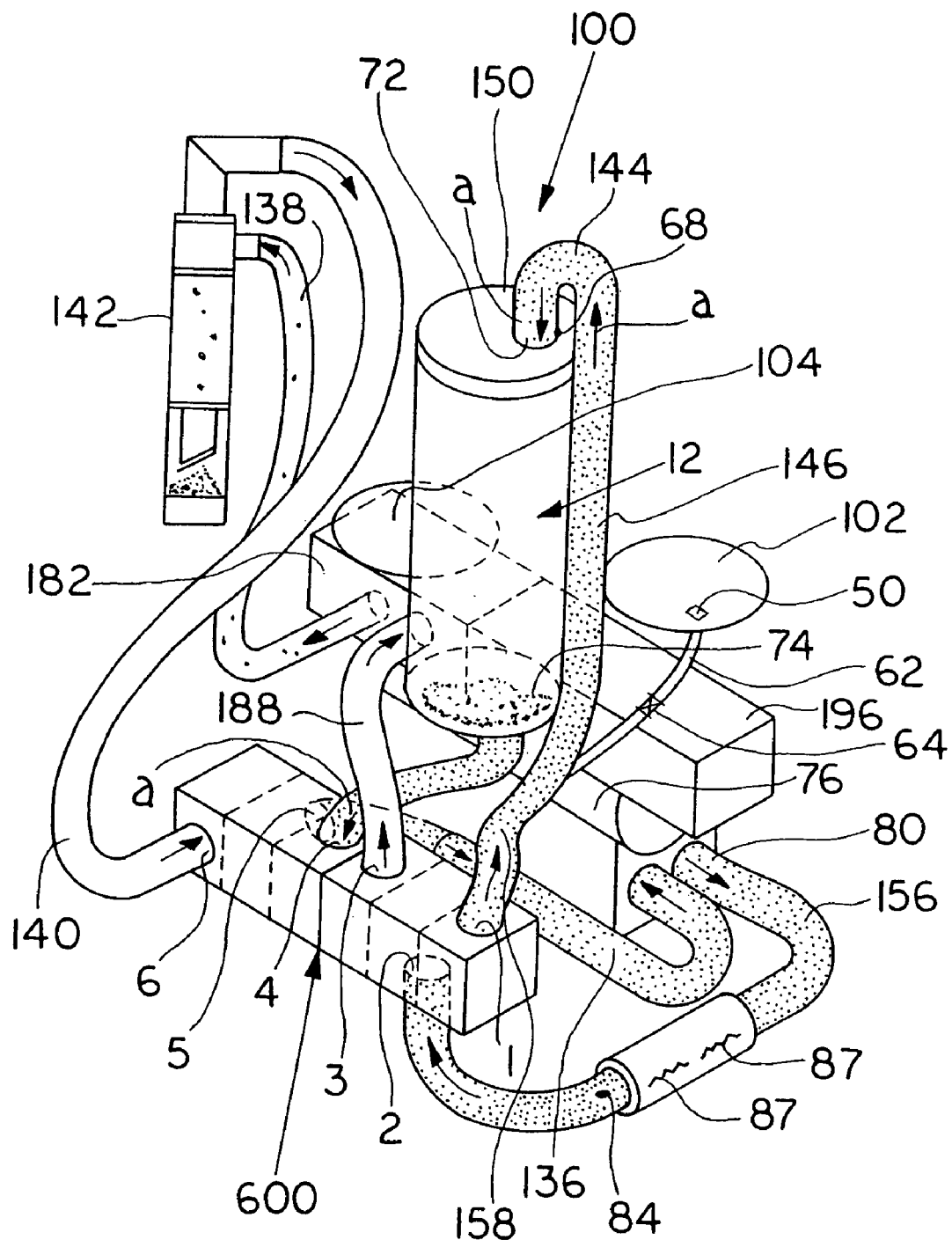
FIG. 6C is a schematic isometric depiction, similar to FIG. 6A, of a second pattern of air flows in a dryer in accordance with FIGS. 2 through 5 supplying material for use by a process machine such as a molding press or an extruder, with the dryer operating in the material heating mode, with active air flows denoted by stippling, where the heating air flow is vertically downward through the granular resin material to be dried.

As shown in FIGS. 6B and 6C, the configuration of the conduits leading to and from canister 12 in the filling/heating position may be reversed from the positions illustrated in FIGS. 6 and 6A, to provide downward heating air flow, rather than upward heating air flow, through the granular resin material being heated. Downward heating air flow is often desirable to avoid "popcorning" of the material being heated. "Popcorning" may lead to uneven heating of the granular resin or other granular or powdery material being heated since the popcorning results in channels developing through the material being heated.

As one or more such channels develop, the heating air, seeking the path(s) of least resistance through the granular resin in the canister, finds the channel(s) and tends to flow through one or more of the channels, rather than around the individual granules of resin material. As less heating air flows around some of the individual granules of resin material, those granules experience less heating. As a result those granules are slower to reach the desired temperature and, in some instances, may not reach the desired temperature in any reasonable time, and certainly not within the time the other granules reach the desired temperature. In such case, either the entire process must be slowed or there is a risk that portions of the granular resin or other material might not dry sufficiently when exposed to vacuum during that portion of the process.

Material which is excessively moist, i.e. insufficiently dry, often will not mold or extrude properly. Uniform heating of the granular resin is important to the drying process and to the subsequent molding or extrusion process.

It is within the purview of the invention to provide a switching manifold so that a single vacuum dryer in accordance with the invention may provide, optionally, either heating air flow upwardly through the granular resin being heated prior to drying or downward air flow through the granular resin being heated prior to drying. Such downward air flow through the resin prior to drying is depicted in FIG. 6C.

Illustrated in FIG. 5 is a canister bottom sealing plate 42 located at vacuum drying position 102. Plate 42 is mounted on lower cross member 152 for movement in a manner similar to that of filling/heating position bottom sealing plate 86. Canister bottom sealing plate 42 at vacuum position 102 is actuated by a piston-cylinder combination 46, which is connected to lower cross member 152 and is visible in FIG. 5.

Further illustrated in FIG. 5 is shoulder plate 114, which is fixedly connected to lower cross member 152 and serves as a bearing surface supporting vertical shaft 24 as shaft 24 rotates, carrying canisters 12 among the filling/heating, vacuum drying and inventory/discharge positions.

Figure 9:
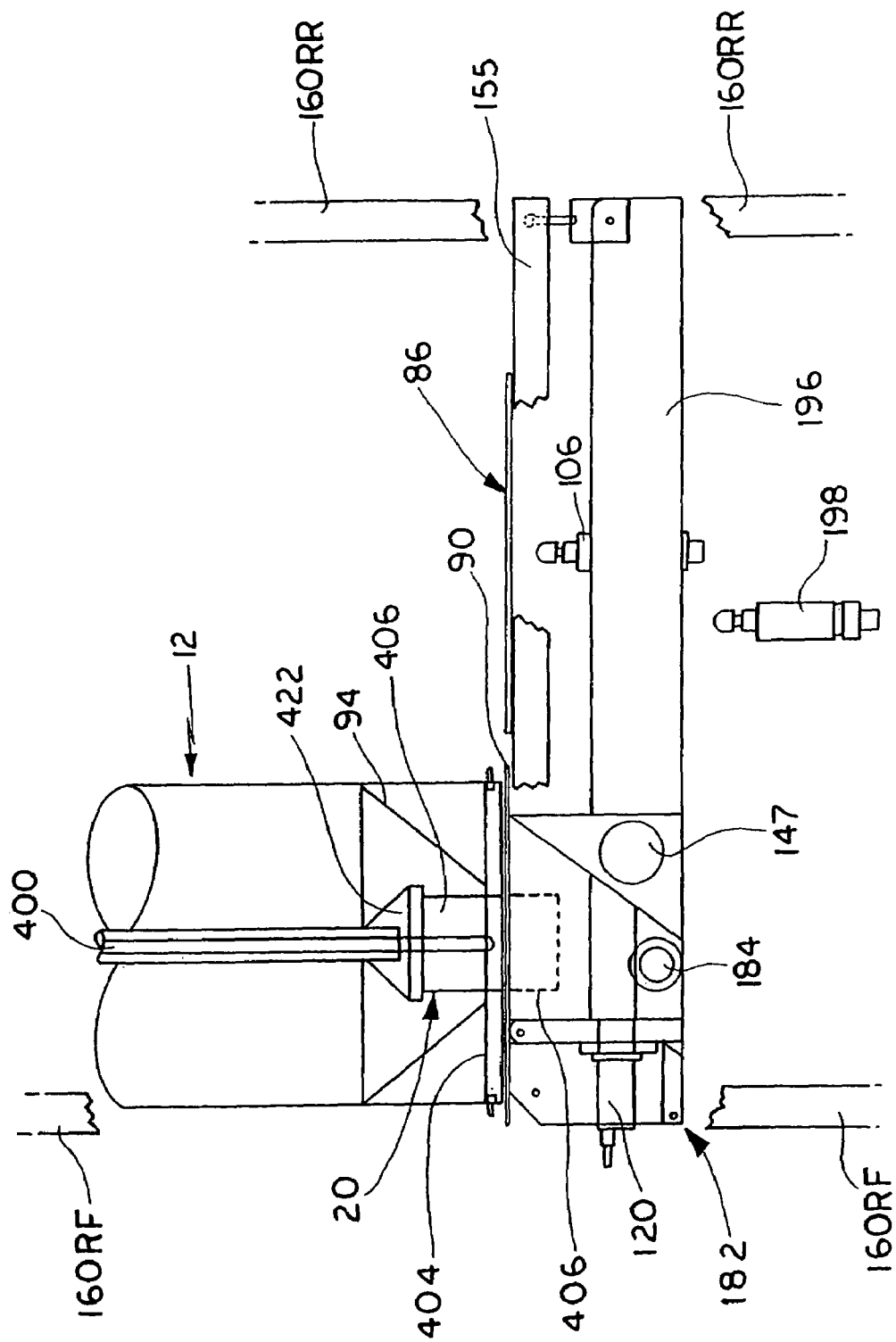
FIG. 9 is a broken side view of the vacuum material takeoff box and lower portion of the canister at the material inventory discharge position illustrated in FIG. 8.

Still further illustrated in FIG. 5 is an inventory/discharge position bottom sealing plate 90 which is movable vertically to contact the bottom of a canister 12 located at the inventory/discharge position, for discharge of downwardly flowing dried material from the canister for delivery, ideally to a receiver associated with an extrusion machine or molding press. Inventory/discharge position bottom sealing plate 90 is may be mounted on a beam 196, which pivots to facilitate vertical movement of inventory/discharge position bottom sealing plate 90. Alternatively, inventory/discharge position bottom sealing plate 90 may be connected directly to frame 22 and actuated by a pneumatic piston-cylinder combination associated therewith. Beam 196 is illustrated in FIGS. 5 and 9.

Referring to FIGS. 7 and 13, each preferably cylindrical (but this configuration is not essential to practice of the invention) canister 12 preferably includes a cylindrical shell designated generally 14. Each cylindrical shell 14 is preferably defined (but this is not essential to practice of the invention) by a single wall tube designated 52 in the drawings. An insulative jacket 54, depicted in FIGS. 2, 3 and 4, preferably fits about the annular exterior of tube 52 and may be equipped with a zipper 55 extending axially the length of jacket 54 when jacket 54 is in place about tube 52. Jacket 54 is preferably sufficiently resilient that when zipper 55 is closed, jacket 54 stretches slightly circumferentially about tube 52 with the resulting radially inward force on tube 52 retaining jacket 54 in position around the exterior of tube 52.

A perforate downwardly opening material funnel designated 94 is preferably secured within each cylindrical shell 14 of a canister 12 proximate the bottom of canister 12. Material dispensing funnel 94 when installed preferably deforms just enough to be snapped into place and retained by the spring-like action resulting from the residual internal stresses as funnel 94 seeks to relieve those stresses.

The perforate character of dispensing funnel 94 facilitates circulation of heated drying air through material in canister 12 at filling/heating position 100 and further facilitates drying of material in canister 12 when the canister is at vacuum drying position 102 by draw of vacuum in canister 12 at position 102.

Each canister 12 preferably further includes a canister dispense valve designated generally 20 located coaxially with perforate funnel 94, as shown in FIGS. 7, 8, 9 and 13.

FIG. 3 illustrates a canister 12 at vacuum drying position 102 prior to movement of canister top and bottom vacuum sealing plates 40, 42 into position to seal cylindrical shell 14 so that a vacuum may be drawn therewithin.

Canister top and bottom vacuum sealing plates 40, 42 are preferably respectively connected to unnumbered piston rod extensions which are parts of canister top and bottom sealing piston-cylinder combinations 44, 46 respectively. Piston-cylinder combinations 44, 46 are preferably pneumatically actuated by the microprocessor and solenoid valves as described above. The cylinder portion of top piston-cylinder combination 44 is preferably fixedly connected to suspension plate 166 while the cylinder portion of bottom piston-cylinder combination 46 is preferably fixedly connected to a lower cross member 152 of frame 22, in a manner similar to that of the piston-cylinder combination which actuates movable lower plate 86 at heating and fill position 100, as illustrated in FIG. 5.

Canister top and bottom vacuum sealing plates 40, 42 are most preferably of generally planar configuration, as illustrated, and preferably have vacuum sealing gaskets 58, 60 positioned circumferentially around unnumbered preferably circular lips of canister top and bottom vacuum sealing plates 40, 42 respectively.

When a canister 12 is at vacuum drying position 102, pneumatic actuation of respective canister top and bottom sealing piston-cylinder combinations 44, 46 respectively causes respective canister top and bottom vacuum sealing plates 40, 42 to move vertically, in the direction of the axis of cylindrical canister 12, towards canister 12. This effectuates an airtight, vacuum-maintaining seal between the preferably circular peripheries of top and bottom sealing plates 40, 42, where vacuum gaskets 58 and 60 are preferably circular and conform to the circumferential top and bottom edges of tube 52.

Once moisture has evaporated from resin material due to draw of vacuum thereover within canister 12 while located at vacuum drying position 102 and the resin material has reached a desired degree of dryness, canister top and bottom sealing piston-cylinder combinations 44, 46 are permitted to return to positions illustrated in FIG. 4. This retracts canister top and bottom vacuum sealing plates 40, 42 away from contact with canister 12, permitting canister 12, having the now dry granular resin material therewithin, to be moved to the inventory/discharge position.

Referring to FIGS. 5, 6 and 6A, canister bottom sealing plate 42 at vacuum drying position 102 includes a purging hot air aperture 50, shown in FIGS. 5, 6 and 6A. Aperture 50 provides an opening into a canister 12, when located at the vacuum drying position, for a purge line 62 leading from warm heating air carrying conduit 158 illustrated in FIGS. 6 and 6A. A purge valve 64 is provided within purge line 62 to open and close line 62, optionally to permit or to block flow of warm heating air into a canister 12 at vacuum drying position 102. Purge line 62 and purge valve 64 facilitate purging moisture from granular resin material undergoing vacuum drying by optionally periodically introducing hot, dry air into that granular resin material and letting that hot, dry air be drawn through the resin material by vacuum being drawn at the top of the canister. The effect of this in some instances is to give better efficiency, namely higher resulting dryness of the granular resin material when it finishes drying at the vacuum drying position 102. This optional purging may typically last for thirty (30) seconds or one minute or even one minute and thirty seconds out of a total drying cycle time while vacuum is applied, which is typically on the order of twenty (20) minutes. This optional purging is desirably done close to or at the end of the drying cycle and may also be done in the middle of the cycle as well.

The time during which vacuum is drawn within a canister 12 while located at vacuum drying position 102 may be adjusted, according to the type of material being dried, using the microprocessor. Similarly, the level of vacuum drawn in canister 12 at vacuum drying position 102 may be adjusted. Air withdrawn from canister 12 preferably by aspirating action of a vacuum venturi 48, illustrated schematically in FIG. 2, communicating with top sealing plate 40 may be monitored for moisture content; vacuum venturi 48 and the aspirating action may be halted once the desired low level of moisture in material within canister 12 has been attained. The microprocessor controls operation of the low pressure dryer, including sequencing and actuation of the various pneumatic piston-cylinder combinations, operation of the venturi, etc. While the venture and aspirating action are preferred for drawing vacuum in the canister at the vacuum drying position, a vacuum pump may also be used.

The preferably vertically-oriented preferably cylindrical sets of canisters are preferably carried directly by shaft 24 for rotation therewith.

Arrow B in FIGS. 11 and 12 depicts the preferred direction of rotation of vertical shaft 24 and canisters 12 so as to move canisters 12 serially from the filling/heating position 100 to vacuum drying position 102, then to the inventory/discharge position 104 and then again to filling/heating position 100, where the cycle may repeat.

At vacuum drying position 102, heated granular resin material is preferably subjected to a vacuum of about 27.5 millimeters of mercury or greater. This lowers the evaporation point or boiling point of water to about 120° F., thereby causing the moisture within the heated granular resin material (which is typically much higher than 120° F., it may approach 300° F., depending on the material being dried, as noted above) to evaporate and be drawn off by the vacuum venturi 48 drawing vacuum within canister 12 at vacuum drying position 102. Vacuum venturi 48 connects via suitable flexible hose to an aperture in canister top sealing plate 40 to draw vacuum within canister 12 at vacuum drying position 102. Once the vacuum drying process is sufficiently complete, piston-cylinder combinations 44, 46 retract canister top and bottom sealing plates 40, 42 so that canister 12 may move from vacuum drying position 102 to the inventory/discharge position 104. A vacuum pump may be substituted for vacuum venturi 48 and be furnished as part of the vacuum dryer; a vacuum pump is desirable for pneumatically conveying the granular resin material throughout the dryer.

The material filling/heating and vacuum drying functions may each take approximately twenty minutes, depending on the material being dried. Accordingly for a typical drying process, in one hour, all three canisters 12 preferably cycle through material filling/heating position 100, vacuum drying position 102 and material inventory/discharge position 104.

Canisters 12 are preferably provided equally spaced around vertical shaft 24 with canisters 12 being 120 degrees apart.

Referring to FIGS. 2, 6, 6A, 8, 9 and 10, vacuum material takeoff box 182 is provided at the bottom of material inventory position 104 for removal and conveyance of dried granular material from dryer 10 to a process machine such as a compression or injection molding press or an extruder. The vacuum material takeoff box is designated generally 182 in the drawings and has a material takeoff tube 184 rotatably resident therewithin.

As illustrated in FIG. 9, vacuum material takeoff box 182 is preferably mounted on one end of a pivoting beam 196 where beam 196 is pivotally connected to frame 22, preferably to one of intermediate cross members 155 running between the two vertically extending members 160LP and 160RR, at the rear of dryer 10. The point of pivotal connection is denoted P in FIG. 9. Pivoting beam 196 is preferably actuated by a vertically oriented piston-cylinder combination 198 which is preferably mounted on a lower horizontal framing cross member 165. Piston-cylinder combination 198 is visible in FIGS. 2, 3, 4 and 9.

Figure 8:
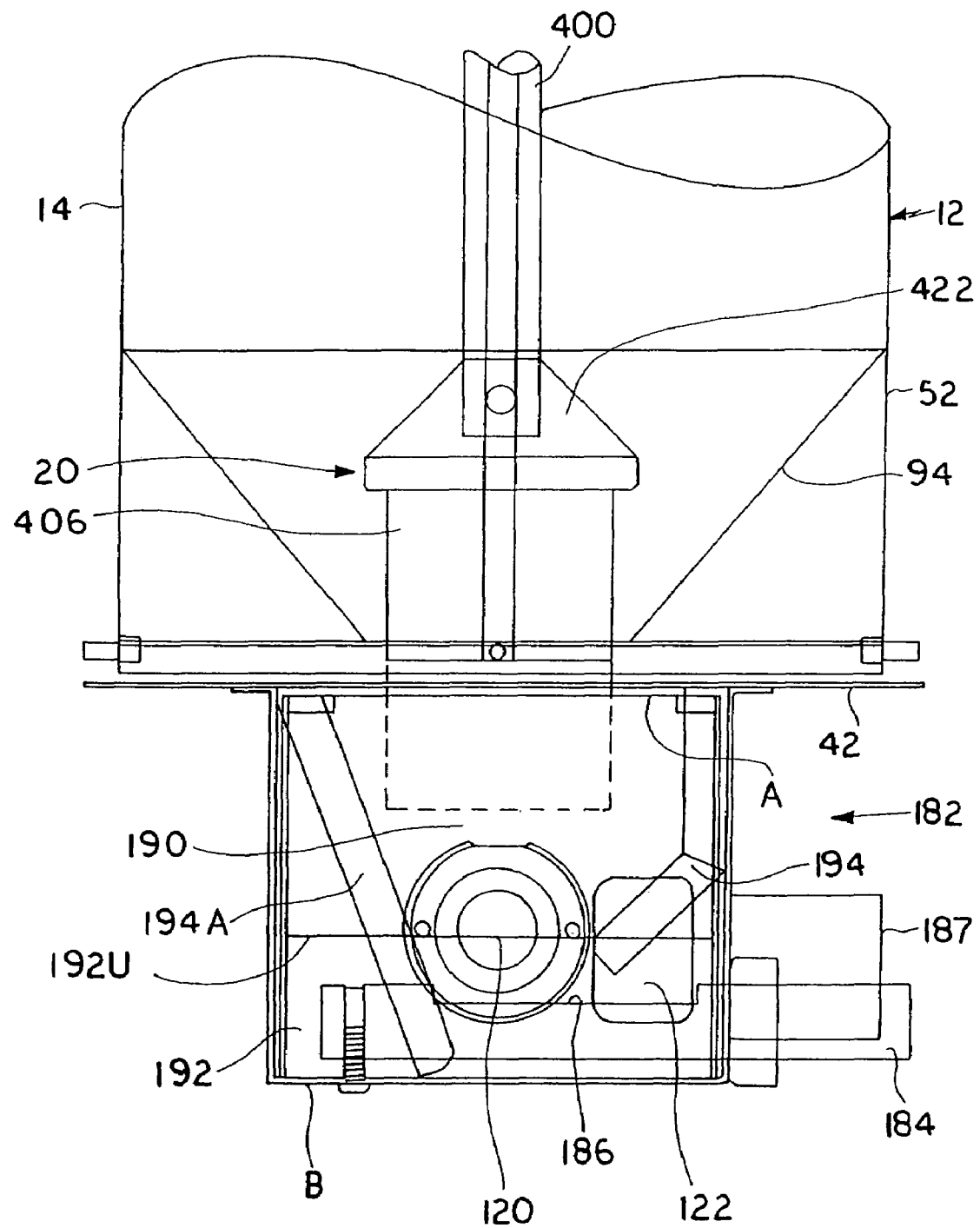
FIG. 8 is a broken enlarged front view of a portion of a dryer of the type illustrated in FIGS. 2 through 5 showing in detail a vacuum material takeoff box and a lower portion of a canister at a material inventory/discharge position.
Figure 10:
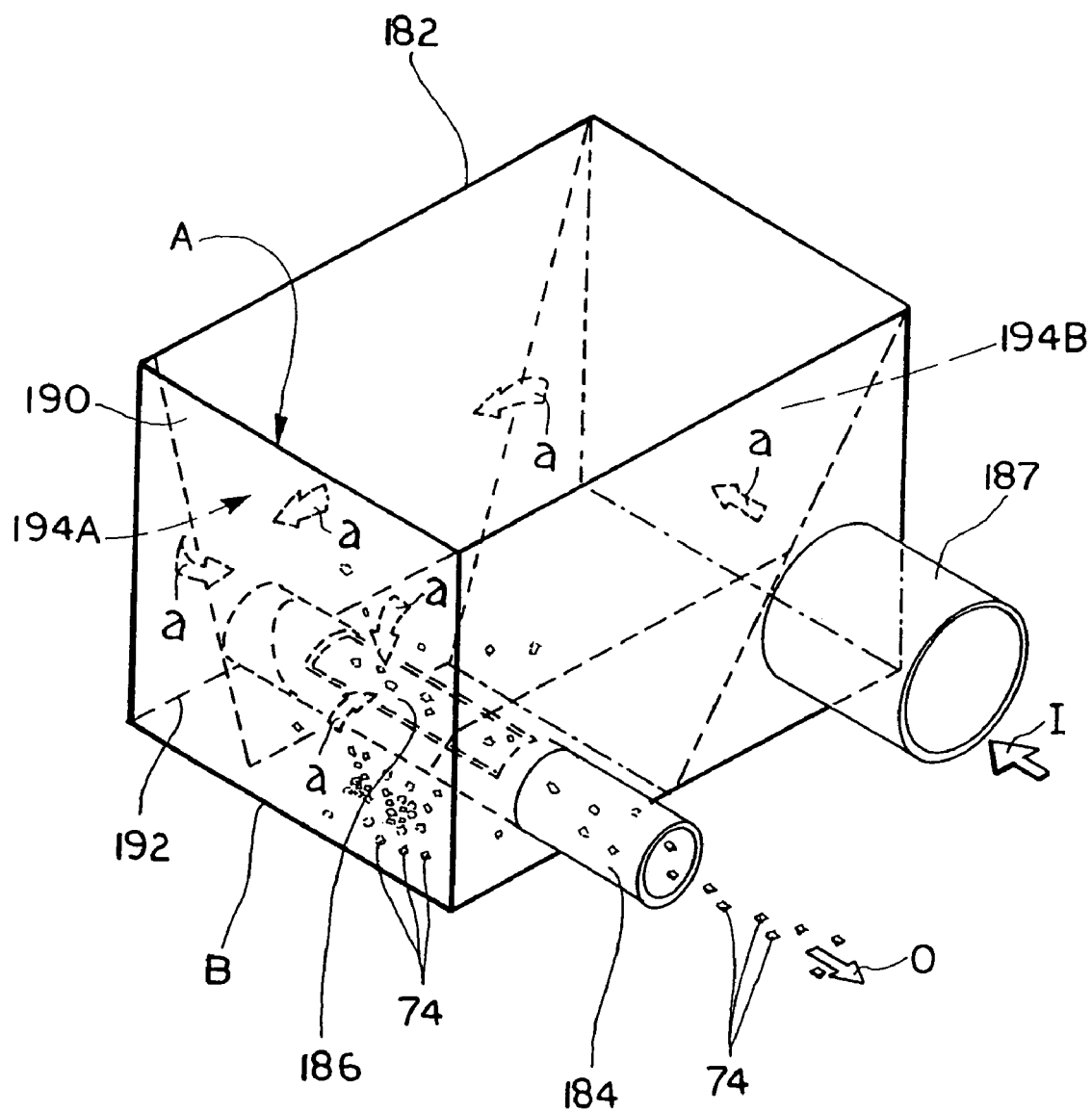
FIG. 10 is a schematic isometric drawing of the vacuum material takeoff box illustrated in FIGS. 8 and 9 depicting air and material flows.

Referring to FIGS. 8, 9 and 10, material takeoff box 182 includes preferably manually rotatable material takeoff tube 184 and an air inlet 187 providing the inlet for a vacuum or suction based material delivery system via which granular material within material takeoff box 182 is carried by subatmospheric pressure air from the interior of rotatable material takeoff tube 184 outwardly, as indicated by arrow O in FIG. 10. Air supplied to inlet 187 is denoted by arrow I in FIG. 10. The rotatable characteristic of tube 184 allows adjustment of material flow rate therethrough by adjustment of the angular position of tube 184, to adjust the projected area of material fill aperture directly accessible by the swirling dry granular material in the vacuum environment.

Material fill aperture 186 is in rotatable material takeoff tube 184. Aperture 186 is preferably axially elongated and formed as a cutout in the wall of tube 184 with the cutout preferably being defined by two preferably substantially straight edges which are parallel with the axis of tube 184, and two preferably substantially parallel arcuate edges formed along lines of circumference of tube 184, as illustrated in FIG. 10. Desirably, the two substantially parallel arcuate edges forming two of the boundaries of material fill aperture 186 subtend angles of less than one hundred eighty degrees (180°).

Vacuum material takeoff box 182 preferably includes a first pivoting upper front plate 190 which is preferably fabricated from clear plastic or safety glass material and pivots about a hinge running substantially coaxially with an edge denoted "A" of material takeoff box 182 in FIGS. 8 and 10.

Preferably forming a part of the same essentially planar wall of material takeoff box 182 is a second pivoting lower front plate 192 which is preferably similarly formed of clear plastic or safety glass material in the same manner as first pivoting upper front plate 190, but which pivots about an edge parallel with the edge denoted A in FIGS. 8 and 10, with such edge being denoted B in FIGS. 8 and 10. An upper edge of lower front plate 192 preferably overlaps a lower edge of upper front plate 190 when the plates are in their essentially co-planar disposition, providing a closed front for takeoff box 182 as illustrated in FIG. 8. The upper edge of lower front plate 192 is denoted 192U in FIG. 8. Pivoting action of plates 190, 192 to open the front of box 182 facilitates cleanout thereof. The clear plastic or safety glass material of plates 190, 192 facilitates operator inspection monitoring of the interior of vacuum material takeoff box 182.

Material takeoff box 182 preferably has a rectangular parallelepiped exterior shape so that oppositely facing exterior surfaces of material takeoff box 182 are essentially parallel one to another.

A collection of generally angularly disposed preferably at least partially planar baffles are preferably provided within material takeoff box 182. The baffles are denoted generally 194, 194A, etc. Baffles 194 serve to deflect and diff-use the vector of incoming near-vacuum air at inlet 187 thereby to render more efficient the vacuum pickup of pellets of granular resin material for conveyance thereof by the near-vacuum drawn out of the interior of rotatable material takeoff tube 184. Motion of the diffuse near-vacuum air within material takeoff box 182 is generally denoted by arrows labeled "a" in FIG. 10.

Referring to FIG. 8, material takeoff box 182 preferably further includes a material sensor 120 as well as a sight glass 122 through which the interior of material takeoff box 182 and the presence or absence of granular resin material therein can be visually checked. Material sensor 120 in conjunction with the microprocessor serves to actuate an alarm whenever there is an absence of material in material takeoff box 182 ready for conveyance to the process machine upon demand.

Figure 15:
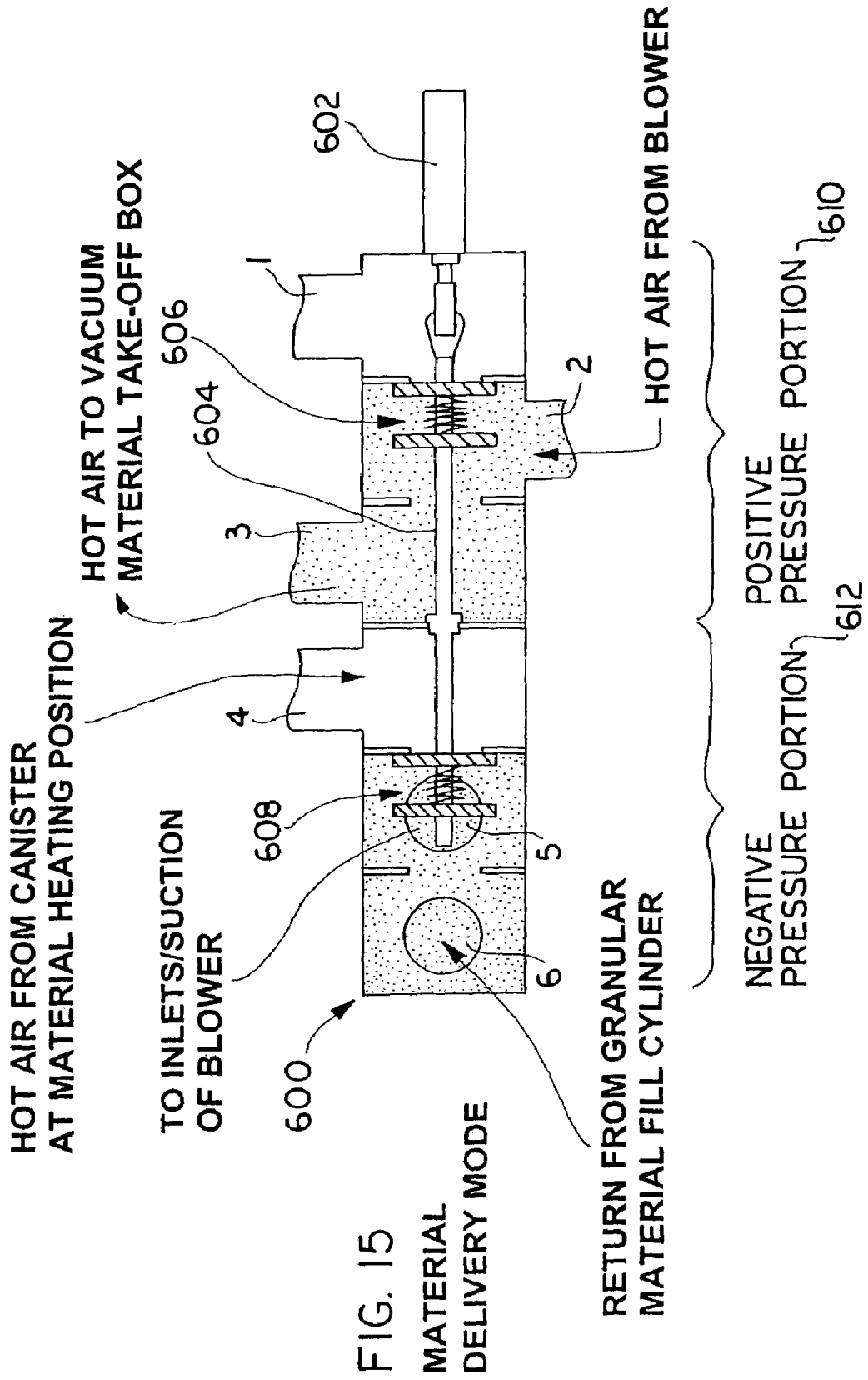
FIGS. 15 and 16 are schematic views of a duplex pneumatic valve box, respectively showing the valves in two different positions, for use in directing air flows in connection with a dryer as illustrated in FIGS. 2 through 4 and the various FIGS. 6.
Figure 16:
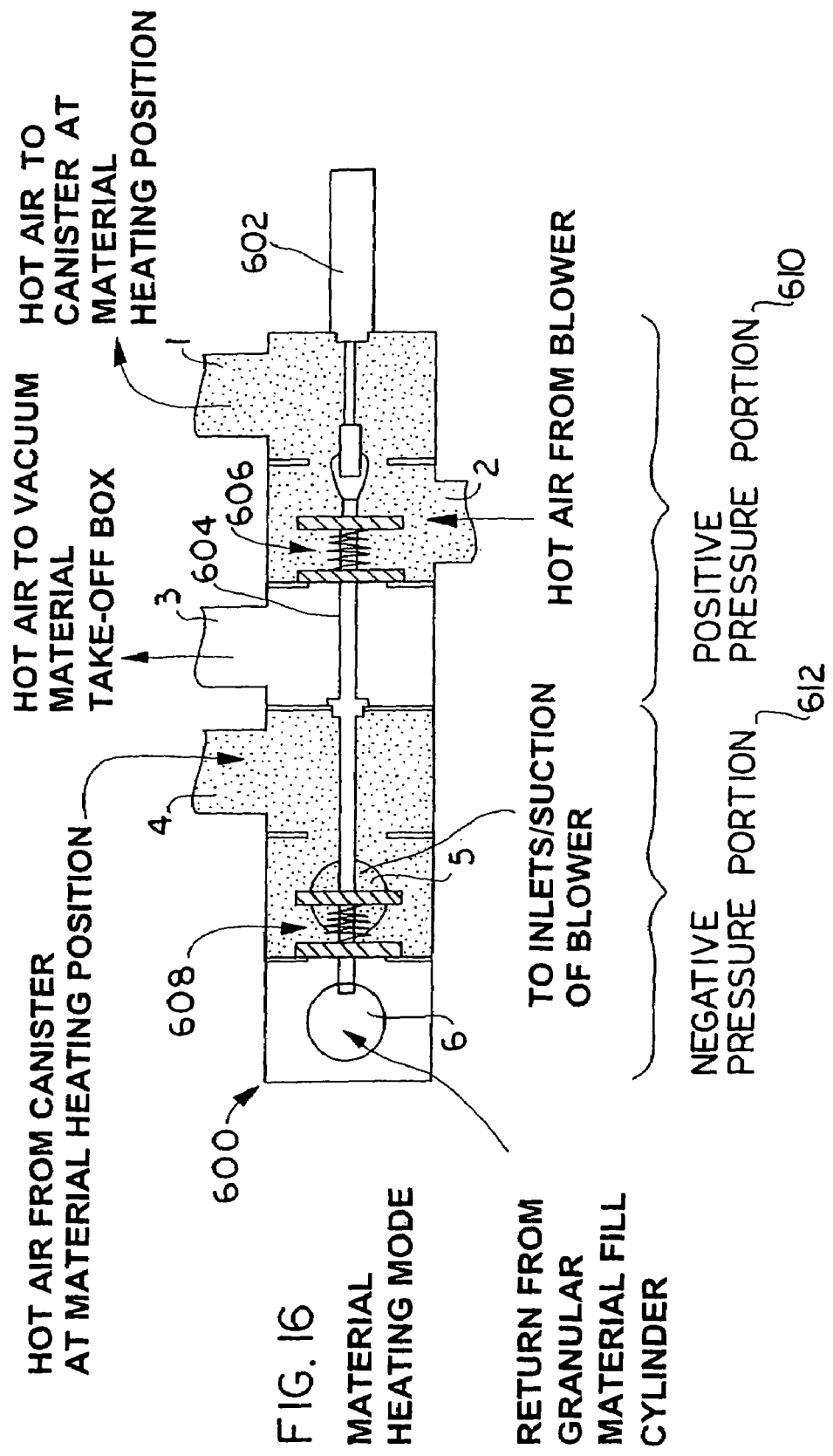

Referring to FIGS. 6, 15 and 16 in which active air flow areas have been stippled for drawing clarity, a duplex pneumatic valve box is designated generally 600 and may be used to control air flows. Duplex pneumatic valve box 600 includes a pneumatic piston-cylinder combination 602 which moves a shaft 604 between the positions illustrated in FIGS. 15 and 16. Mounted on shaft 604 are first and second valve members 606, 608, each of which preferably includes two valve disks resiliently coupled by a coil spring. Each of the two valve disks forming parts of first and second valve members 606, 608 are slidably moveable along shaft 604 within limits defined by the coil springs to which the valve disks are respectively coupled. The coil springs are desirably fixed, at an axially central position, to shaft 604 with axial extremities of the coil springs connected to the respective disks, which float or slide along shaft 604. With this construction, as shaft 604 moves between the positions illustrated in FIGS. 15 and 16 due to the action of pneumatic piston-cylinder combination 602, respective valve disks may contact interior baffles within duplex pneumatic valve box 600 thereby opening or closing axially oriented apertures in transversely extending baffles within duplex pneumatic valve box 600, as illustrated in FIGS. 15 and 16.

Duplex pneumatic valve box 600 has a positive pressure portion designated generally 610 in FIGS. 15 and 16, and a negative pressure portion designated generally 612 in FIGS. 15 and 16, the positions of which are indicated by brackets in the drawings. An inlet to positive pressure portion 610 is denoted 2 in FIGS. 15 and 16 and is the position at which hot air under positive pressure is supplied to duplex pneumatic valve box 600 from the outlet of positive pressure blower 76 via conduit 156 as illustrated in FIG. 6.

Duplex pneumatic valve box 600 has two outlets from positive pressure portion 610. The outlet numbered 1 in FIGS. 15 and 16 connects to conduit 158, illustrated in FIGS. 6 and 6c, which conveys hot air from positive pressure portion 610 of duplex pneumatic valve box 600 to a canister 12 located at material heating position 100 as illustrated in FIG. 6, when duplex pneumatic valve box is in the "material heating" configuration or mode illustrated in FIG. 16.

When duplex pneumatic valve box 600 is in the "material delivery" configuration or mode illustrated in FIG. 15, due to piston-cylinder combination 602 being in the alternate disposition and having moved shaft 604 and associated valve 606 to the left, from the position in FIG. 16 to the position illustrated in FIG. 15, hot air exiting from positive pressure portion 610 of duplex pneumatic valve box 600 exits via outlet 3. Connected to outlet 3 and leading from duplex pneumatic valve box 600 to air inlet 187 is air inlet line 188 illustrated in FIG. 6.

Aperture 4, providing an inlet to negative pressure portion 612 of duplex pneumatic valve box 600, receives hot air exiting from a canister 12 at filling/heating position 100 via conduit 146 illustrated in FIG. 6A, when duplex pneumatic valve box 600 is in the "material heating" configuration illustrated in FIG. 16. When duplex pneumatic valve box is in the "material delivery" configuration illustrated in FIG. 15, aperture 6 provides an inlet to negative pressure portion 612 of duplex pneumatic valve box 600 for return line 140 via which air is returned from a fill cylinder 142 illustrated in FIG. 6, which is a holding receptacle for granular resin material to be used by a molding press or extruder.

Aperture 5 in negative pressure portion 612 of duplex pneumatic valve box 600 communicates with conduit 136 leading to air filter 82, which in turn connects with suction aperture 78 of blower 76 at which blower 76 draws negative pressure. Aperture 5, conduit 136 and the active cells of negative pressure portion 610 of duplex pneumatic valve box 600 remain in communication with suction or inlet aperture 78 of blower 76 regardless of whether duplex pneumatic valve box 600 is in the material heating or the material delivery configuration.

Also shown in FIG. 6 is a conduit 138 connecting material takeoff tube 184, which is more clearly visible in FIGS. 8, 9 and 10 and is a part of material take-off box 182, to fill cylinder 142. Hence, conduit 138 conveys dried granular resin material from vacuum material takeoff box 182 to fill cylinder 142 when duplex pneumatic valve box is in the "material delivery" configuration illustration in FIG. 15.

When duplex pneumatic valve box 600 is in the "material heating" configuration illustrated in FIG. 16, flow in the negative pressure portion of box 600 is of hot air exhausted from a canister 12 at material heating position 100, traveling through conduit 146 into box 600 via aperture 4.

Whether duplex pneumatic valve box is in the "material delivery" configuration shown in FIG. 15 or in the "material heating" configuration shown in FIG. 16, air is drawn, by suction at the inlet to blower 76, through air filter 82 and into blower 76 via conduit 136 as such air exits duplex pneumatic valve box 600 via aperture 5.

When duplex pneumatic valve box 600 is in the "material delivery" configuration illustrated in FIG. 15, hot air entering the positive pressure portion of duplex pneumatic valve box 600 via aperture 2 is supplied to vacuum material takeoff box 182 via conduit 188 connected to aperture 3. In this same configuration air is drawn through negative pressure portion 612 of duplex pneumatic valve box 600 from material storage cylinder 142 via conduit 140 after delivering dried granular resin material to cylinder 142 via conduit 138. Hence, FIG. 15 depicts duplex pneumatic valve box 600 in the material delivery configuration or mode while FIG. 16 depicts duplex pneumatic valve box 600 in the material heating configuration or mode.

Duplex pneumatic valve box 600 effectuates the ability to provide hot conveying air as the means used to move the dried granular resin material, once that material has been dried, to the operating position, namely to fill cylinder 142 for molding or extrusion. This is advantageous over the use of ambient air from the room in which dryer 10 is located to move granular resin material from dryer 10 to where the material is needed. Valve box 600 allows hot air from blower 76 to be supplied to vacuum material takeoff box 182 to move granular resin material from vacuum material takeoff box 182 to fill cylinder 142. This use of hot air helps the granular resin material to stay warmer longer.

It is desirable to process the granular resin material by molding or extrusion while the granular resin material is warm. If the granular resin material is allowed to cool, the granular resin material may absorb moisture, which may adversely affect performance of the granular resin material when molded or extruded. Use of hot air to convey the granular resin material after it has been dried keeps the granular resin material warm longer, giving more lead time for molding or extrusion.

FIG. 14 illustrates an optional but preferable material supply hopper for use with dryer 10. The material supply hopper 500 includes a container 512 which is preferably aluminum. Container 512 preferably has an upper cylindrical portion and a lower frusto-conical portion where these two portions are denoted 514, 516 respectively.

Material supply hopper 500 includes a material supply valve designated generally 502 in FIG. 14; valve 502 is essentially identical to canister dispense valve 20 described above and illustrated in FIGS. 7 and 13. Material supply valve 502 is actuated by a piston-cylinder combination 504 which is fixedly mounted within material supply hopper 500 by a mounting pin numbered 520. Material supply valve 502 includes a material supply valve umbrella 506 which overlies an axially displaceable material supply valve cylinder 508 having an open center for axially directed flow of material therethrough, downwardly out of material supply hopper 500 when material supply valve 502 is at the open position. A supply valve shaft-cylinder connecting flange 510 is positioned within and runs preferably diametrically across the interior of axially displaceable material supply valve cylinder 508, providing means for attachment of cylinder 508 to a rod 522 extending from piston-cylinder combination 504.

When axially displaceable material supply valve cylinder 508 is in the upper position illustrated in solid lines in FIG. 14, the open upper end of axially displaceable material supply valve cylinder 508 is covered by material supply valve umbrella 506 and the curved wall of cylinder 508 extends axially from umbrella 506 slidably through the aperture in the bottom 518 of a container 512. As a result, at this position no granular material within supply hopper 500 can flow downwardly through the interior of axially displaceable material supply valve cylinder 508.

Container 512 has a bottom 518 with an aperture for sliding receipt of axially displaceable material supply valve cylinder 508. The sliding fit between the aperture in bottom 518 and the curved wall of cylinder 508 is sufficiently close that granular material cannot pass therebetween.

When desired to open valve 502, piston-cylinder 504 is actuated, extending piston rod 522 and thereby moving axially displaceable material supply valve cylinder 508 downwardly into the position illustrated in dotted lines in FIG. 14, whereupon granular material within material supply hopper 500 may flow downwardly through the open center of axially displaceable material supply valve cylinder 508. To close material supply valve 502, piston-cylinder combination 504 is de-energized whereby an internal spring draws piston rod 522 upwardly in FIG. 14, thereby moving axially displaceable material supply valve cylinder 508 upwardly into contact with material supply valve umbrella 506. This closes the upper end of supply valve cylinder 508 to material flow, no material can then flow downwardly out of material supply hopper 500. Desirably, hopper 500 receives granular resin material directly from a gravimetric blender 820.

The dryer venturi 48 preferably operates using an air supply from 75 to 80 psi. This air, which is typically from the air supply in the facility in which the dryer is used, serves to generate the required vacuum, using the venturi, and serves to operate all of the air cylinders of the low pressure dryer. To conserve usage of facility air, the venturi vacuum generator is desirably cycled on and off during operation to maintain a minimum vacuum of 25 inches.

The microprocessor controller of the dryer preferably includes thumbwheel switches or functionally equivalent structure used to set temperature to which the resin or other granular material is to be heated prior to drying. Another thumbwheel switch or functionally equivalent structure is preferably used to set the minimum acceptable time as the time for a heating cycle and a drying cycle. A third thumbwheel switch or functionally equivalent structure is preferably used to set fill time, which controls the time for filling a canister at the fill and heat position.

During operation, the preferably three preferably identical material canisters 12 or functionally equivalent structures rotate through the preferably three stations, namely the filling/heating position 100, the vacuum dry position 102 and the inventory/discharge position 104. Once there is material in a supply hopper (or a functionally equivalent structure) located at filling/heating position 100, an operator may press a button on the microprocessor controller (or functionally equivalent unit) to begin the operating sequence. Canisters 12 may index to a starting position based on their position when the dryer was locked and last shutdown.

After locking has been confirmed, the microprocessor preferably actuates piston-cylinder combination 106 or functionally equivalent structure, raising filling/heating position bottom sealing plate 86 or functionally equivalent structure into position against the bottom of a canister 12 located at filling/heating position 100. Next, the microprocessor preferably checks sensor 153 in filling/heating position bottom sealing plate 86 to verify presence of a canister 12 at heat and fill position 100.

Once the microprocessor verifies presence of a canister 12 at filling/heating position 100, the microprocessor preferably actuates piston-cylinder combination 110 to open material intake valve 108, both of which are illustrated in FIG. 11, whereupon granular material to be dried may flow downwardly into the canister 12 located at filling/heating position 100. Desirably, a fill hopper or functionally equivalent structure, fitting atop dryer 10 and supported by a rectangular framework 118 or functionally equivalent structure, holds granular resin or powdery material to be dried and is of a volume slightly less than that of a canister 12 or is equipped with a valve to regulate downward flow of granular material out of the hopper and into the canister. Desirably, the microprocessor regulates downward granular material flow into the canister so that just the right amount of material is loaded into the canister for maximum throughout of material to be dried while maintaining space above the material in the canister particularly if the heating airflow is to be downwards therethrough.

The microprocessor preferably proceeds to actuate piston-cylinder combinations 44, 46 thereby moving canister top and bottom sealing plates 40, 42 at vacuum position 102 into position against the top and bottom of a canister 12 located at vacuum drying position 102.

The microprocessor preferably then proceeds to actuate piston-cylinder combination 170 or functionally equivalent structure when the canister is at inventory/discharge position 104. Actuation of piston-cylinder combination 170 closes a canister lid 172 against the top of a canister 12 located at inventory/discharge position 104 and axially displaces a valve stem shaft 400 (or functionally equivalent structure) in the canister 12 which is located at inventory/discharge position 104. At the same time, the microprocessor preferably actuates piston-cylinder combination 198 thereby raising pivoting beam 196 and lifting vacuum material takeoff box 182 into position.

The microprocessor preferably next energizes the venturi vacuum generator 48, or the vacuum pump if used in place of the venturi generator, and if adequate vacuum is not attained within 90 seconds, the microprocessor preferably activates an alarm. Assuming the alarm is not actuated, the microprocessor actuates blower 76 and turns on heater 82 shortly thereafter. The microprocessor checks for increasing temperature; if a temperature increase in the air supplied by blower 76 to a canister 12 at material fill and heat position 100 is not detected within 60 seconds, the microprocessor preferably turns off heater 82, stops operation of the dryer and sounds an alarm.

When the microprocessor opens valve 108, the canister 12 located at filling/heating position 100 begins to fill with material to be dried. Hot air enters canister 12 to heat the granular material as canister 12, preferably beginning heating while canister 12 fills with material. After the heating cycle ends, an appropriate one of first, second and third driving rotation piston-cylinder combinations 34, 36, 38 is actuated to index canisters 12 to the next position.

The canister 12 carrying the material which has been heated at position 100 moves to vacuum drying position 102. At this position vacuum is applied to dry the full charge of heated material in canister 12. Typically, vacuum levels of twenty-five (25) inches of mercury are adequate for drying; in extreme cases, vacuum of twenty-nine (29) inches may be used for the drying. The vacuum drying may optionally be interrupted periodically and/or terminated by forcing hot purging air through canister 12 via purge line 62 while at the vacuum drying position 102, which clears moist air from canister 12 having the granular material therein that is being dried.

Desirably, the timer of the microprocessor only increments and counts time when heated air temperature is within twenty degrees (20°) of the target temperature and the vacuum is at least twenty-five (25) inches of mercury. As a result, the first minute or so of each drying and heating cycle does not count towards the cycle time.

After drying, canisters 12 are preferably moved again so that the one of canister 12 having now dry material therewithin is moved to the inventory/discharge position 104. As a result, there is a supply of adequately dry granular resin material for use by a process molding press or extruding machine.

From that point, canister indexing preferably occurs only when a level sensor at the inventory position indicates that the canister 12 at that location is empty.

Figure 17:
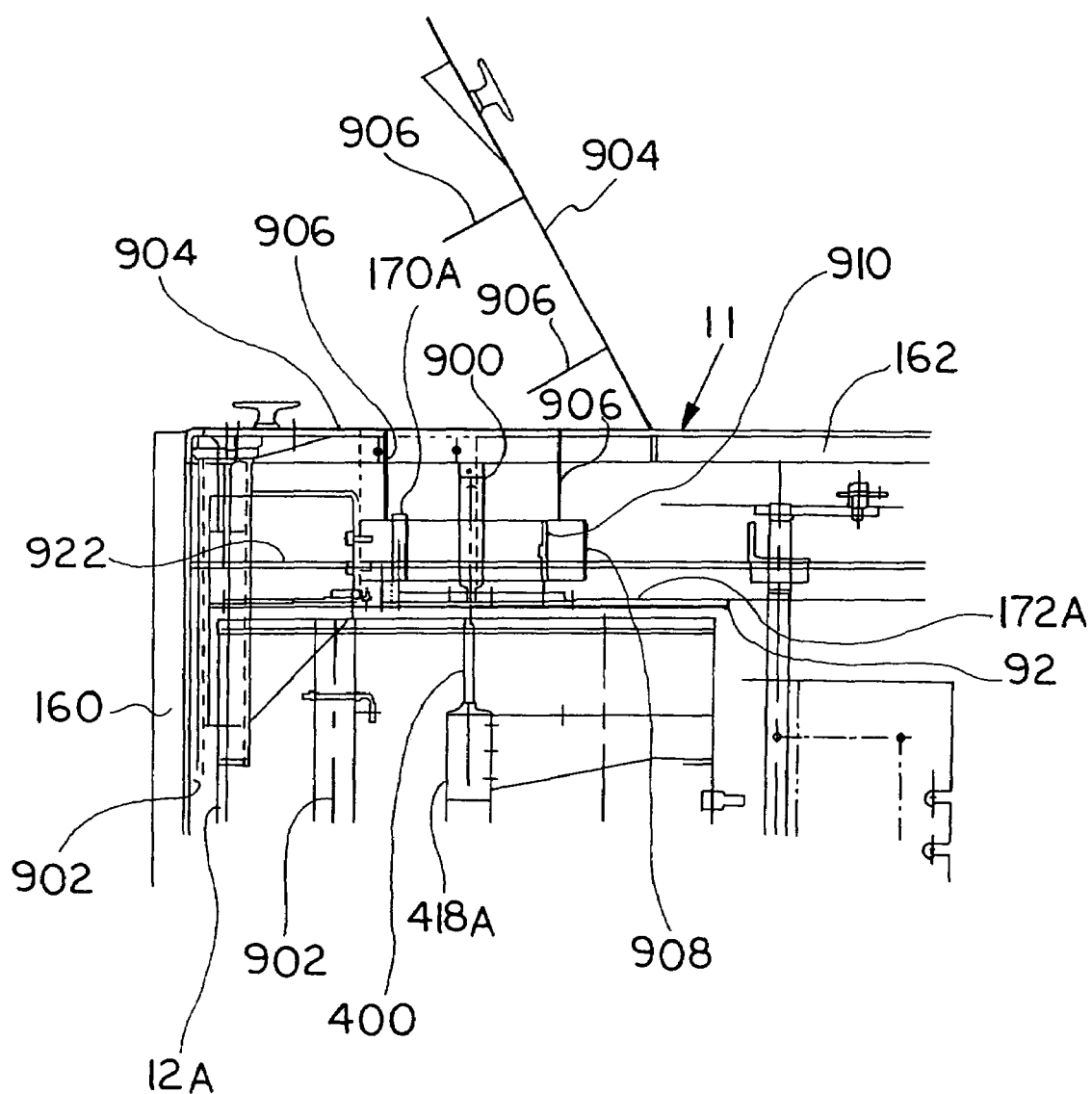
FIG. 17 is a broken side elevation of a dryer in a cabinet of the type illustrated generally in FIG. 1 illustrating (i) a top access door in both the open and closed positions, (ii) the upper portion of a canister located at the inventory/discharge position and (iii) apparatus for sealingly closing the upper end of the canister, which apparatus may be swung away from the position illustrated to provide operator access to the upper end of a canister located at the position illustrated.
Figure 20:
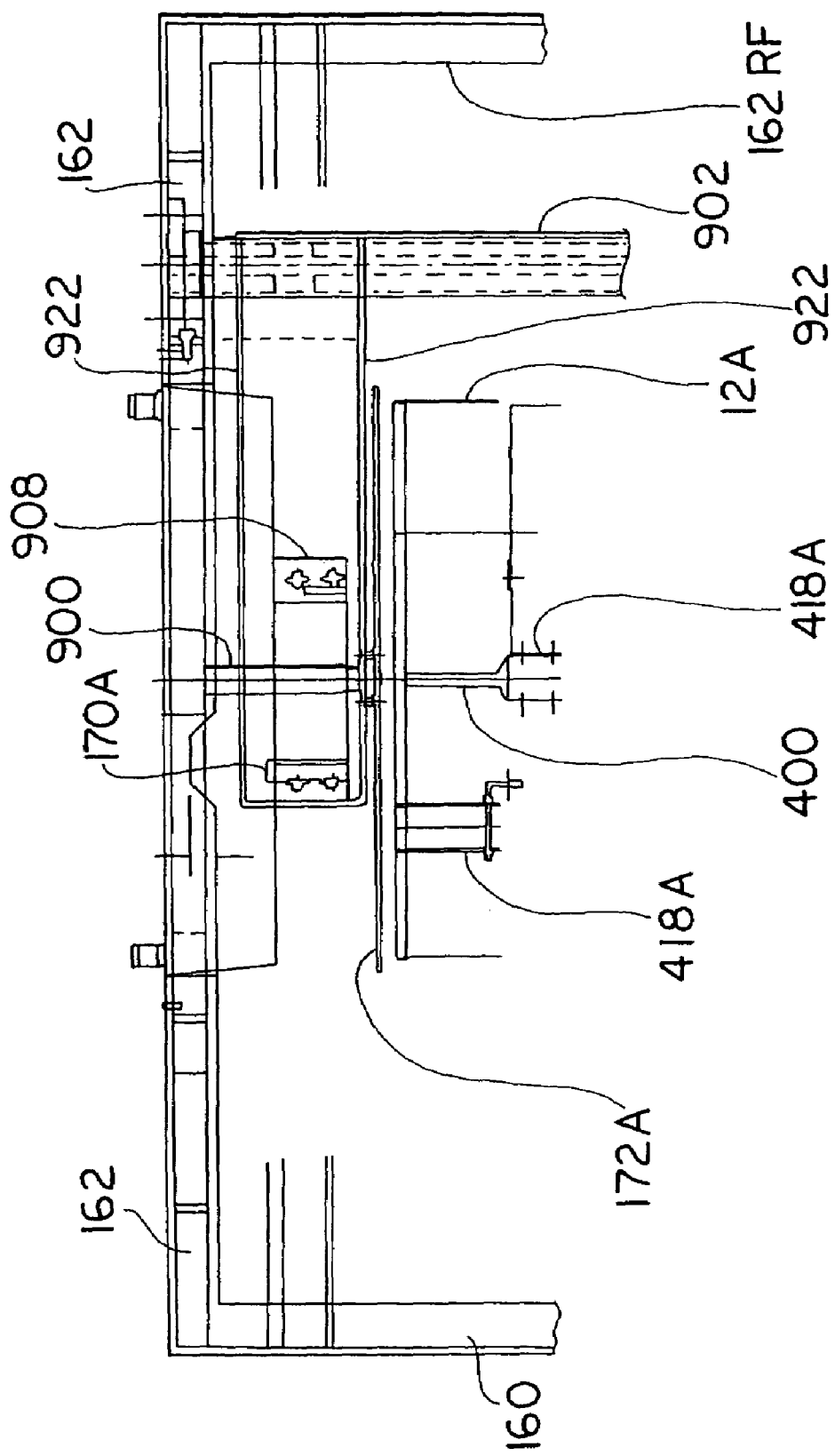
FIG. 20 is an enlarged broken front elevation of the top portion of a dryer as illustrated in FIGS. 1 and 17, showing the structure at the top of a canister located at the inventory/discharge position for sealingly closing the top of the canister at that position with such structure being pivotally rotatable away from the canister and out of the canister cabinet to provide access to the canister top by an operator at the position illustrated in FIG. 20.
Figure 21:
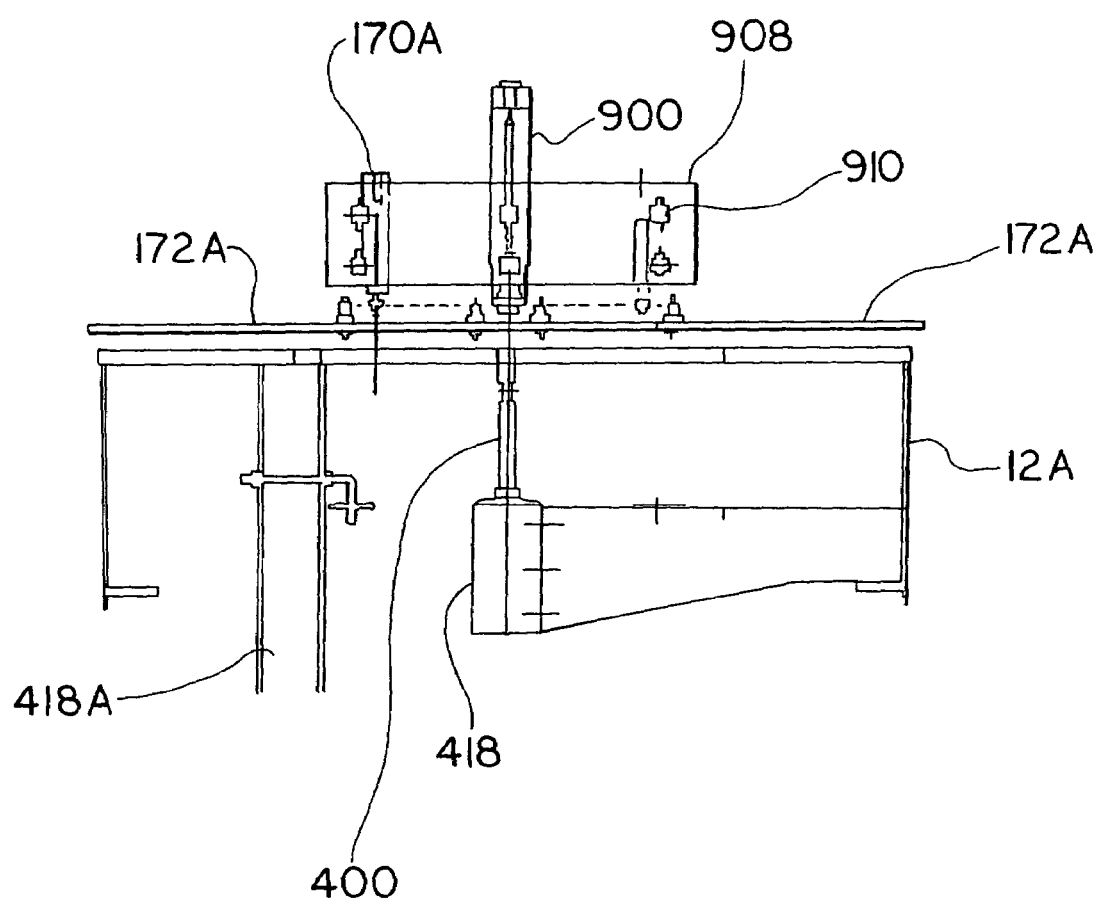
FIG. 21 is an enlargement of some of the structure illustrated in FIG. 20, looking in the same direction as FIG. 20.

Referring to FIGS. 17, 20 and 21 the upper portion of the optional dryer cabinet 11 includes preferably a top access door designated generally 904 preferably having two support legs 906 extending downwardly therefrom. In FIG. 17 the access door is shown in two positions, one being the open position at which the door has been rotated about a hinge connection and points generally upwardly, and a second position at which the door has been rotated downwardly about the hinge connection so that the door fits flush with the top of dryer cabinet 11. Top access door 904 preferably includes a hand grip not numbered but clearly visible in the drawings and usable to open and close the access door.

Two support legs 906 preferably extend generally perpendicularly downwardly from access door 904 when door 904 is the closed position. As illustrated in FIG. 17, the extremities of support legs 906 remote from the position of juncture with top access door 904, when the door 904 is in the closed position, bear downwardly on a rectangular housing 908 located above inventory/discharge position top sealing plate 92. Support legs 906 bearing against an upper surface of housing 908 help to retain housing 908 in place.

A piston cylinder combination 900 mounted within housing 908 serves, upon actuation, to move canister discharge valve stem shaft 400 thereby to actuate axially displaceable discharge valve cylinder 406 at the bottom of canister 12 when canister 12 is at the inventory/discharge position, as illustrated in FIGS. 17, 20 and 21.

Housing 908 also houses a piston-cylinder combination 170A and a spring 910 which preferably together serve to urge inventory/discharge position top sealing plate 92 downwardly against canister 12 at the inventory/discharge position and, upon deactuation of the piston-cylinder combination by release of pressurized air therefrom, to permit inventory/discharge position top sealing plate 92 to lift from the top of canister 12 in response to bias spring 92. Inventory/discharge position top sealing plate 92 is preferably retained in sealing contact with canister 12A at the inventory/discharge position illustrated at FIG. 17 for as long as possible. Inventory/discharge position top sealing plate 92 preferably only lifts from canister 12A at the inventory/discharge position 104 to allow movement of canister 12A or to facilitate servicing of the canister when the structure illustrated in FIGS. 17, 20 and 21, namely housing 908 and the associated piston-cylinder combinations and spring resident therein, is rotated about rotational support rod 902 in the manner illustrated in FIG. 30, to thereby pivotally move canister 12 from within dryer housing 11 to an outside position at which servicing can be effectuated.

Figure 18:
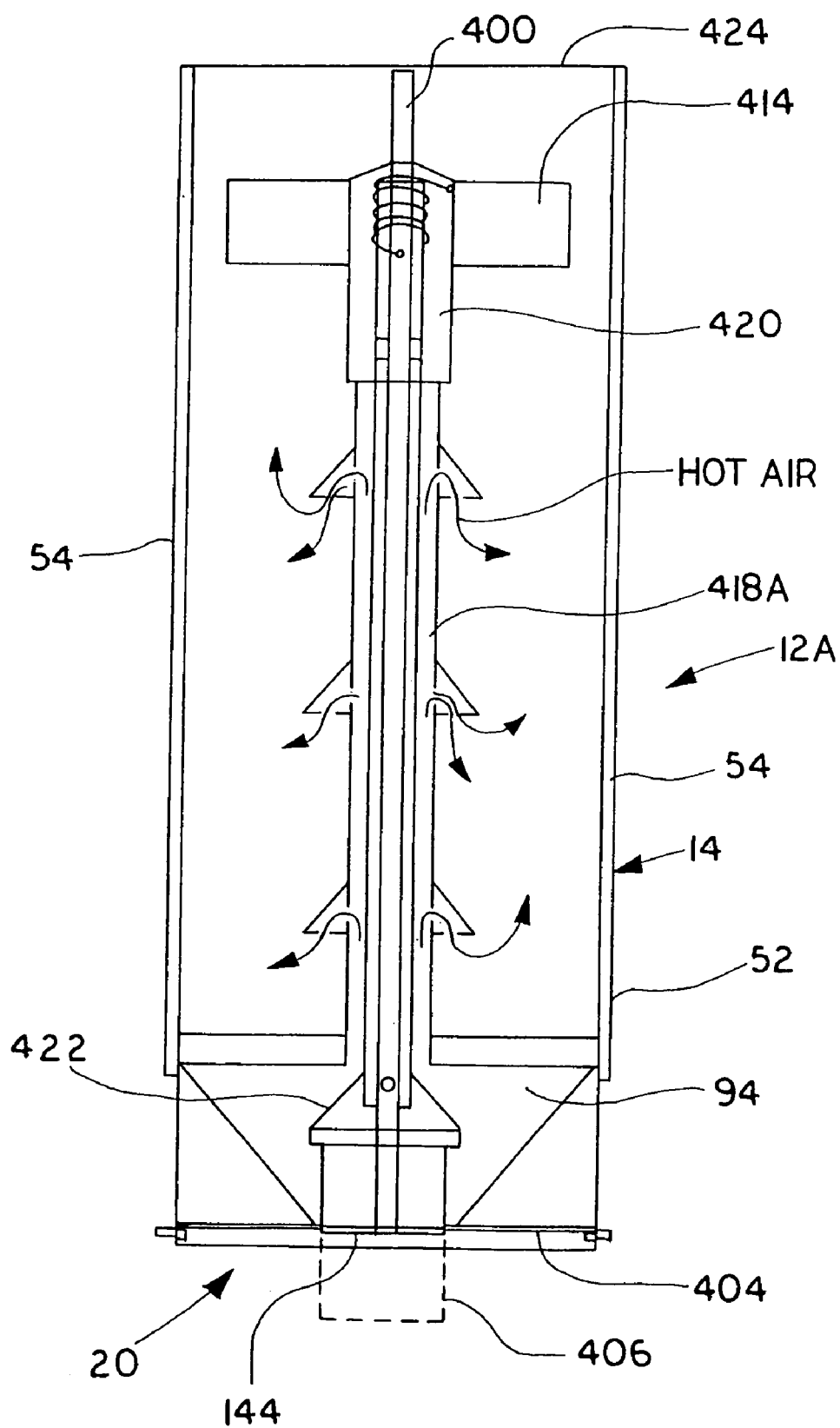
FIG. 18 is a front elevation in section of a preferred embodiment of a canister suitable for use in a dryer of the general type illustrated in FIGS. 1 through 6, 11 and 12.
Figure 19:
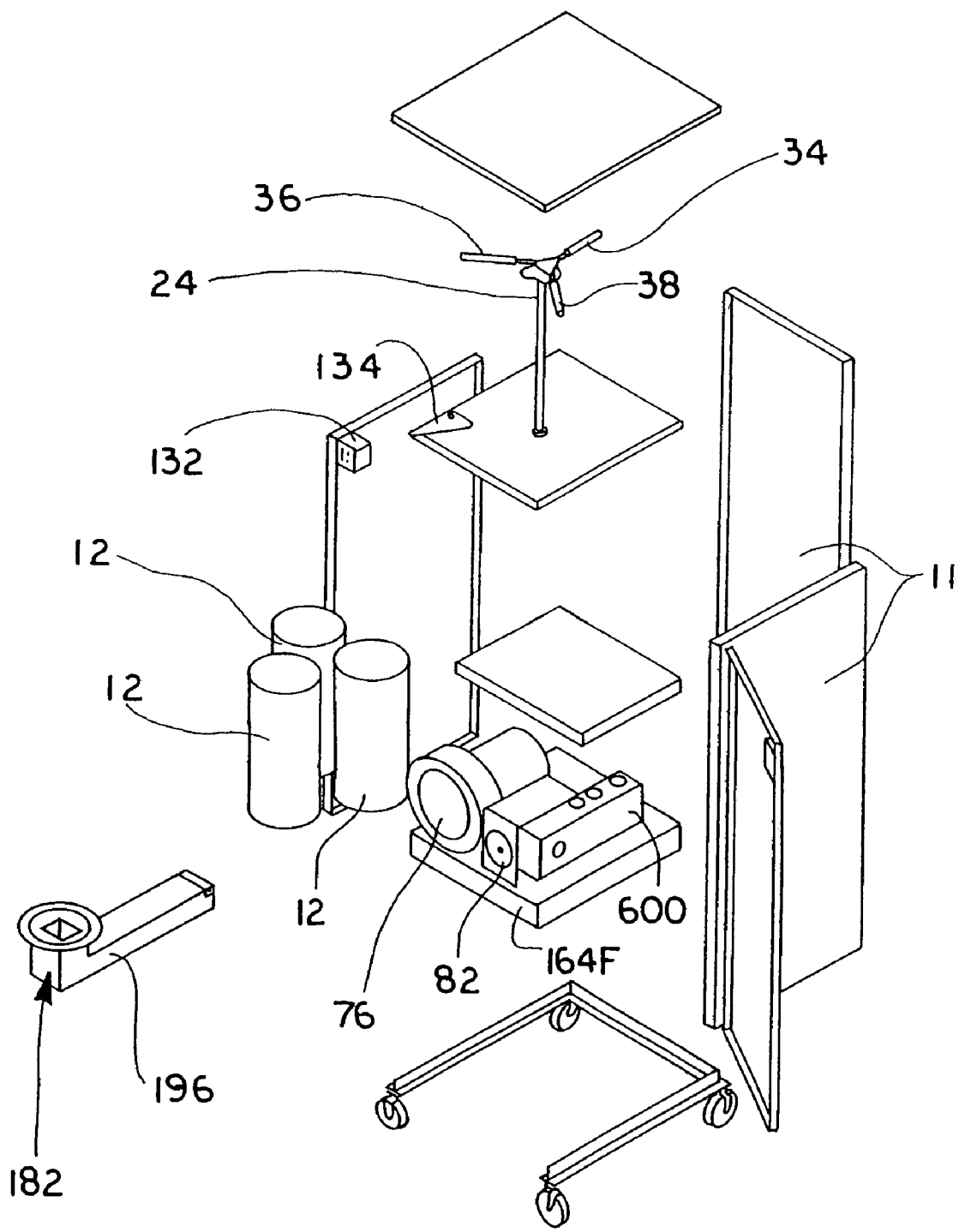
FIG. 19 is an exploded view corresponding to FIG. 1.

Referring to FIG. 18, the embodiment of the canister illustrated there has only a single central heat distribution tube running the axially length of the canister 12A. It is to be understood that the preferred embodiment of the canister is that illustrated in FIGS. 28, 29, 36, 37, 38 and 41 where there are a plurality of vertically oriented perforate heat distribution tubes running substantially the axial length or height of canister 12A.

Another feature of the invention involves the length of internal heat tubes 418 within canisters 12A. While central heat tube 418 houses the axially extending canister discharge valve stem shaft 400, as illustrated in FIG. 18 as well as in FIGS. 28 and 29 and in FIGS. 36 through 38 and 41, heat tubes 418A, which are positioned radially outboard of central heat tube 418, as illustrated in FIGS. 28 and 29, 36 through 38 and 41 preferably extend substantially to the top and to the bottom of canister 12A as illustrated in these Figures. In the arrangement of the dryer where hot air is supplied from the bottom of the canister and allowed to flow through the granular material and out the top of the canister, the upper ends of radially outboard heat tubes 418A are capped by caps 954 so that all hot air entering into and passing through a heat tube 418A must exit laterally out of the tube and thereby pass laterally through at least a portion of granular resin 956 within a canister 12A. In the arrangement of the dryer where hot air is supplied at the top of the canister and is allowed to flow downwardly through the granular material, this arrangement is reversed. Specifically, the lower ends of radially outboard heat tubes 418A are preferably capped so that all hot air entering into and passing through a heat tube 418A must exit laterally out of the tube and thereby pass laterally through at least a portion of granular resin 956 within the canister.

As noted above, the radially outboard heat tubes 418A may extend substantially the length of a canister 12A and are preferably positioned so that the ends of tubes 418A provide additional support to the canister top and bottom sealing plates when a canister 12A is at the vacuum position and a vacuum is drawn within the canister to effectuate drying of the granular resin material. When vacuum is drawn within the canister, top and bottom sealing plates 40, 42 tend to bow inwardly in response to atmospheric pressure on the exterior of those plates. As those plates 40 and 42 bow inwardly, they preferably contact the respective ends of internal heat pipes 418A, with internal heat pipes 418A thereby providing additional support for canister top and bottom sealing plates 40, 42, permitting canister top and bottom sealing plates 40, 42 to be formed of relatively thin sheet metal rather than be of pressure vessel-type construction.

Radially outboard heat pipes 418A may be perforate along their entire length to permit free passage of heated air therefrom laterally outwardly and into the granular resin contained within the canister 12A when the canister is at filling/heating position 100.

As further illustrated in FIGS. 28, 29, 36, 37, 38 and 41, heat pipes 418 are preferably equipped with umbrella air deflectors, preferably formed from sheet metal and designated generally 912 in the drawing figures. These umbrella air deflectors encourage lateral flow of air through the resin material 956 within a canister 12A as the air exits perforate internal heat tubes 418 and 418A.

Further visible in FIGS. 28, 29, 48 and 49 and shown in detail in FIG. 31 is perforate funnel 94 which rests on a funnel support plate 916 as illustrated in FIGS. 28, 29, 32 and 48. Funnel support plate 916 includes a plurality of apertures therein, the slightly larger apertures being denoted 918 as illustrated in FIGS. 31, 49 and the slightly smaller apertures being denoted 920 also being illustrated in FIGS. 31, 49. Larger apertures 918 are for passage of heated air and draw of vacuum therethrough when canister 12A is at the filling/heating and the vacuum drying positions respectively; apertures 920 are apertures which receive internal heating tubes 418a as illustrated in FIGS. 28 and 29.

Perforate funnel 94 funnels downwardly flowing granular material within canister 12 through a central discharge aperture 144, as illustrated in FIG. 18, within which an axially displaceable discharge valve cylinder resides, which is actuated by a piston cylinder combination 900 as described above with respect to FIG. 17. Funnel support brackets 914, illustrated in FIGS. 28, 29, 48 and 49 retain perforate funnel 94 in position and provide lateral support thereto which may be important given the size of the canisters and the weight of granular material being dried in a given canister.

Funnel support brackets 914 are preferably planar in form and have apertures formed therein as illustrated in FIGS. 28, 29, 48 and 49 to facilitate air flow and vacuum draw within canister 12A at the respective heat/filling and vacuum drying positions.

It should further be noted that in FIGS. 28, 29 and 48 inventory/discharge position bottom sealing plate 90 includes a discharge aperture 144 within which axially displaceable discharge valve cylinder 416 slidably resides. At the inventory/discharge position, top and bottom canister sealing plates 92, 90 are customarily retained in a closed position, sealing the interior of canister 12A against entry of any unwanted ambient, moisture laden air. Valve 406 is preferably maintained in a closed position, thereby keeping the interior of canister 12A isolated from moisture carrying air, and is only open to allow downward discharge of granular resin material while at the inventory/discharge position as needed to fill the vacuum take-off box. Once the vacuum take-off box has been filled, axially displaceable discharge valve cylinder is withdrawn, thereby closing canister 12A and thereby again sealing the canister from entry by moisture laden ambient air.

Further respecting FIG. 31, the three funnel support brackets are illustrated therein.

With further reference to FIG. 17, a swing arm 922 is provided to support housing 908 and the components connected thereto, namely spring 910, piston cylinder combination 900, inventory/discharge position top sealing plate 92, and the like. Swing arm 922 is pivotally connected to rotational support rod 902 for rotation thereabout to move housing 908 and components associated therewith from the position illustrated in FIG. 17, where housing 908 is above canister 12A at the inventory/discharge position, to a position outside the dryer cabinet as illustrated in FIG. 30. The position to which housing 908 and the associated components may be moved by rotation of swing arm 922 about rotational support rod 902 is referred to as a service position and is identified as 105 in FIG. 30.

Similar structure, for moving inventory/discharge position bottom sealing plate 90 from inventory/discharge position 104 to service position 105 is illustrated schematically in FIG. 22 where a swing bracket 924 is provided which, similarly to swing arm 922, carries a piston cylinder combination in 926 and a bias spring 928 which together serve to move inventory/discharge position bottom sealing plate 90 against the bottom of a canister 12A when located at inventory/discharge position 104 and to retract sealing plate 90 from canister 12A at such position when required. Pivotal connection of swing bracket 924 with rotational support rod 902 permits swinging rotation of swing bracket 924 and the structure carried thereby, namely piston cylinder combination 926, spring 928 and inventory/discharge position bottom sealing plate 90, from inventory/sealing position 104 to service position 905 as illustrated schematically in FIG. 30.

Referring to FIG. 23 a vacuum material take-off box 182A in the embodiment illustrated in FIG. 23 is slideably moveable from its position below a canister 12A at inventory/discharge position 104. In the embodiment of vacuum take-off box 182A illustrated in FIG. 23, take-off box 182A does not include the internal baffles illustrated in the embodiment of the take-off box 182 shown in FIGS. 8 and 9. Rather, vacuum material take-off box 182 is configured to have total internal capacity, defined by the rectangular shape and the depressed bottom of the take-off box, less than the receiving cylinder for dried granular material associated with the process machine to which the material is to be supplied.

In FIG. 23, the sealing ring for inventory/discharge position bottom sealing plate 90 is shown in partially broken lines and is designated 91. Conveying air is supplied to the vacuum material take-off box via inlet conduit 187A illustrated in FIG. 24 while dried granular material is withdrawn from the vacuum material take-off box via preferably telescoping conduit 184A illustrated in FIGS. 23 and 24.

A material presence sensor 120, shown in FIG. 24, detects presence of the dried granular material in vacuum take-off box 182A and sends a signal to the microprocessor to cease delivery of dried granular material into vacuum material take-off box 182A by closing valve cylinder 406; this is done by deactuating the piston driving canister discharge valve stem shaft 400. Once the microprocessor detects that vacuum take-off box is full of dried granular material and there is a need for such material at the receiver, the material is pneumatically conveyed to the receiver from the vacuum take-off box via outlet 184A. Desirably, the vacuum take-off box is completely evacuated with the entire contents being sent to the receiver. This reduces the chances for moisture contamination of the dried granular material.

Outlet 184A preferably telescopes and is equipped with a detector so that when the device is extended and in a position at which damage could be done if it where hit, no material can be withdrawn from vacuum material take-off box 182A.

FIG. 25 depicts the manner in which vacuum material take-off box 182A may slide into or out of position on swing bracket 924 which also supports inventory/discharge position bottom sealing plate 90, pneumatic cylinder or piston-cylinder combination 926 and spring 928, all of which serve to effectuate closure as desired of inventory/discharge position bottom sealing plate 90 against the bottom of the canister 12 at the inventory/discharge position. Arrow A in FIG. 25 denotes the sliding action by which vacuum material take-off box 182A may be removed from swing bracket 924 if desired. The slots and retaining mechanism for supporting vacuum material take-off box 182A on swing bracket 924 have not been illustrated to improve drawing clarity. The telescoping action of material outlet 184A is illustrated in FIG. 25.

Referring to FIGS. 33, 34 and 35, FIG. 33 illustrates a canister hoop stress support ring designated generally 930. Rings 930 are preferably provided at either end of a canister 12A and at intermediate axially separated spaces along the inside of canister 12A. Rings 930 provide internal support of the canister thereby preventing canister collapse when vacuum is drawn and atmospheric pressure presses against the canister exterior.

Rings 930 are preferably adjustable so as to provide more or less radially outwardly directed force according to the strength of the material from which the canister is made, the level of vacuum to be drawn within the canister, and the like.

Adjustment to the radially outward force provided by canister hoop stress support ring 930 is made via use of a removable segment 932 provided as a part of support ring 930. Segment 932 preferably is cut in the shape indicated in FIGS. 33 and 34 and is preferably retained in place with a bolt and cone-shaped nut, which expands the ring at the split when tightened. In FIGS. 34 and 35 the bolt is designated 934 and the nut, best shown in FIG. 35, is designated 936. An underlying support plate is designated 938 in FIG. 35. When cone-shaped bolt 934 and nut 936 are tightened and the cone-shaped surface moves axially (it is immaterial whether the cone-shaped surface is formed on the bolt or the nut or both) towards the opposite one of the nut/bolt combination, this produces a compressive force on ring segment 932 thereby causing segment 932 to expand laterally considering FIGS. 34 and 35. Such lateral expansion of ring-shaped segment 932, when in place within ring 930 as illustrated in FIG. 33, increases the effective circumference of ring 930, thereby providing an outwardly directed radial force against the circumferential interior of the canister, counteracting hoop stresses created in the canister when the vacuum is drawn within the canister. Inner reinforcing ring 950 and radial braces 952, shown in FIG. 37, provide additional structural rigidity.

The vacuum take-off assembly preferably includes a material level sensor as illustrated in the drawings. The level sensor is connected to the microprocessor so that the microprocessor may sense when the vacuum take-off assembly is full of resin. At that point, the microprocessor actuates the piston cylinder combination at the top of the canister 12A located at the inventory/discharge position, closing valve 20 and shutting off downward flow of dried granular material into the vacuum take-off box. This serves to isolate the remaining dried granular material in the canister helping to avoid contamination by moist air.

Since the vacuum take-off box may desirably have a smaller resin capacity than the receiver associated with the process machine to which the granular material is to be supplied, each time granular material is transferred from the vacuum take-off to the receiver, the vacuum take-off box is desirably completely emptied; granular material is not allowed to remain therein, which would provide the opportunity for the granular material to be contaminated with moisture. Once the microprocessor, which is preferably connected to the receiver associated with the process machine, senses that additional dried granular material is needed in the receiver, the microprocessor checks the level sensor to determine whether there is any granular material in the vacuum take-off box ready to be transferred to the receiver. If there is, this granular material is transferred to the receiver. If there is not, the microprocessor then actuates valve 20 at the bottom of canister 12A located at the inventory/discharge position for a sufficient period again to fill the vacuum take-off box and thereafter closes valve 20 at the bottom of canister 12A. The microprocessor then effectuates transfer of the dried granular material from the vacuum take-off box to the receiver of the process machine, as required to fill the receiver.

The microprocessor also controls operation of the heater warming the air supply to the canister 12A located at the filling/heating position. The microprocessor typically cycles the heating element on and off with the preferred cycle time being on the order of one on/off cycle each second. The percentage of "on time" during each one second cycle determines the heat output of the heater. The microprocessor monitors the rate of temperature increase or decrease in degrees per second in the heating air. Using the dynamic rate of change of temperature, the microprocessor software projects temperature at two different future times, one time typically being in the near term future and the second time being in the farther term future. This projection is based on prior experience and is algorithm-controlled so that the algorithm may be changed by the operator according to the particular material being heated and the need for heating thereof.

Typically, if the near term predicted temperature and the far term predicted temperature are both over the target temperature for the particular material being heated, the microprocessor reduces output of the heater by reducing the percentage of "on" time of the heater during each one second cycle. However, if both the projected short-term and the projected long-term temperature are under the target temperature, the microprocessor increases the percentage of "on" time of the heater to increase the amount of heat and hence increase the temperature of the hot air supplied to the resin. If one of the projected temperatures is above the target and the other of the projected temperatures is below the target, no adjustment is made to the heater. In this regard it makes no difference as to whether it is the short-term temperature which is above or below the target or the long-term temperature which is above or below the target.

The software controlling operation of the microprocessor has parameters which may be adjusted and set by the machine operator. Such parameters include short and long forward times at which the temperatures are predicted, the times at which temperatures are measured, frequency of temperature readings to be made for the short and long times, amount of adjustment to be made to the heater output, width of the band of the near target temperature where no adjustment of the heater output is permitted, and the like.

The invention has many aspects as evidenced by the foregoing description, in which several vacuum dryer and equipment configurations and methods are disclosed.

What is claimed is:

1. In a method for vacuum drying granular or powdery material including:
   a. moving at least one canister containing said granular or powdery material serially among a series of positions at which heating of material in said canister and vacuum drying of material in said canister occur;

the improvement comprising:
   b. regulating the temperature of heating air introduced into said canister at said position at which material heating occurs by predicting near and long term temperatures of said heating air, comparing said predicted near and long term temperatures to a target temperature and thereafter
      i. reducing heat input into said hearing air if said both of said predicted temperatures exceed said target temperature;
      ii. increasing heat input into said heating air if neither of said predicted temperatures exceed said target temperature; but
      iii. maintaining the current level of heat input into said heating air if said predicted temperatures bracket said target temperature.

2. A method for continuously supplying dried granular resin material for processing from a supply of material which is excessively moist, comprising substantially simultaneously performing the steps of:
   a. heating a portion said moist material in a container to a selected temperature at which said moisture evaporates therefrom at a preselected level of vacuum by introducing heated air into said container above said material;
   b. drawing and maintaining said preselected level of vacuum for a second portion of said material in a second container which has been heated to said selected temperature while in said second container by having heated air introduced into said container above said material for a time sufficient to cause said moisture to evaporate therefrom and result in said second portion of material being at a preselected dryness; and c. supplying to granular resin material processing equipment said material which has been dried to said preselected dryness by evaporation in said preselected level of vacuum after being heated to said selected temperature.

* * * * *